US009652343B2

(12) United States Patent
Klughart

(10) Patent No.: US 9,652,343 B2
(45) Date of Patent: *May 16, 2017

(54) RAID HOT SPARE SYSTEM AND METHOD

(71) Applicant: Kevin Mark Klughart, Denton, TX (US)

(72) Inventor: Kevin Mark Klughart, Denton, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/284,113

(22) Filed: Oct. 3, 2016

(65) Prior Publication Data
US 2017/0024295 A1 Jan. 26, 2017

Related U.S. Application Data

(63) Continuation-in-part of application No. 14/886,616, filed on Oct. 19, 2015, now Pat. No. 9,460,110, which
(Continued)

(51) Int. Cl.
G06F 3/00 (2006.01)
G06F 11/20 (2006.01)
G06F 3/06 (2006.01)
G06F 13/40 (2006.01)
G06F 13/42 (2006.01)

(52) U.S. Cl.
CPC ........ G06F 11/2038 (2013.01); G06F 3/0607 (2013.01); G06F 3/0619 (2013.01); G06F 3/0665 (2013.01); G06F 3/0689 (2013.01); G06F 11/2058 (2013.01);
(Continued)

(58) Field of Classification Search
CPC .. G06F 3/0607; G06F 3/0689; G06F 13/4247; G06F 13/00; G06F 13/409
See application file for complete search history.

(56) References Cited

U.S. PATENT DOCUMENTS 4,873,665 A 10/1989 Jiang et al.
5,164,613 A 11/1992 Mumper et al.
(Continued)

OTHER PUBLICATIONS

HCL, ashok.madaan@hcl.in, SATA Host Controller, pp. 1-2, India.
(Continued)

Primary Examiner — Ernest Unelus
(74) Attorney, Agent, or Firm — Kevin M. Klughart; Carstens & Cahoon, LLP

(57) ABSTRACT

A RAID (redundant array of independent disks) hot spare (RHS) system and method that permits a daisy-chain of interconnected pass-thru disk drive controllers (PTDDCs) each connected to a SATA local disk drive (LDD) storage element (DSE) to support a hot spare disk (HSD) such that a failing disk drive (FDD) in the RAID array can be immediately replaced by a HSD within the PTDDC daisy-chain without operator intervention is disclosed. The PTDDCs within the daisy-chain are configured in RAID fashion to support mirroring of one or more drives in the PTDDC daisy-chain. The PTDDCs monitor functional status of LDDs attached to each PTDDC. FDD failure triggers activation of a HSD in the PTDDC daisy-chain and automatic mirror copying along the PTDDC daisy-chain of RAID data from a master disk drive (MDD) mirrored to the LDD. FDD-PTDDC and HSD-PTDDC LBA mapping registers are updated after mirror copying completes.

20 Claims, 64 Drawing Sheets

Related U.S. Application Data is a continuation-in-part of application No. 14/685,439, filed on Apr. 13, 2015, now Pat. No. 9,164,946, which is a continuation of application No. 14/526,855, filed on Oct. 29, 2014, now Pat. No. 9,015,355, which is a continuation of application No. 14/317,892, filed on Jun. 27, 2014, now Pat. No. 8,943,227, application No. 15/284,113, which is a continuation-in-part of application No. 14/314,143, filed on Jun. 25, 2014, now Pat. No. 8,914,549, and a continuation-in-part of application No. 13/200,242, filed on Sep. 21, 2011, now Pat. No. 8,799,523, and a continuation-in-part of application No. 13/200,572, filed on Sep. 25, 2011, now Pat. No. 8,813,165.

(52) U.S. Cl.
CPC ........ *G06F 11/2069* (2013.01); *G06F 13/409* (2013.01); *G06F 13/4247* (2013.01)

(56) References Cited

U.S. PATENT DOCUMENTS

| | | | |
|---|---|---|---|
| 5,299,156 | A | 3/1994 | Jiang et al. |
| 5,363,361 | A | 11/1994 | Bakx |
| 5,532,958 | A | 7/1996 | Jiang et al. |
| 5,926,602 | A | 7/1999 | Okura |
| 6,118,690 | A | 9/2000 | Jiang et al. |
| 6,324,338 | B1 | 11/2001 | Wood et al. |
| 6,405,239 | B1 | 6/2002 | Addington et al. |
| 7,373,443 | B2 | 5/2008 | Seto |
| 7,600,070 | B1 | 10/2009 | Linnell |
| 7,814,272 | B2 | 10/2010 | Barrall et al. |
| 7,814,273 | B2 | 10/2010 | Barrall |
| 7,818,531 | B2 | 10/2010 | Barrall |
| 7,873,782 | B2 | 1/2011 | Terry et al. |
| 7,889,964 | B1 | 2/2011 | Barton et al. |
| 8,074,105 | B2 | 12/2011 | Kalwitz et al. |
| 8,095,760 | B2 | 1/2012 | Mizuno et al. |
| 8,352,649 | B2 | 1/2013 | Liu et al. |
| 8,799,523 | B2 | 8/2014 | Klughart |
| 8,813,165 | B2 | 8/2014 | Klughart |
| 8,914,549 | B2 | 12/2014 | Klughart |
| 8,943,227 | B2 | 1/2015 | Klughart |
| 9,015,355 | B2 | 4/2015 | Klughart |
| 9,164,946 | B2 | 10/2015 | Klughart |
| 2002/0102092 | A1 | 8/2002 | Thai |
| 2003/0014762 | A1 | 1/2003 | Conover et al. |
| 2003/0063893 | A1 | 4/2003 | Read |
| 2005/0195660 | A1 | 9/2005 | Kavuri et al. |
| 2005/0207253 | A1 | 9/2005 | Takase et al. |
| 2006/0036777 | A1 | 2/2006 | Innan et al. |
| 2007/0149148 | A1 | 6/2007 | Yoshikawa et al. |
| 2007/0266037 | A1 | 11/2007 | Terry et al. |
| 2008/0046947 | A1 | 2/2008 | Katznelson |
| 2008/0068513 | A1 | 3/2008 | Ariyoshi et al. |
| 2008/0162811 | A1 | 7/2008 | Steinmetz et al. |
| 2009/0016009 | A1 | 1/2009 | Barrall et al. |
| 2009/0036067 | A1 | 2/2009 | Rofougaran |
| 2009/0067363 | A1 | 3/2009 | Ruiz et al. |
| 2009/0222623 | A1 | 9/2009 | Nakamura et al. |
| 2009/0259791 | A1 | 10/2009 | Mizuno et al. |
| 2009/0292843 | A1 | 11/2009 | Haban et al. |
| 2010/0049919 | A1 | 2/2010 | Winokur et al. |
| 2010/0064104 | A1* | 3/2010 | Steinmetz ............ G06F 3/0607 711/114 |
| 2010/0146206 | A1 | 6/2010 | Yochai et al. |
| 2010/0257401 | A1 | 10/2010 | Stolowitz |
| 2011/0013882 | A1 | 1/2011 | Kusunoki et al. |
| 2011/0035565 | A1 | 2/2011 | Barrall |
| 2011/0060773 | A1 | 3/2011 | Itoh |
| 2011/0072233 | A1 | 3/2011 | Dawkins et al. |
| 2011/0145452 | A1 | 6/2011 | Schilling et al. |
| 2011/0252007 | A1 | 10/2011 | Cho et al. |
| 2011/0283150 | A1 | 11/2011 | Konishi et al. |
| 2012/0266027 | A1 | 10/2012 | Itoyama et al. |
| 2012/0278552 | A1 | 11/2012 | Singh et al. |
| 2012/0311256 | A1 | 12/2012 | Nakajima et al. |
| 2013/0145106 | A1 | 6/2013 | Kan |
| 2013/0254429 | A1 | 9/2013 | Mimata et al. |

OTHER PUBLICATIONS

Hitachi Global Storage Technologies (datasheet); Hitachi Deskstar 7K1000 Hard Disk Drive Specification, Models HDS7721010KLA330, HDS7721075KLA330; Rev. 0.1, Jun. 21, 2007; USA.

Hitachi Global Storage Technologies (datasheet); Hitachi Deskstar 7K3000 Hard Disk Drive Specification, Models HDS723020BLA642, HDS723015BLA642; Rev. 1.0, Oct. 28, 2010; USA.

Hitachi Global Storage Technologies (datasheet); Hitachi Deskstar 7K3000 Hard Disk Drive Specification, Models HUA723030ALA640, HUA723020ALA640; Rev. 1.1, Jan. 25, 2011; USA.

Intel Corporation, PHY Interface for the PCI Express* Architecture (PIPE), for SATA 3.0, Revision .7, 2007-2010, pp. 1-30, US.

Iomega; "Using Iomega StorCenter IX 12-300R with Windows Server2008 R2 HYPER-V Over iSCSI"; White Paper (online); Iomega Corporation, Mar. 2011; http://download.iomega.com/nas/pdfs/hyperv-overiscsi.pdf.

Serial ATA International Organization (specification), Serial ATA Revision 2.5—High Speed Serialized at Attachment; www.sata-io.org; Oct. 27, 2005; USA.

Serial ATA International Organization (specification), Serial ATA Revision 2.6—High Speed Serialized at Attachment; www.sata-io.org; Feb. 15, 2007; USA.

Serial ATA International Organization (specification), Serial ATA Revision 3.0—High Speed Serialized at Attachment; www.sata-io.org; Jun. 2, 2009; USA.

ISA/US, International Search Report and Written Opinion for PCT/US2012/056619 dated Dec. 17, 2012.

ISA/US, International Search Report and Written Opinion for PCT/US2012/056652 dated Jan. 3, 2013.

* cited by examiner

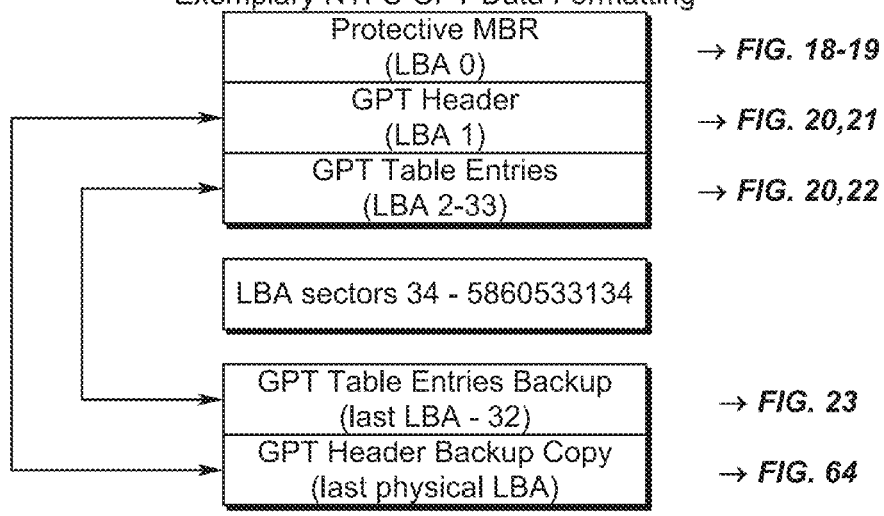

FIG. 17

Exemplary NTFS Volume Statistics (3TB Disk Drive)

```
C:\Users\Kevin Mark Klughart>fsutil fsinfo ntfsinfo f:
NTFS Volume Serial Number :      0xacccfd6dccfd3266
NTFS Version            :        3.1
LFS Version             :        1.1
Number Sectors          :        0x00000000015d4c97ff
Total Clusters          :        0x000000000002ba992ff
Free Clusters           :        0x000000000002ba88bed
Total Reserved          :        0x0000000000000000
Bytes Per Sector        :        512
Bytes Per Physical Sector :      512
Bytes Per Cluster       :        4096
Bytes Per FileRecord Segment :   1024
Clusters Per FileRecord Segment :  0
Mft Valid Data Length   :        0x0000000000040000
Mft Start Lcn           :        0x000000000000c0000
Mft2 Start Lcn          :        0x0000000000000002
Mft Zone Start          :        0x000000000000c0000
Mft Zone End            :        0x000000000000cc820
Max Device Trim Extent Count :   0
Max Device Trim Byte Count :     0x0
Max Volume Trim Extent Count :   62
Max Volume Trim Byte Count :     0x40000000
Resource Manager Identifier :    04B12F7F-74B5-11E5-9BC7-8C89A52DC826
```

Exemplary NTFS GPT Data Formatting

| | |
|---|---|
| Protective MBR (LBA 0) | → FIG. 18-19 |
| GPT Header (LBA 1) | → FIG. 20,21 |
| GPT Table Entries (LBA 2-33) | → FIG. 20,22 |
| LBA sectors 34 - 5860533134 | |
| GPT Table Entries Backup (last LBA - 32) | → FIG. 23 |
| GPT Header Backup Copy (last physical LBA) | → FIG. 64 |

Exemplary Protective MBR
Data Structures
(Physical LBA 0)

| Name | Offset | Value |
|---|---|---|
| Bootstrap code | 000 | 33 C0 8E D0 BC 00 7C 8E C0 8E D8 BE 00 7C BF 00 06 8... |
| Disk serial number | 1B8 | 00 00 00 00 |
| (reserved) | 1BC | 00 00 |
| ∨ Partition 1 (Unknown,... | 1BE | ———————▶ *Unknown partition type to prevent non-NTFS OS from reading/writing partition* |
|    Active partition flag ... | 1BE | 0x00 |
|    Start head | 1BF | 0 |
|    Start sector (bits 0-5)... | 1C0 | 0x02 |
|    Start cylinder (lower ... | 1C1 | 0x00 |
|    File system ID | 1C2 | 0xEE |
|    End head | 1C3 | 255 |
|    End sector (bits 0-5)... | 1C4 | 0xFF |
|    End cylinder (lower 8... | 1C5 | 0xFF |
|    First sector | 1C6 | 1 |
|    Total sectors | 1CA | 4,294,967,295 ———▶ *Maximum FAT Allocation (2TB drive size)* |
| > Partition 2 (Unused) | 1CE | |
| > Partition 3 (Unused) | 1DE | |
| > Partition 4 (Unused) | 1EE | |
| Signature (55 AA) | 1FE | 55 AA |

*FIG. 19*

Exemplary Protective GUID MBR
(Physical LBA 0)

FIG. 20 — Exemplary GPT Header/Entries Data Structures (Physical LBA 1-33)

2000

| Name | Offset | Value |
|---|---|---|
| ∨ GPT Header | 000 | ►FIG. 21 |
| Signature (EFI PART) | 000 | 45 46 49 20 50 41 52 54 |
| Revision | 008 | 00 00 01 00 |
| Header size | 00C | 92 |
| Header CRC | 010 | 33 A3 98 15 |
| (reserved) | 014 | 00 00 00 00 |
| Current LBA | 018 | 1 |
| Backup LBA | 020 | 5,860,533,167 ──►FIG. 64 |
| First usable LBA | 028 | 34 |
| Last usable LBA | 030 | 5,860,533,134 |
| Disk GUID | 038 | D8 2F 46 FB F1 ED 06 42 98 E4 ED 1A 9E 57 4E 68 |
| Starting LBA of entries | 048 | 2 |
| Number of entries | 050 | 128 ──► *EntryCount* |
| Entry size | 054 | 128 ──► *EntrySize* |
| CRC of partition array | 058 | C8 24 61 08 |
| (reserved) | 05C | 00 00 00 00 00 00 00 00 00 00 00 00 00 00 00 00 00 ... |
| ∨ Entry 1 (128 MB) | 200 | ►FIG. 22 & FIG. 23 |
| Partition type GUID | 200 | Microsoft Reserved Partition |
| Unique partition GUID | 210 | D7 54 1B 46 F0 3A 37 43 8C 64 A2 DD 2A 28 CF 10 |
| First LBA | 220 | 34 |
| Last LBA | 228 | 262,177 |
| Attribute flags | 230 | 00 00 00 00 00 00 00 00 |
| Partition name | 238 | Microsoft reserved partition |
| ∨ Entry 2 (2.73 TB) | 280 | ►FIG. 22 & FIG. 23 |
| Partition type GUID | 280 | Basic Data Partition |
| Unique partition GUID | 290 | 41 A7 7D 71 F3 2D FE 49 A6 6C 82 60 83 08 F9 8F |
| First LBA | 2A0 | 264,192 |
| Last LBA | 2A8 | 5,860,532,223 |
| Attribute flags | 2B0 | 00 00 00 00 00 00 00 00 |
| Partition name | 2B8 | Basic data partition |
| › Entry 3 (unused) | 300 | 128 total entries (128 bytes/entry) |
| › Entry 4 (unused) | 380 | (unused entries zero) |

Backup Copy

FIG. 21

Exemplary GPT Header
Raw Data
(Physical LBA 1)

FIG. 22

Exemplary GPT Table Entries 1 & 2 (of 128)
Raw Data
(Physical LBA 2)

Exemplary Backup GPT Table Entries 1 & 2
(copy of physical LBA 2)
(Physical LBA 5,860,533,166)

| Offset | 00 01 02 03 04 05 06 07 | 08 09 0A 0B 0C 0D 0E 0F | ASCII |
|---|---|---|---|
| 2BAA1471E00 | 16 E3 C9 83 5C 0B B8 4D | 81 7D F9 2D F0 02 15 A8 | .ãÉ\..¸M.}ù-ð..¨ |
| 2BAA1471E10 | D7 54 1B 46 F0 3A 37 43 | 8C 64 A2 DD 2A 28 CF 10 | ×T.Fð:7CŒd¢Ý*(Ï. |
| 2BAA1471E20 | 22 00 00 00 00 00 00 00 | 21 00 04 00 00 00 00 00 | ".......!....... |
| 2BAA1471E30 | 00 00 00 00 00 00 00 00 | 4D 00 69 00 63 00 72 00 | ........M.i.c.r. |
| 2BAA1471E40 | 6F 00 73 00 6F 00 66 00 | 74 00 20 00 72 00 65 00 | o.s.o.f.t. .r.e. |
| 2BAA1471E50 | 73 00 65 00 72 00 76 00 | 65 00 64 00 20 00 70 00 | s.e.r.v.e.d. .p. |
| 2BAA1471E60 | 61 00 72 00 74 00 69 00 | 74 00 69 00 6F 00 6E 00 | a.r.t.i.t.i.o.n. |
| 2BAA1471E70 | 00 00 00 00 00 00 00 00 | 00 00 00 00 00 00 00 00 | ................ |
| 2BAA1471E80 | A2 A0 D0 EB E5 89 33 44 | 87 C0 68 B6 B7 26 99 C7 | ¢ Ðëå‰3D‡Àh¶·&™Ç |
| 2BAA1471E90 | 41 A7 7D 71 F3 2D F2 49 | A6 6C 82 60 B3 08 F9 8F | A§}qó-òI¦l‚`³.ù. |
| 2BAA1471EA0 | 00 08 04 00 00 00 00 00 | FF 9F 50 5D 01 00 00 00 | ........ÿŸP].... |
| 2BAA1471EB0 | 00 00 00 00 00 00 00 00 | 42 00 61 00 73 00 69 00 | ........B.a.s.i. |
| 2BAA1471EC0 | 63 00 20 00 64 00 61 00 | 74 00 61 00 20 00 70 00 | c. .d.a.t.a. .p. |
| 2BAA1471ED0 | 61 00 72 00 74 00 69 00 | 74 00 69 00 6F 00 6E 00 | a.r.t.i.t.i.o.n. |
| 2BAA1471EE0 | 00 00 00 00 00 00 00 00 | 00 00 00 00 00 00 00 00 | ................ |
| 2BAA1471EF0 | 00 00 00 00 00 00 00 00 | 00 00 00 00 00 00 00 00 | ................ |
| 2BAA1471F00 | 00 00 00 00 00 00 00 00 | 00 00 00 00 00 00 00 00 | ................ |
| 2BAA1471F10 | 00 00 00 00 00 00 00 00 | 00 00 00 00 00 00 00 00 | ................ |
| 2BAA1471F20 | 00 00 00 00 00 00 00 00 | 00 00 00 00 00 00 00 00 | ................ |
| 2BAA1471F30 | 00 00 00 00 00 00 00 00 | 00 00 00 00 00 00 00 00 | ................ |
| 2BAA1471F40 | 00 00 00 00 00 00 00 00 | 00 00 00 00 00 00 00 00 | ................ |
| 2BAA1471F50 | 00 00 00 00 00 00 00 00 | 00 00 00 00 00 00 00 00 | ................ |
| 2BAA1471F60 | 00 00 00 00 00 00 00 00 | 00 00 00 00 00 00 00 00 | ................ |
| 2BAA1471F70 | 00 00 00 00 00 00 00 00 | 00 00 00 00 00 00 00 00 | ................ |
| 2BAA1471F80 | 00 00 00 00 00 00 00 00 | 00 00 00 00 00 00 00 00 | ................ |
| 2BAA1471F90 | 00 00 00 00 00 00 00 00 | 00 00 00 00 00 00 00 00 | ................ |
| 2BAA1471FA0 | 00 00 00 00 00 00 00 00 | 00 00 00 00 00 00 00 00 | ................ |
| 2BAA1471FB0 | 00 00 00 00 00 00 00 00 | 00 00 00 00 00 00 00 00 | ................ |
| 2BAA1471FC0 | 00 00 00 00 00 00 00 00 | 00 00 00 00 00 00 00 00 | ................ |
| 2BAA1471FD0 | 00 00 00 00 00 00 00 00 | 00 00 00 00 00 00 00 00 | ................ |
| 2BAA1471FE0 | 00 00 00 00 00 00 00 00 | 00 00 00 00 00 00 00 00 | ................ |
| 2BAA1471FF0 | 00 00 00 00 00 00 00 00 | 00 00 00 00 00 00 00 00 | ................ |

(Left side annotations: GPT Entry #1, GPT Entry #2, GPT Entry #3, GPT Entry #4)

Exemplary Backup GPT Header
(copy of physical LBA 1)
(Physical LBA 5,860,533,167)

| Offset | 00 01 02 03 04 05 06 07 | 08 09 0A 0B 0C 0D 0E 0F | ASCII |
|---|---|---|---|
| 28AA1475B00 | 45 46 49 20 50 41 52 54 | 00 00 01 00 5C 00 00 00 | EFI PART....\... |
| 28AA1475B10 | A8 8C 8C 22 00 00 00 00 | AF A3 50 5D 01 00 00 00 | «Œ"...¯£P].... |
| 28AA1475B20 | 01 00 00 00 00 00 00 00 | 22 00 00 00 00 00 00 00 | ........"....... |
| 28AA1475B30 | 9E A3 50 5D 01 00 00 00 | DB 2F 46 FB F1 E0 06 42 | ž£P]....Û/Fûñà.B |
| 28AA1475B40 | 9B B4 8D 1A 9E 57 4E 68 | 8F A3 50 5D 01 00 00 00 | >´..žWNh.£P].... |
| 28AA1475B50 | 80 00 00 00 80 00 00 00 | C8 24 61 08 00 00 00 00 | €...€...È$a..... |
| 28AA1475B60 | 00 00 00 00 00 00 00 00 | 00 00 00 00 00 00 00 00 | ................ |
| 28AA1475B70 | 00 00 00 00 00 00 00 00 | 00 00 00 00 00 00 00 00 | ................ |
| 28AA1475B80 | 00 00 00 00 00 00 00 00 | 00 00 00 00 00 00 00 00 | ................ |
| 28AA1475B90 | 00 00 00 00 00 00 00 00 | 00 00 00 00 00 00 00 00 | ................ |
| 28AA1475BA0 | 00 00 00 00 00 00 00 00 | 00 00 00 00 00 00 00 00 | ................ |
| 28AA1475BB0 | 00 00 00 00 00 00 00 00 | 00 00 00 00 00 00 00 00 | ................ |
| 28AA1475BC0 | 00 00 00 00 00 00 00 00 | 00 00 00 00 00 00 00 00 | ................ |
| 28AA1475BD0 | 00 00 00 00 00 00 00 00 | 00 00 00 00 00 00 00 00 | ................ |
| 28AA1475BE0 | 00 00 00 00 00 00 00 00 | 00 00 00 00 00 00 00 00 | ................ |
| 28AA1475BF0 | 00 00 00 00 00 00 00 00 | 00 00 00 00 00 00 00 00 | ................ |
| 28AA1475F00 | 00 00 00 00 00 00 00 00 | 00 00 00 00 00 00 00 00 | ................ |
| 28AA1475F10 | 00 00 00 00 00 00 00 00 | 00 00 00 00 00 00 00 00 | ................ |
| 28AA1475F20 | 00 00 00 00 00 00 00 00 | 00 00 00 00 00 00 00 00 | ................ |
| 28AA1475F30 | 00 00 00 00 00 00 00 00 | 00 00 00 00 00 00 00 00 | ................ |
| 28AA1475F40 | 00 00 00 00 00 00 00 00 | 00 00 00 00 00 00 00 00 | ................ |
| 28AA1475F50 | 00 00 00 00 00 00 00 00 | 00 00 00 00 00 00 00 00 | ................ |
| 28AA1475F60 | 00 00 00 00 00 00 00 00 | 00 00 00 00 00 00 00 00 | ................ |
| 28AA1475F70 | 00 00 00 00 00 00 00 00 | 00 00 00 00 00 00 00 00 | ................ |
| 28AA1475F80 | 00 00 00 00 00 00 00 00 | 00 00 00 00 00 00 00 00 | ................ |
| 28AA1475F90 | 00 00 00 00 00 00 00 00 | 00 00 00 00 00 00 00 00 | ................ |
| 28AA1475FA0 | 00 00 00 00 00 00 00 00 | 00 00 00 00 00 00 00 00 | ................ |
| 28AA1475FB0 | 00 00 00 00 00 00 00 00 | 00 00 00 00 00 00 00 00 | ................ |
| 28AA1475FC0 | 00 00 00 00 00 00 00 00 | 00 00 00 00 00 00 00 00 | ................ |
| 28AA1475FD0 | 00 00 00 00 00 00 00 00 | 00 00 00 00 00 00 00 00 | ................ |
| 28AA1475FE0 | 00 00 00 00 00 00 00 00 | 00 00 00 00 00 00 00 00 | ................ |
| 28AA1475FF0 | 00 00 00 00 00 00 00 00 | 00 00 00 00 00 00 00 00 | ................ |

*Prior Art*

*Prior Art*

*Prior Art*

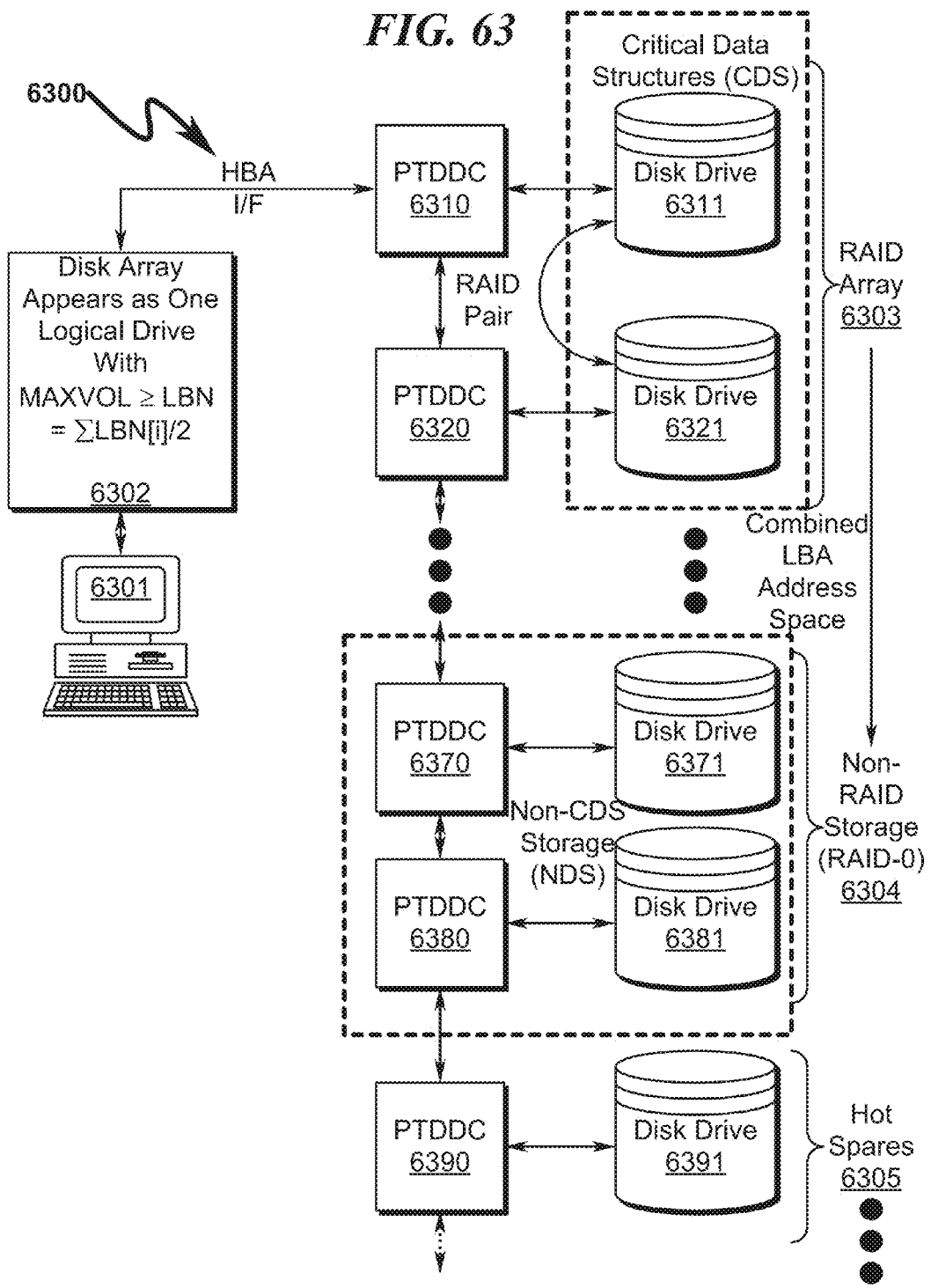

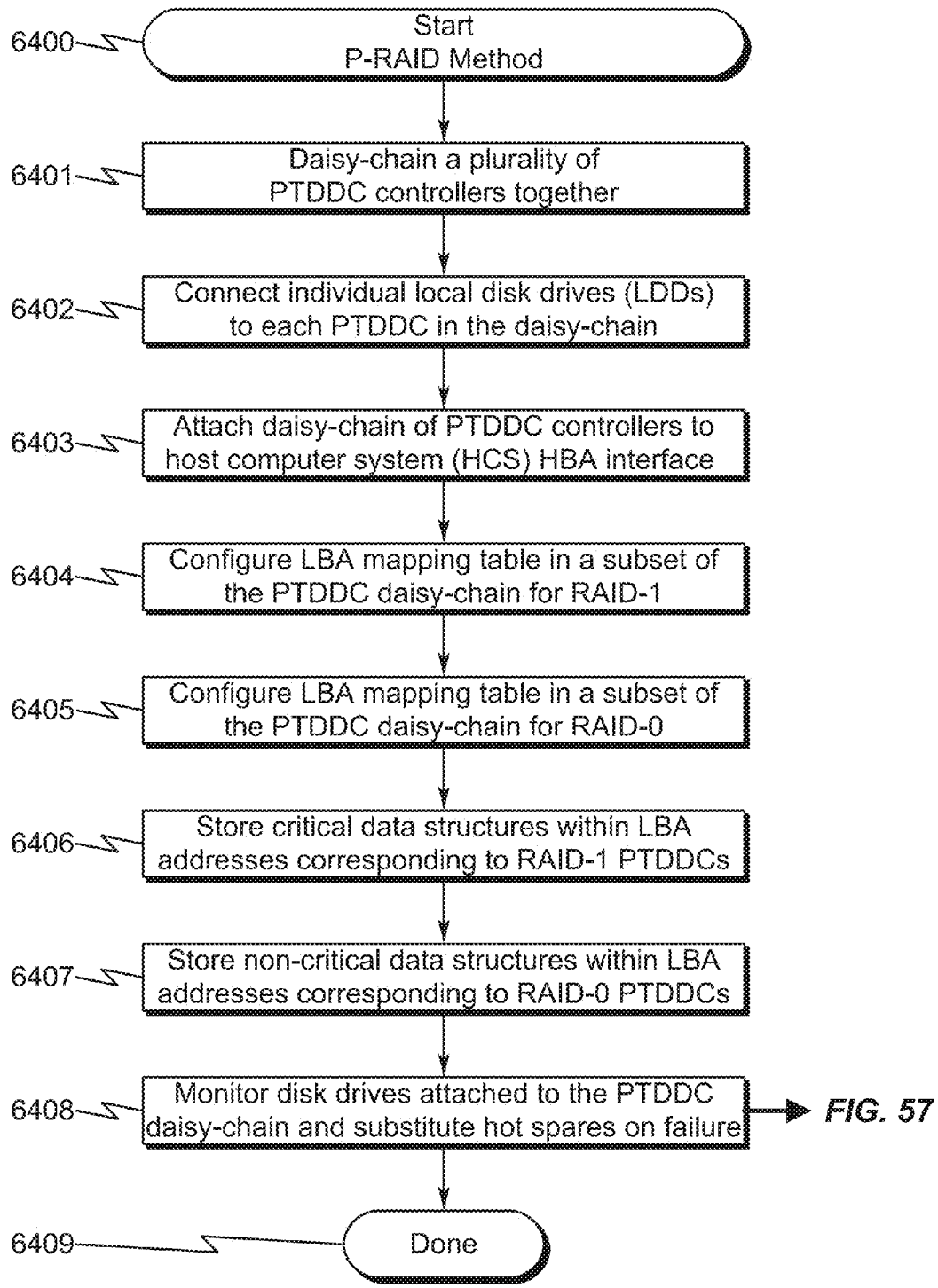

RAID HOT SPARE SYSTEM AND METHOD

CROSS REFERENCE TO RELATED APPLICATIONS

This application is a Continuation-In-Part (CIP) Patent Application of and incorporates by reference U.S. Utility patent application for FILE SYSTEM EXTENSION SYSTEM AND METHOD by inventor Kevin Mark Klughart, filed with the USPTO on Oct. 19, 2015, with Ser. No. 14/886,616, and issued as U.S. Pat. No. 9,460,110 on Oct. 4, 2016.

Application Ser. No. 14/886,616 is a Continuation-In-Part (CIP) Patent Application of and incorporates by reference U.S. Utility patent application for DATA STORAGE RAID ARCHITECTURE EXTENSION SYSTEM AND METHOD by inventor Kevin Mark Klughart, filed with the USPTO on Apr. 13, 2015, with Ser. No. 14/685,439, and issued as U.S. Pat. No. 9,164,946 on Oct. 20, 2015.

Application Ser. No. 14/685,439 is a Continuation Patent Application (CPA) of and incorporates by reference U.S. Utility patent application for DATA STORAGE ARCHITECTURE EXTENSION SYSTEM AND METHOD by inventor Kevin Mark Klughart, filed with the USPTO on Oct. 29, 2014, with Ser. No. 14/526,855, and issued as U.S. Pat. No. 9,015,355 on Apr. 21, 2015.

Application Ser. No. 14/526,855 is a Continuation Patent Application (CPA) of and incorporates by reference U.S. Utility patent application for DATA STORAGE ARCHITECTURE EXTENSION SYSTEM AND METHOD by inventor Kevin Mark Klughart, filed with the USPTO on Jun. 27, 2014, with Ser. No. 14/317,892, and issued as U.S. Pat. No. 8,943,227 on Jan. 27, 2015.

This application is a Continuation-In-Part (CIP) Patent Application of and incorporates by reference U.S. Utility patent application for DATA STORAGE ARCHITECTURE EXTENSION SYSTEM AND METHOD by inventor Kevin Mark Klughart, filed with the USPTO on Jun. 25, 2014, with Ser. No. 14/314,143, and issued as U.S. Pat. No. 8,914,549 on Dec. 16, 2014.

This application is a Continuation-In-Part (CIP) Patent Application of and incorporates by reference U.S. Utility patent application for DATA STORAGE ARCHITECTURE EXTENSION SYSTEM AND METHOD by inventor Kevin Mark Klughart, filed with the USPTO on Sep. 21, 2011, with Ser. No. 13/200,242, and issued as U.S. Pat. No. 8,799,523 on Aug. 5, 2014.

This application claims benefit under 35 U.S.C. §120 and incorporates by reference U.S. Utility patent application for DATA STORAGE ARCHITECTURE EXTENSION SYSTEM AND METHOD by inventor Kevin Mark Klughart, filed with the USPTO on Sep. 21, 2011, with Ser. No. 13/200,242, and issued as U.S. Pat. No. 8,799,523 on Aug. 5, 2014.

This application claims benefit under 35 U.S.C. §120 and incorporates by reference U.S. Utility patent application for AUDIO/VIDEO STORAGE/RETRIEVAL SYSTEM AND METHOD by inventor Kevin Mark Klughart, filed with the USPTO on Sep. 25, 2011, with Ser. No. 13/200,572, and issued as U.S. Pat. No. 8,813,165 on Aug. 19, 2014.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems/methods associated with computer data storage, and specifically to systems/methods used to store data on disk drives, and in some preferred embodiments, storage of data on disk drives connected to computer systems running under a variety of operating system environments that implement a file system on the disk drives. In some preferred applications the present invention allows RAID (redundant array of independent disks) arrays to be constructed using pass-thru disk drive controllers (PTDDC) connected in a daisy-chain fashion in which the failure of a locally attached disk drive may be replaced by the use of a hot spare drive (HSD) that is attached to a PTDDC within the daisy-chain without the need for operator intervention.

PRIOR ART AND BACKGROUND OF THE INVENTION

The following discussion provides background application context information regarding the operation of the present invention and is not to be construed as prior art with respect to the present invention disclosure.

PTDDC Background Application Context (0100)-(0400)

Prior patent applications and issued patents that are incorporated by reference within this patent application describe a hardware Pass-Thru Disk Drive Controller (PTDDC) technology that permits a string of serial advanced technology attachment (SATA) disk drives to be daisy-chained together to form a single logical disk drive. As generally depicted in FIG. 1 (0100) and FIG. 2 (0200), within this context, the disk drive chain contains an initial SATA interface that connects to the host bus adapter (HBA) of the host computer system (HCS) (0101, 0201). A PTDDC integrated circuit (IC) or applications specific integrated circuit (ASIC) implements protocols along the daisy-chain to pass data up/down the daisy-chain as required by the host computer system (HCS) (0101, 0201). The PTDDC may be implemented as a 4-port device (0110, 0190) as depicted in FIG. 1 (0100) having HBA I/O port (0111, 0191), SATA disk drive interface (DDI) port (0112, 0192), pass-thru input (PTI) port (0113, 0193), and pass-thru output (PTO) (0114, 0194). The PTDDC may be also be implemented as a 3-port device (0210, 0290) as depicted in FIG. 2 (0200) having SATA disk drive interface (DDI) port (0212, 0292), pass-thru input (PTI) port (0213, 0293), and pass-thru output (PTO) (0214, 0294), wherein the HBA port (0111, 0191) and PTI (0113, 0193) ports have been functionally merged. In both examples provided the ports depicted are configured as SATA hardware ports that may incorporate additional protocols implementing the functions described herein. An example of the PTDDC daisy-chain implemented on using individual disk drives that are sequentially connected in a daisy-chain is generally depicted in FIG. 3 (0300). An example of the PTDDC daisy-chain (0410) implemented on an active backplane using application specific integrated circuits (ASICs) (0411, 0412, 0413, 0414, 0415) is generally depicted in FIG. 4 (0400) with the system incorporating installed disk drives as depicted in FIG. 5 (0500). As generally illustrated in FIG. 5 (0500), the PTDDC daisy-chain may only be partially filled with physical storage, even though the logical array size may be much larger than that which is physically present. A PTDDC-enabled integrated backplane suitable for incorporating a number of disk drives in a daisy-chain is generally depicted in FIG. 6 (0600) and is shown populated with disk drives, power supply, and spare slot inserts in FIG. 7 (0700). These double-sided storage backplanes as depicted in FIG. 7 (0700) may be integrated in to petabyte-class (1000 terabyte) storage racks as generally depicted in FIG. 8 (0800).

One objective of the PTDDC storage array as discussed above is to drastically reduce the overall interconnect costs between disk drives in a storage array by minimizing the cost of the hardware required to provide drive interconnection into a larger logical storage array context. As mentioned in the incorporated patents and patent applications, while the individual disk drive cost in a storage array may approach USD$25, the average cost of the same drive when combined with computer server, power supply, and overhead interconnects typically ranges from USD$1000-USD$3000 in a typical commercial storage array system that integrates the individual disk drives into a unified storage array. Thus, for a petabyte-class (1000 terabyte) storage array, implementation costs typically range from USD$1M-USD$3M, when the drive costs would be approximately USD$25000, meaning that interconnect costs in typical server arrays consume approximately 98% of the cost of the storage array. Thus, in commercial storage array systems, interconnect costs (rather than storage costs) dominate the cost profile of the overall system. The present invention targets cost reduction in the disk drive interconnection to reduce the overall cost of the storage array.

Operating System Logical Disk Volumes

It should be noted within the following discussion that while some operating systems provide capabilities to link multiple disk drives together to form larger logical volumes, to date operating systems do not provide provisions for "holes" in the logical address space of a disk drive other than to provide for "bad" blocks on the disk drive that are mapped as unusable. Since modern disk drives incorporate internal bad block mapping, a modern operating system will never experience a truly "bad" block in a disk drive as this functionality has been taken over by hardware within the disk drive itself. Furthermore, it should be noted that the software overhead associated with mapping multiple disk drives into a single logical volume is significant and dramatically reduces the overall throughput to/from the logical disk drive, especially when multiple write operations must be performed to implement RAID redundancy within the logical disk volume.

Sparse Data Storage

While some implementations of "sparse data" storage have been implemented, these systems deal with data storage in which spans of data are "zero" and may be overwritten at a later time with actual non-zero data. These techniques are akin to the implementation of sparse matrix storage techniques as applied to hard drive storage systems. However, in these scenarios it should be recognized that the backing store for both the zero and non-zero data must have a physical location allocated within hard drive storage. This is not the case with the present invention as the use of the RESERVED.SYS phantom storage may be implemented without any associated hard drive installed in the storage daisy-chain.

NTFS GPT Implementation

The approach to the dynamic extensibility of a logical file system on a PTDDC daisy-chain of an arbitrary number of SATA disk drives as described in the incorporated patents and patent applications works well for file systems (also called On-Disk-Structures or "ODS") in which data is logically aligned beginning at the first LBA of the disk drive. Traditionally, the first LBA of the disk drive incorporates data structures that define the physical size of the disk and incorporate boot structures for the operating system to be loaded. However, there are exceptions to this convention.

Most notably, the MICROSOFT® New Technology File System (NTFS) incorporates data structures that reference both the BEGINNING LBA of the disk drive but also the ENDING LBA of the disk drive. Specifically, the NTFS system creates a global partition table (GPT) data structure that is placed both at the beginning LBAs of the disk drive but also copied to the very last LBAs of the disk drive. The rationale for this copy of the GPT being placed at multiple portions of the disk drive is to provide a physically separate copy of the GPT should the primary GPT (which is located at the beginning LBAs of the disk drive) become corrupted or damaged. Obviously, this creates a significant problem for the PTDDC logical daisy-chain disk structure because in a variety of implementations as discussed in the incorporated patents and patent applications, a PTDDC chain of disk drives may have a logical size that is much larger than the actual physical storage in the chain, and there is no guarantee that physical storage exists at the end of the logical storage chain to accommodate the storage of the secondary (backup copy) NTFS GPT.

Within the NTFS file system and other ODS file systems there may be a variety of data structures such as the GPT that are spatially distributed within a given hard drive LBA data space in order to minimize the potential for a data corruption event that is unrecoverable. As an example, to support data recovery of the file system structure in the event of some forms of data corruption, the NTFS file system maintains copies of the GPT at both the BEGINNING of the LBA disk drive storage space and at the END of the LBA disk drive storage space. Furthermore, within each partition described within the GPT, the boot block for each partition (the FIRST LBA within the partition) is also replicated as the LAST LBA within the partition. In this manner, if the primary GPT is corrupted, it can be recovered from the secondary GPT copy that is stored at the end of the LBA address space for the disk drive. Similarly, if the primary boot block (at partition LBA offset 0) for a given partition is corrupted, it can be recovered from the last LBA within a given partition.

While the present invention will be discussed in terms of the MICROSOFT® NTFS GPT file structure, it is equally applicable to other file systems in which copies of critical ODS file system structures are stored on a disk drive. The present invention simply permits these file systems to coexist with an arbitrarily constructed PTDDC disk drive chain. As with other aspects of the PTDDC daisy-chain, the goal is to have the PTDDC hardware be transparently compatible with existing operating systems and their requirements for ODS organization.

Prior Art Limitations and Invention Objectives

It must be stressed in the discussion of the present invention that the prior art imposes a number of relatively severe limitations on handling disk drives that include:
- Prior art disk drive systems do not permit daisy-chaining of disk drive storage.
- Prior art disk drive systems do not permit logical concatenation of disk drive storage at the hardware level and require operating system software to accomplish this task.
- Prior art disk drive systems incorporate significant overhead in concatenating physical disk drive storage into a larger logical disk drive volume.
- Prior art disk drive systems such as the MICROSOFT® NTFS file system require that the GPT header be copied to the end of the LBA address space of a given disk drive volume.
- Prior art disk drive systems such as the MICROSOFT® NTFS file system require that the GPT table entries be copied at the end of the LBA address space of a given disk drive partition.
- Prior art disk drive systems incorporating spatially diverse critical file structures do not support a sparse disk drive address space.
- There is no current hardware or methodology available to logically concatenate a number of disk drives together yet allow for incremental increases in storage capacity without reformatting of critical data structures (CDS) within a storage array.

These limitations are inconsistent with the use of PTDDC daisy-chained logical disk volumes in some circumstances. It is the objective of the present invention to overcome these limitations by providing enhancements to the PTDDC architecture to support ODS file systems such as MICROSOFT® NTFS and others that incorporate spatially diverse critical ODS data structures within a logical disk volume.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addressed the deficiencies of the prior art in the following fashion and will be discussed in terms of a generic MICROSOFT® NTFS file system and a spatially diverse GPT data structure created by the NTFS file system. Since the primary GPT file structure is created at the BEGINNING of the LBA address space in the NTFS file system and also copied the END of the LBA address space as a precaution against corruption of the primary GPT, the present invention incorporates hardware logic implementing a mapping data structure that allows specific ranges of LBA addresses from the PTI/HBA interface of a PTDDC to be mapped to actual storage within a primary or secondary disk drive within a PTDDC chain that incorporates phantom storage. This spatially diverse data (SDD) may also be stored in non-volatile memory within the PTDDC controller itself.

As an example, PTDDC daisy-chain incorporating two 1 TB disk drives in a daisy-chain configuration may be configured with 1000 TB (1 PB) of virtual storage and thus have 2 TB of actual physical storage and 998 TB of phantom storage. Hardware logic within the PTDDC chain will provide actual physical storage for the low LBA addresses of the virtual address space and actual physical storage for the highest LBA addresses of the virtual address space on one or both of the 1 TB disk drives. This hardware mapping ensures that when the NTFS file system is created by the MICROSOFT® or other operating system that the secondary (backup) GPT can be created without incurring a write failure by the operating system. In this context, while the PTDDC chain only contains 2 TB of physical storage, the operating system may interact with the PTDDC daisy-chain as if it contained a full 1000 TB (1 PB) of actual storage. As far as the operating system is concerned, the disk drive hardware appears to have a 1000 TB (1 PB) of actual storage in which 2 TB is available and the remaining 998 TB is occupied by one or more RESERVED.SYS or other placeholder files within the file system that maps the phantom storage within the PTDDC chain. The operation of this hardware is transparent to read/write requests of the operating system and as such makes a PTDDC-enabled daisy-chain of disks compatible with spatially diverse data (SDD) structures used by ODS file systems such as NTFS and the like.

BRIEF DESCRIPTION OF THE DRAWINGS

For a fuller understanding of the advantages provided by the invention, reference should be made to the following detailed description together with the accompanying drawings wherein:

FIG. 17 illustrates NTFS volume statistics and NTFS GPT data formatting for an exemplary disk drive;

FIG. 18 illustrates a NTFS protective MBR data structure for an exemplary disk drive;

FIG. 19 illustrates a NTFS protective globally unique identifier (GUID) MBR sector dump for an exemplary disk drive;

FIG. 20 illustrates NTFS GPT header/entries data structures for an exemplary disk drive;

FIG. 21 illustrates NTFS GPT header raw sector data for an exemplary disk drive;

FIG. 22 illustrates NTFS GPT table entries raw sector data for an exemplary disk drive;

FIG. 23 illustrates NTFS backup GPT table entries raw sector data for an exemplary disk drive;

FIG. 24 illustrates NTFS backup GPT header raw sector data for an exemplary disk drive;

FIG. 63 illustrates a block diagram depicting a preferred exemplary invention system embodiment detailing a RAID hot spare (RHS) within a partial-RAID storage array using a PTDDC daisy-chain; and FIG. 64 illustrates a flowchart depicting a preferred exemplary invention method embodiment detailing a RAID hot spare (RHS) within a partial-RAID storage array using a PTDDC daisy-chain.

DESCRIPTION OF THE PRESENTLY PREFERRED EXEMPLARY EMBODIMENTS

Figure 1:
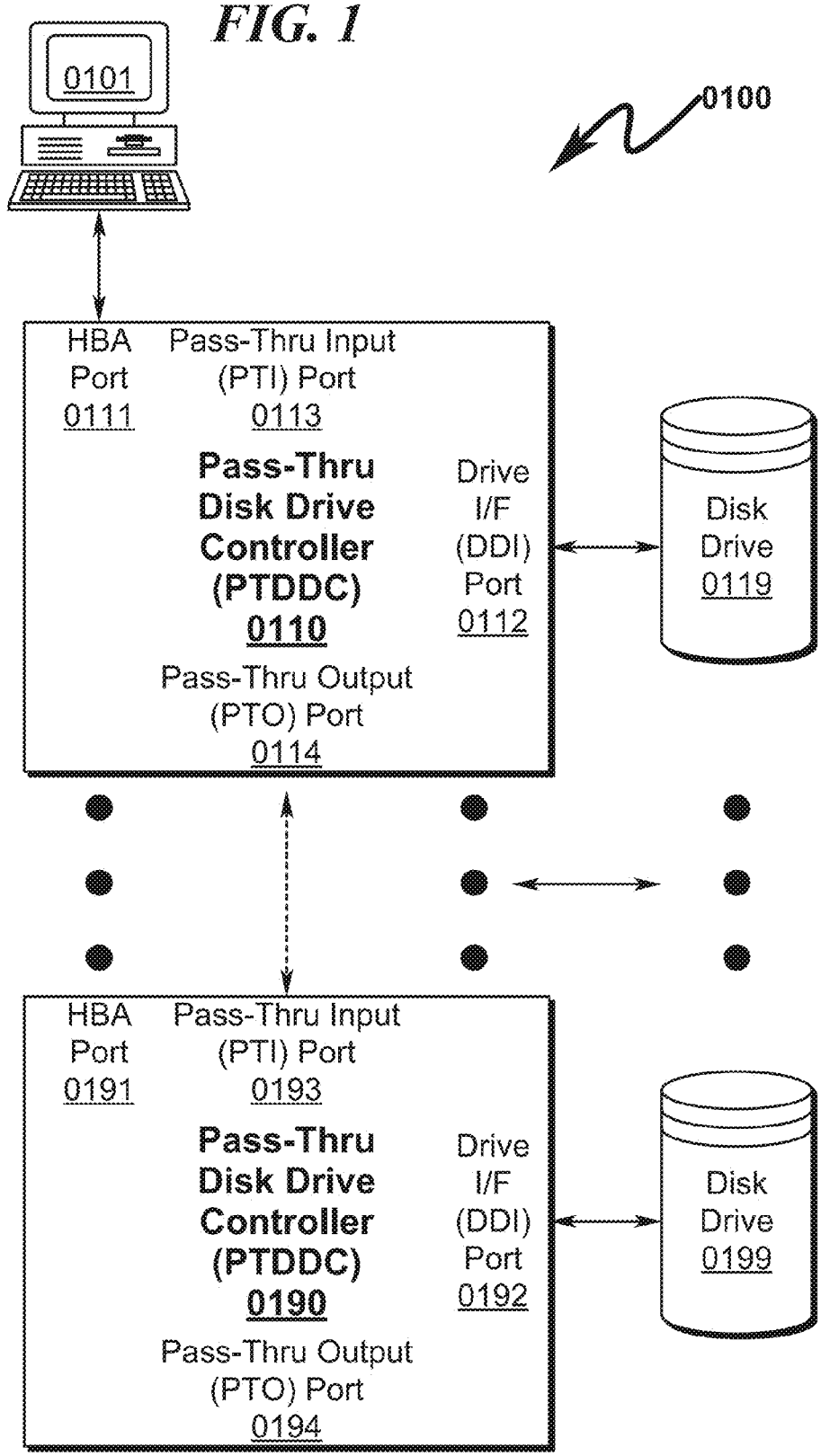
FIG. 1 illustrates a general system block diagram illustrating a preferred exemplary embodiment of a PTDDC daisy-chain incorporating HBA, PTI, PTO, and DDI SATA ports.
Figure 2:
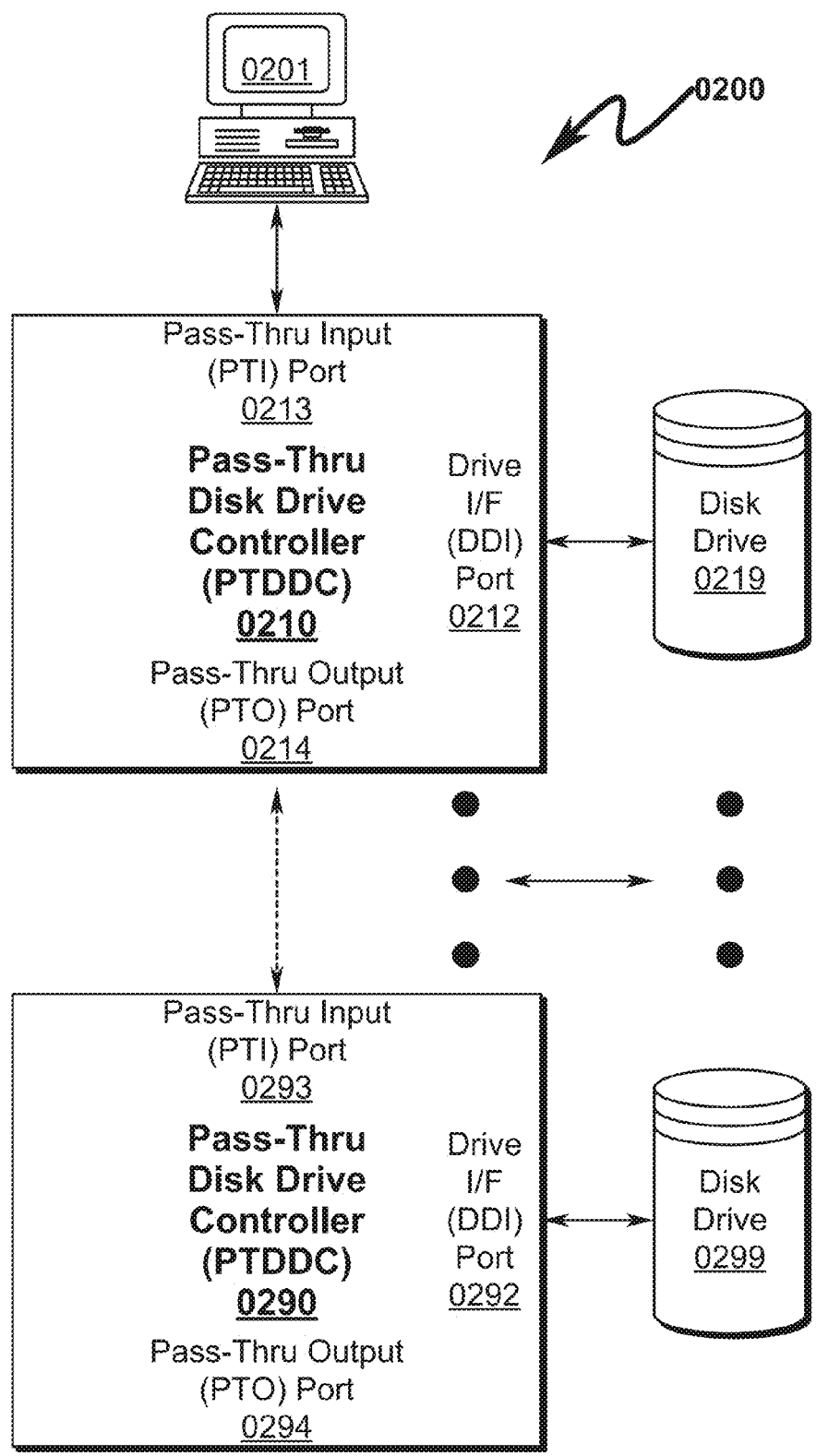
FIG. 2 illustrates a general system block diagram illustrating a preferred exemplary embodiment of a PTDDC daisy-chain incorporating PTI, PTO, and DDI SATA ports.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RAID HOT SPARE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Disk Drive not Limitive

Within the present application the term "disk drive" and its equivalents may relate to traditional spinning spindle platter-type disk drive storage as well as other forms of storage such as solid state disk drives. While the techniques taught by the present invention have high applicability to disk drives having a serial advanced technology attachment (SATA) interface, it is equally applicable to other disk drive interface types.

SATA Interface not Limitive

Within the present application the term "SATA interface" and its equivalents may relate a wide variety of SATA serial disk drive interfaces. Variants of the SATA interface include 1.5 Gb/s (SATA 1.0), 3 Gb/s (SATA 2.0), 6 Gb/s (SATA 3.0), 16 Gb/s (SATA 3.2) and other speed variants, but may also include variants such as SATAe (SATA EXPRESS). Generally speaking, a SATA interface in this context may be any serially attached disk drive interface.

SATA Mechanical Interface not Limitive

While the exemplary invention embodiments depicted herein may utilize standard SATA mechanical dimensions for power and/or signal connectors, the present invention is not limited to these particular mechanical examples, and may include a variety of other SATA mechanical interfaces including mini and micro style connectors. Appropriate scaling of the mechanical examples provided herein is within the expertise of one of ordinary skill in the electrical/mechanical arts.

HBA/DDI Port not Limitive

The present invention may be applied to a wide variety of disk drive storage systems incorporating a wide variety of host bus adapter (HBA) and disk drive interface (DDI) physical hardware interfaces. While many preferred embodiments may be configured wherein the HBA and DDI are of the same type of physical hardware interface, the present invention is not limited to this configuration, and the HBA and DDI may be of any disparate type of hardware interface.

PTI/PTO Port not Limitive

The present invention may be advantageously configured in some situations where the pass-thru input (PTI) port and pass-thru output (PTO) port are of the same hardware configuration as the HBA interface, but the present invention does not require this conformity.

Host Bus Adapter (HBA) not Limitive

The present invention may be applied to a wide variety of disk drive storage systems incorporating a wide variety of host bus adapter (HBA) interfaces. Generally speaking, the HBA interface may vary widely among current disk drive subsystems as well as enhancements and/or replacements to these interfaces that may occur in the future. The present invention, while suitable for many current and future HBA interfaces, is particularly suitable for implementation using parallel ATA (PATA/PATAPI) (also identified as IDE/EIDE), serial ATA (SATA/SATAPI/eSATA/microSATA), Fibre Channel, Serial Storage Architecture (SSA), and universal serial bus (USB) interfaces. Thus, the present invention, while not limiting the scope of the HBA used with the system, may be implemented in some preferred exemplary embodiments using one or more of the HBA interfaces listed.

Many preferred exemplary embodiments utilize the serial ATA (SATA) disk drive interface standard. This standard, available from the Serial ATA International Organization (www.sata-io.org), is hereby incorporated by reference in this document.

File System not Limitive

Many preferred exemplary embodiments of the present invention may incorporate an on-disk file system (ODS) that is compatible with a particular operating system running on the host computer system to which the HBA port of the PTDDC is connected. While the present invention makes no limitation on the on-disk file system which may be implemented on a logical storage system comprising a daisy-chained series of PTDDC controllers (and their associated attached disk drives), the present invention does specifically anticipate that many preferred exemplary embodiments may implement an on-disk file structure selected from a group consisting of EXT2, EXT3, EXT4, FAT12, FAT16, FAT32, Files-11 (ODS), HFS, HFS Plus (HFS+), NTFS, and XFS.

Within this context, the present invention prefers several file systems, the table below specifying those known to be preferred at this time:

| FILE SYSTEM | MAXIMUM FILE SIZE | MAXIMUM VOLUME SIZE |
|---|---|---|
| exFAT | 127 PiB | 64 ZiB, 512 TiB |
| NTFS | 16 EiB | 16 EiB |
| HFS Plus | 8 EiB | 8 EiB |
| FFS | 8 ZiB | 8 ZiB |
| UFS1 | 226 TiB | 226 TiB |
| UFS2 | 32 PiB | 1 YiB |
| ext2 | 2 TiB | 32 TiB |
| ext3 | 2 TiB | 32 TiB |
| ext4 | 16 TiB | 1 EiB |
| Lustre | 320 TiB (on ext4) | 1 YiB-10 PB |
| GPFS | 512 YiB | 512 YiB (4 PiB tested) |
| GFS | 8 EiB | 8 EiB |
| ReiserFS | 2 GB-8 TiB | 16 TiB |
| NILFS | 8 EiB | 8 EiB |
| Reiser4 | 8 TiB on x86 | Unknown |
| XFS | 8 EiB | 8 EiB |
| JFS1 | 8 EiB | 4 PiB |
| JFS | 4 PiB | 32 PiB |
| QFS | 16 EiB | 4 PiB |
| BFS | 260 GiB | 2 EiB |
| VxFS | 256 TiB | 256 TiB |
| UDF | 16 EiB | Unknown |
| ZFS | 16 EiB | 16 EiB |
| VMFS2 | 4 TiB | 64 TiB |
| VMFS3 | 2 TiB | 64 TiB |
| HAMMER | Unknown | 1 EiB |
| Btrfs | 16 EiB | 16 EiB |
| LEAN | 8 EiB | 8 EiB |

While the present invention is preferably applied to MICROSOFT® and APPLE® file systems, the teachings of the present invention are not limited to these file systems.

Generally speaking, most commonly used file systems today utilize some form of spatially diverse data (SDD) that is located at specific sectors within the LBA address space of the disk drive on which the ODS is resident. The present invention works with any such LBA-specific requirement to allow these ODS variants to work with PTDDC-enabled daisy-chains of disk drives comprising a virtual address space that may only be partially filled with physical storage. Within this context, the present invention while specifically useful in the above ODS formats (and especially in the case of NTFS, exFAT, and APPLE® ODS formats), is ODS agnostic in its application scope.

RAID not Limitive

Many examples provided herein illustrate the use of RAID-1 as an exemplary implementation of Redundant Array of Independent Disks. While the present invention is advantageously implemented using this form of RAID, the present invention is not limited to this particular form of RAID and other forms of RAID may be equivalently implemented within these discussions of RAID-1.

Operating System Independence

A significant detriment to NFS and other attached storage systems that are managed by internal operating systems is that the on-disk file structure created by these specialized NFS systems often does not match that of the native file system used by the operating system on the host computer using the NFS system for data storage. Specialized features within the host operating system on-disk file system may or may not have equivalent mappings to the on-disk file system supported by the NFS.

The present invention, by making the logical PTDDC daisy-chained disk drives appear as one logical disk drive with a standard host HBA interface permits the native operating system to format/partition/initialize an on-disk file system that has all the native capabilities supported by the host operating system. For this reason the system is extremely efficient with respect to the on-disk file system implementation in that no abstraction layers or file system translators are necessary to interface to the host operating system.

While the present invention is preferably applied to MICROSOFT® and APPLE® file systems, the teachings of the present invention are not limited to these file systems.

Compatibility with Port Multipliers/Port Selectors

The present invention as exemplified by the PTDDC SDD remapping concept is totally compatible with existing port multiplier/port selector techniques described in the SATA specification. This compatibility permits rapid integration of the present invention into "cloud" computing environments where vast arrays of data storage are implemented for the support of a plethora of computers and associated computer users. The advantage of the present invention as implemented in these environments is a significant cost reduction in overall data storage costs at the enterprise level as compared to the prior art and detailed below.

PTDDC Phantom Storage (0900)-(1000)

Phantom Storage—RESERVED.SYS File (0900)

Figure 9:
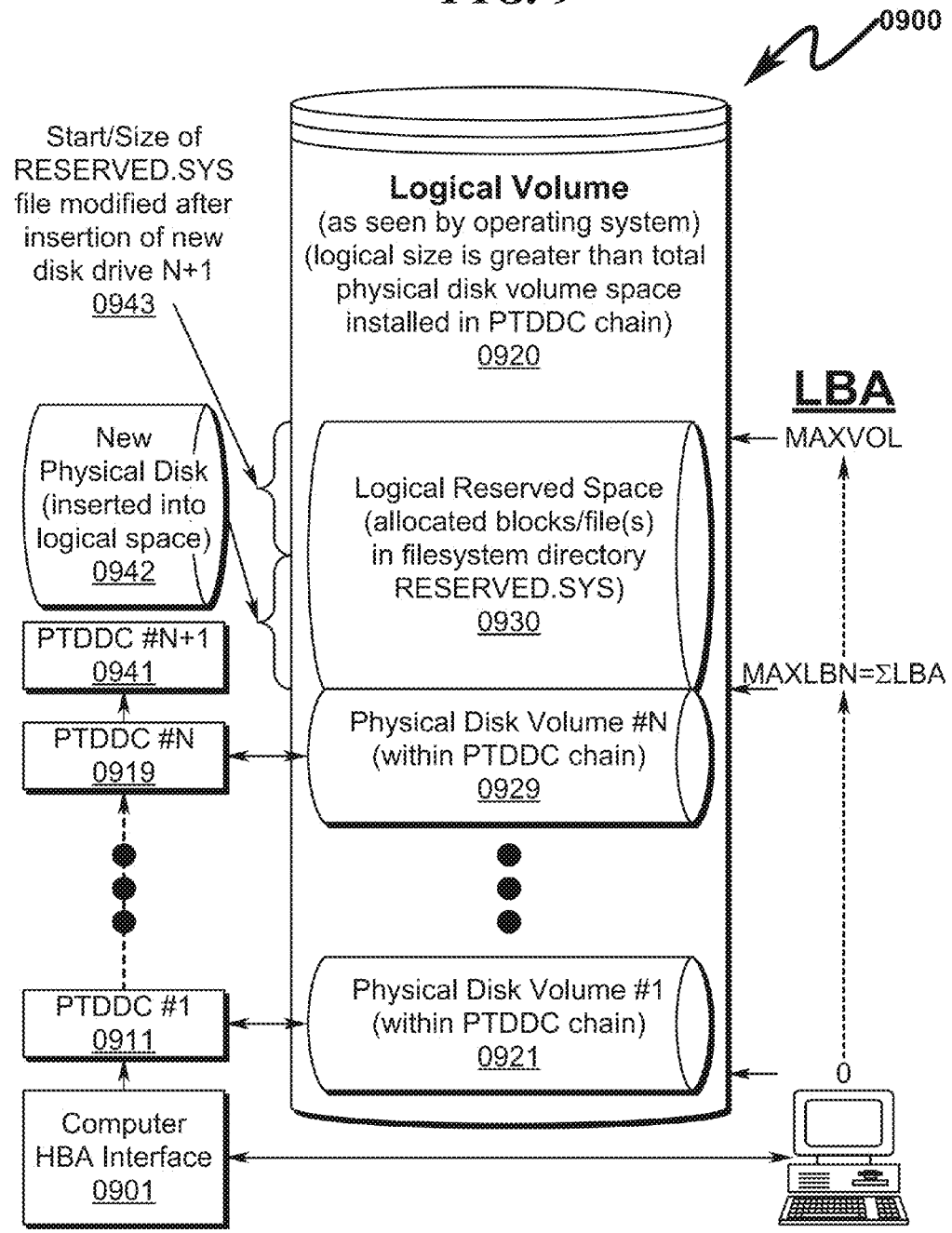
FIG. 9 illustrates the use of RESERVED file allocation within some preferred exemplary embodiments of the present invention that utilize logical volume sizing that is greater than physical volume sizing.

Configuration registers within the PTDDC as described herein may give the appearance of much larger logical address space than is physically present within the disk drive string. As additional disk drives are added to the disk drive string, the file structure within the system may be adjusted as described in U.S. Pat. No. 8,799,523 (and generally depicted in FIG. 9 (0900)) that has been incorporated within this specification by reference.

This free space extension is accomplished by the PTDDC misinforming via the first SATA HBA or PTI interface of the actual size of its physical LBA address space. For example, an initial PTDDC may inform the host computer system (HCS) via the initial HBA or PTI interface that the disk drive string has a capacity of 100 TB, when in fact there may only be one or two 1 TB disk drives contained within the daisy-chain. The host operating system (HCS) is prevented from accessing/utilizing the "phantom" storage by incorporating a RESERVED.SYS (0930) or other file within the file system placed on the disk drive chain. This RESERVED.SYS file allocates all the LBAs within the "phantom" address space. As additional SATA disk drives are attached to the daisy-chain, the portion of the RESERVED.SYS file that maps the newly added drives is released to the operating system by reducing the size of the RESERVED.SYS file. This may be accomplished by adjusting the starting LBA pointer for the RESERVED.SYS file to a larger LBA starting address. This essentially frees up the space before the RESERVED.SYS file for use by the operating system.

Multiple RESERVED.SYS Files (1000)

Figure 10:
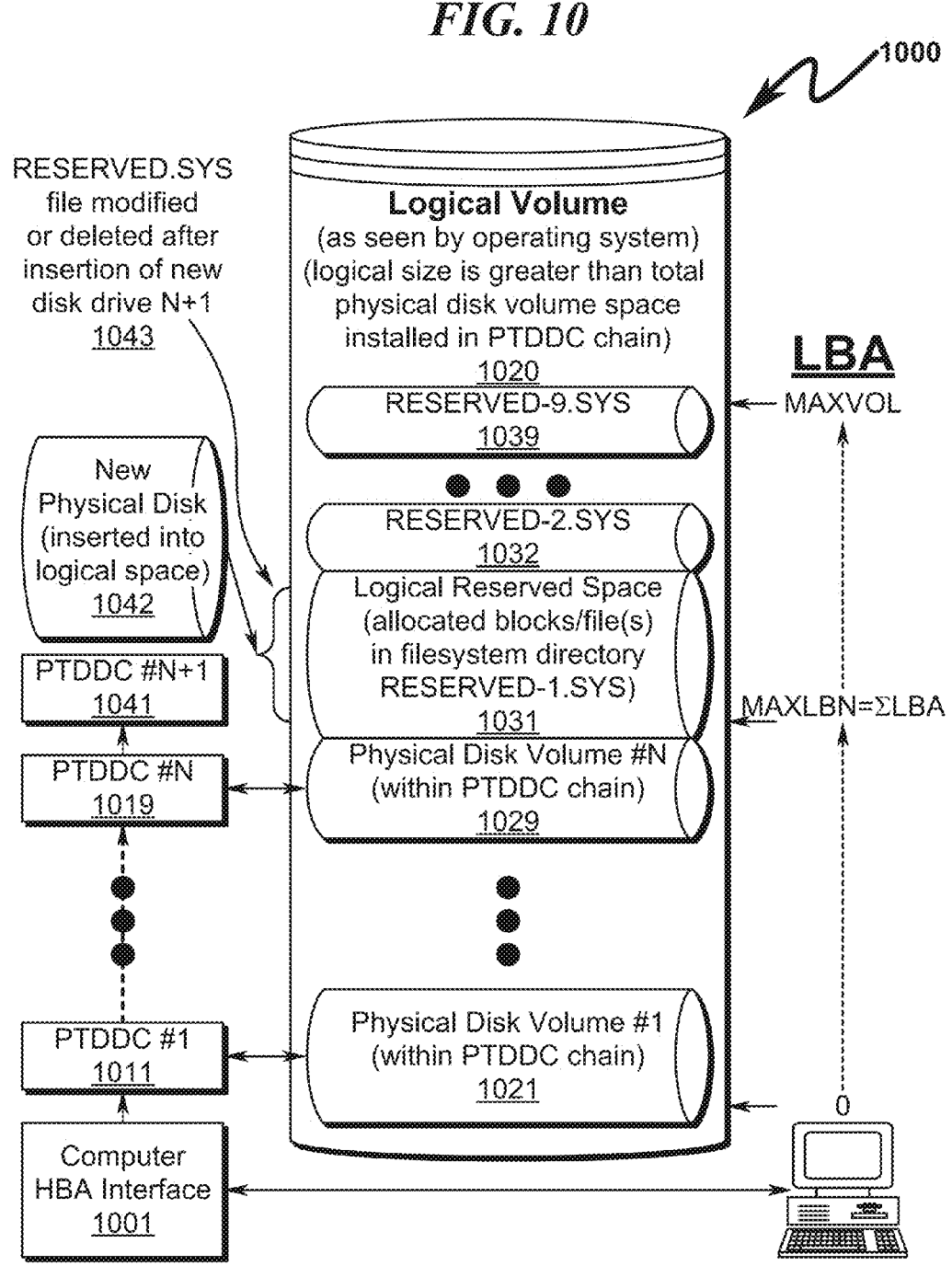
FIG. 10 illustrates the use of multiple RESERVED file allocations within some preferred exemplary embodiments of the present invention that utilize logical volume sizing that is greater than physical volume sizing.

As generally depicted in FIG. 10 (1000), the RESERVED.SYS file allocation methodology also permits the use of multiple RESERVED.SYS files to provide for easy incremental increases in storage capacity. For example, a 1000 TB system may be configured with two 1 TB drives and 998 1 TB RESERVED.SYS files (RESERVED-0003.SYS to RESERVED-1000.SYS) that are not available for write by the operating system. The addition of an additional 1 TB drive to the system would then allow the RESERVED-003.SYS file to be deleted and the subsequent mapping of the newly added disk drive in the PTDDC-enabled daisy-chain to be mapped just after the first two 1 TB disk drives in the address map. This technique permits more rapid addition of drives with less OS intervention in some circumstances than compared with a single RESERVED.SYS file structure that must be trimmed at its beginning LBA start address.

In the example provided, an initial RESERVED-1.SYS file (1031) may be modified or deleted when an additional disk drive (1042) is added to the daisy-chain, leaving remaining RESERVED-2.SYS (1032) through RESERVED-9.SYS (1039) files for later modification/deletion should addition physical storage be added to the daisy-chain. The size and number of RESERVED.SYS files in this configuration is determined by application context.

Phantom Storage—RESERVED Partition (1100)

Figure 11:
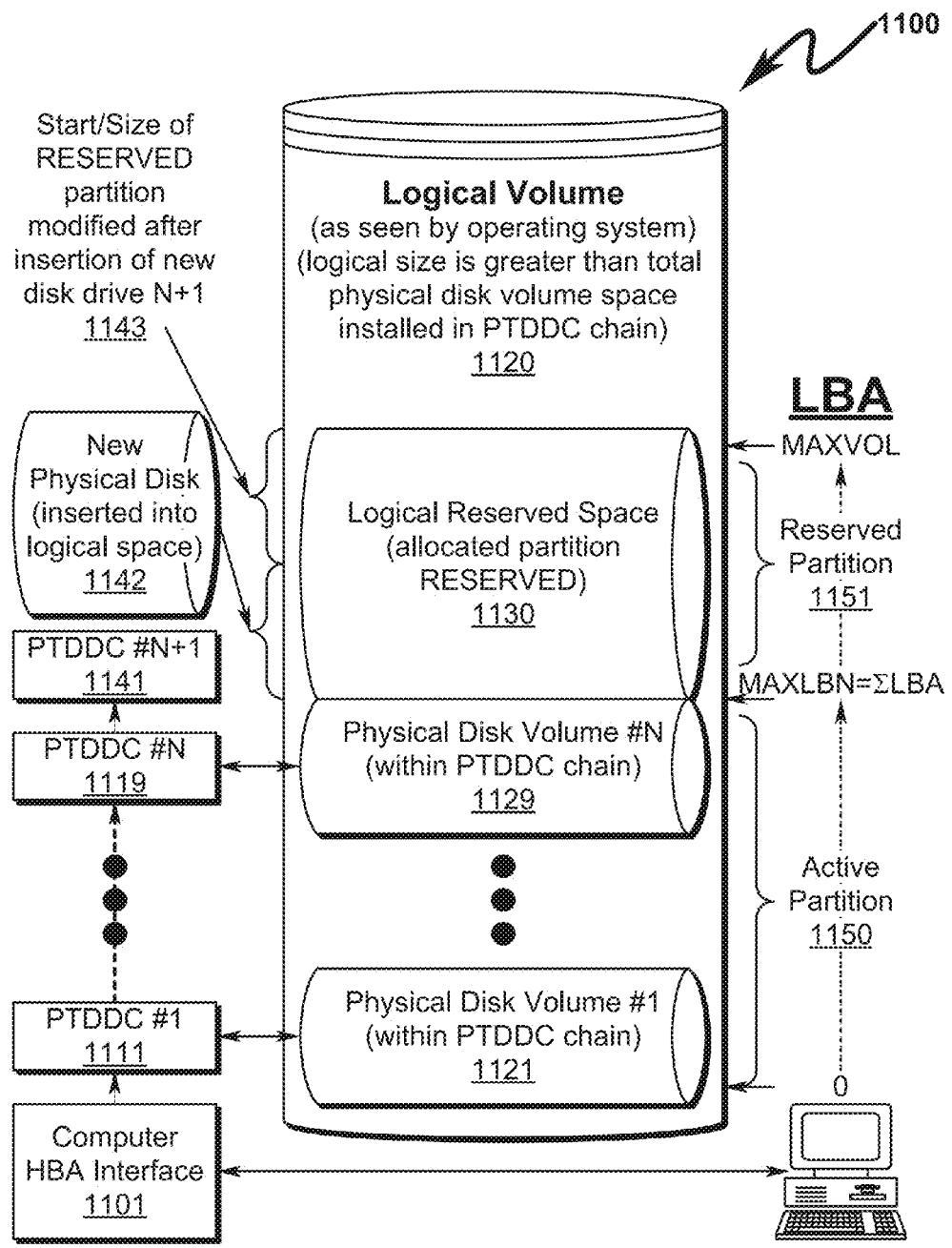
FIG. 11 illustrates the use of RESERVED partition allocation within some preferred exemplary embodiments of the present invention that utilize logical volume sizing that is greater than physical volume sizing.

The concept of a RESERVED.SYS file to preallocate non-physical storage in the PTDDC daisy-chain (that may be later filled with physical storage) may be extended to the use of a RESERVED partition within the ODS structure of the disk drive. FIG. 11 (1100) depicts a scenario in which a first ACTIVE partition (1150) is allocated to physical storage in the PTDDC daisy-chain and a second RESERVED partition (1151) is allocated to non-physical storage in the PTDDC daisy-chain. As storage (1142) is added to the daisy-chain, the size and position of the ACTIVE partition (1150) and RESERVED partition (1151) are adjusted to account for the added storage (1142) to the daisy-chain.

Multiple RESERVED Partitions (1200)

Figure 7:
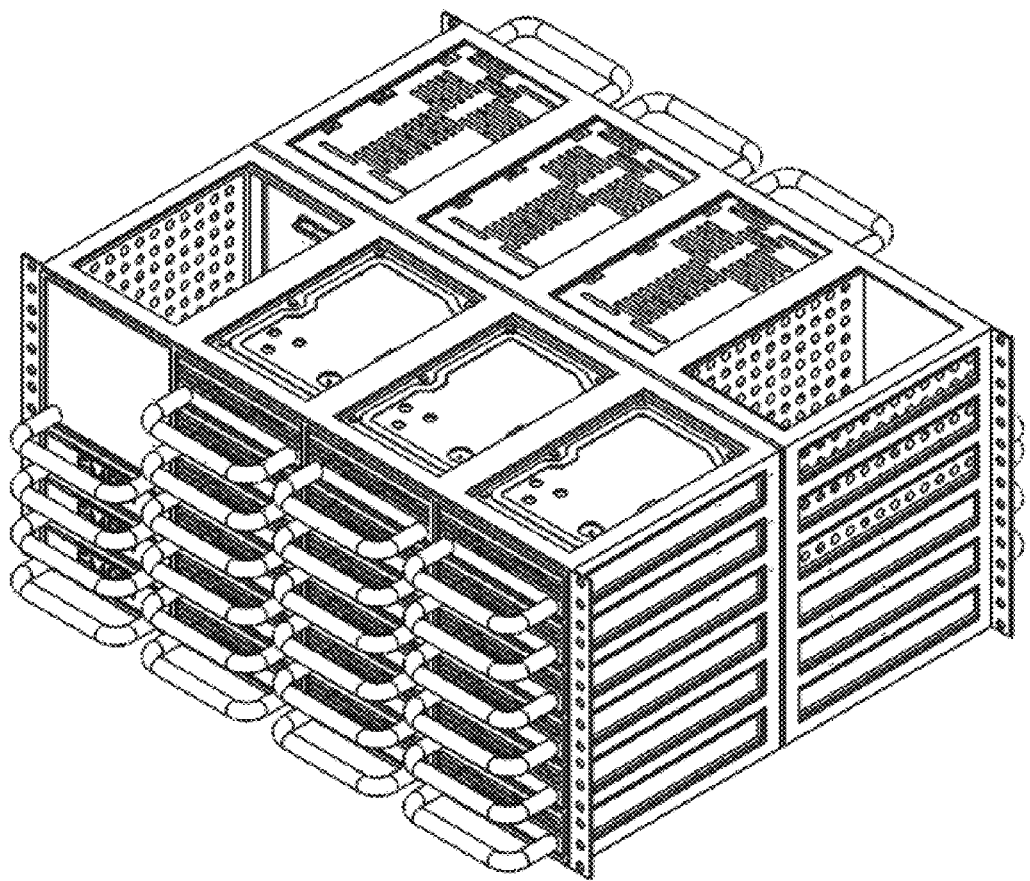
FIG. 7 illustrates a populated storage system implementing a large-scale petabyte-class PTDDC daisy-chain.
Figure 8:
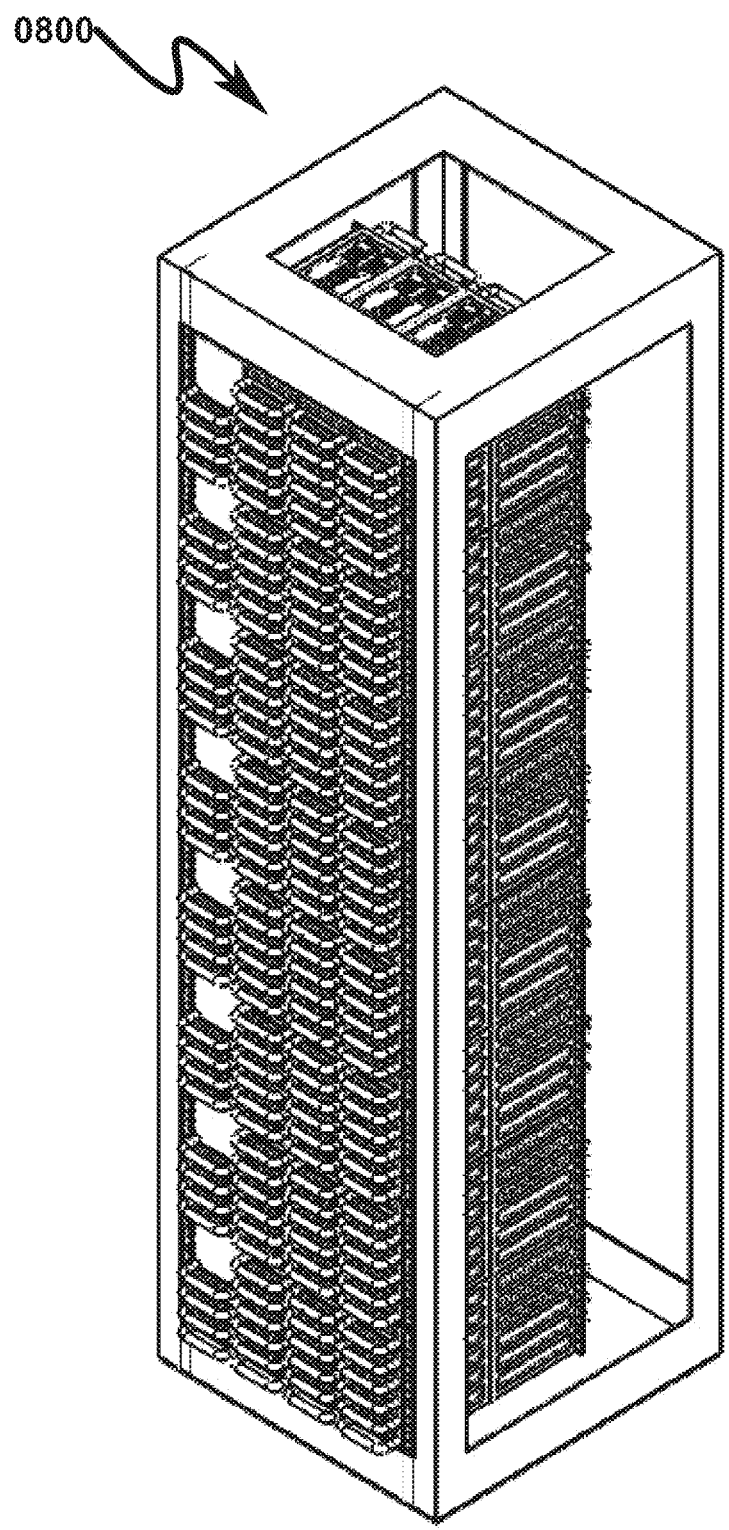
FIG. 8 illustrates the use of RESERVED file allocation within some preferred exemplary embodiments of the present invention that utilize logical volume sizing that is greater than physical volume sizing.
Figure 12:
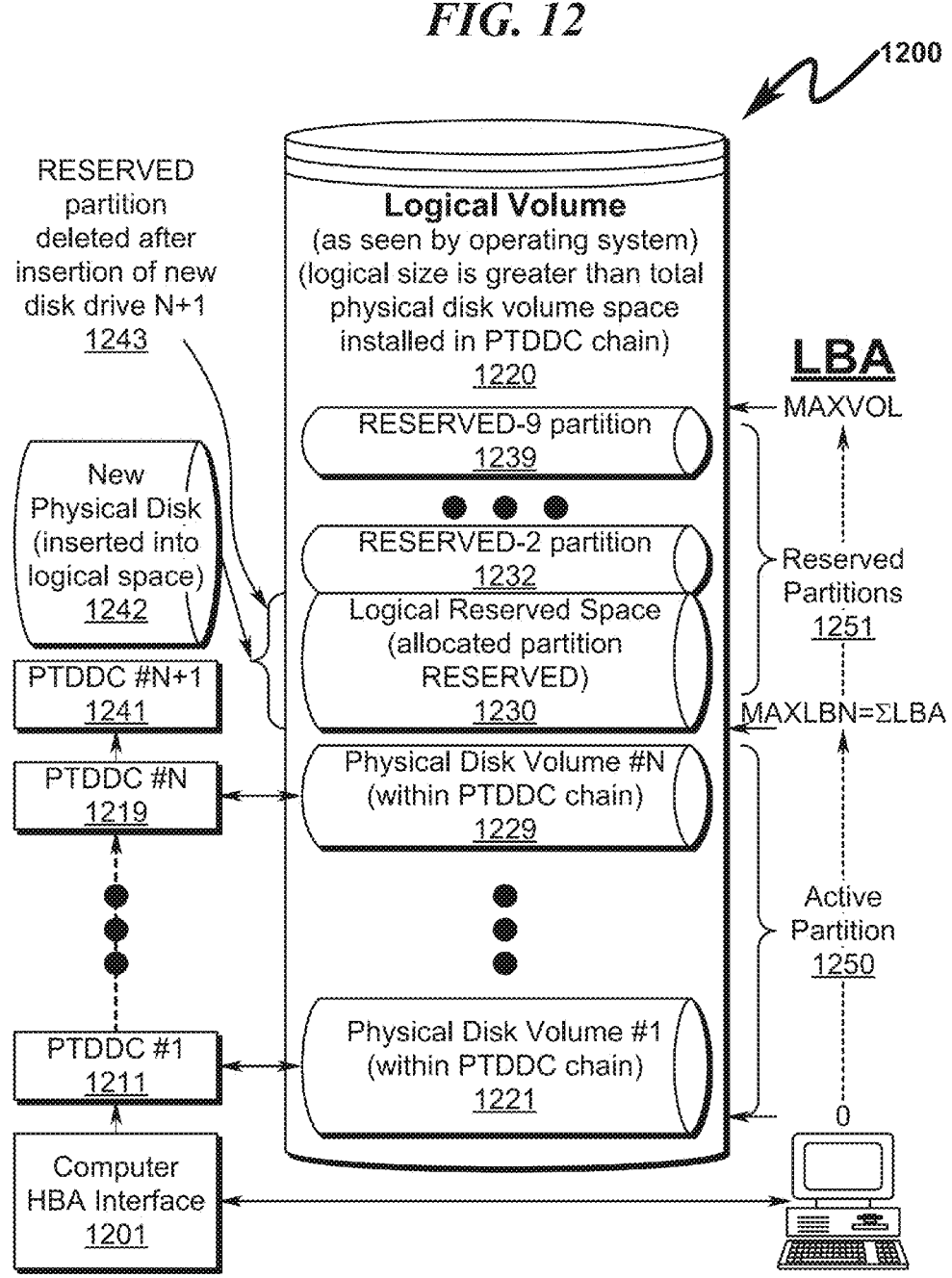
FIG. 12 illustrates the use of multiple RESERVED partition allocation within some preferred exemplary embodiments of the present invention that utilize logical volume sizing that is greater than physical volume sizing.

As generally depicted in FIG. 12 (1200), the RESERVED partition concept can be extended to incorporate multiple reserved partitions (1230, 1232, 1239). In this configuration the ACTIVE/RESERVED partitions may be adjusted in size or deleted depending on the size of the inserted disk storage (1242). Since NTFS provides for up to 128 partitions in current implementations, the ability to divide the logical address space into uniform segments provides the ability to swap out failed portions of the storage array with backup drives without the need for extensive data copy operations that would normally be associated with a data recovery operation. This also allows increasing the overall size of the storage array in blocks larger than one disk drive, such as the addition of a storage rack as depicted in FIG. 7 (0700) that may represent the size of a RESERVED partition in the overall storage array.

LBA Logical-to-Physical Mapping Configuration (1300, 1400)

Figure 13:
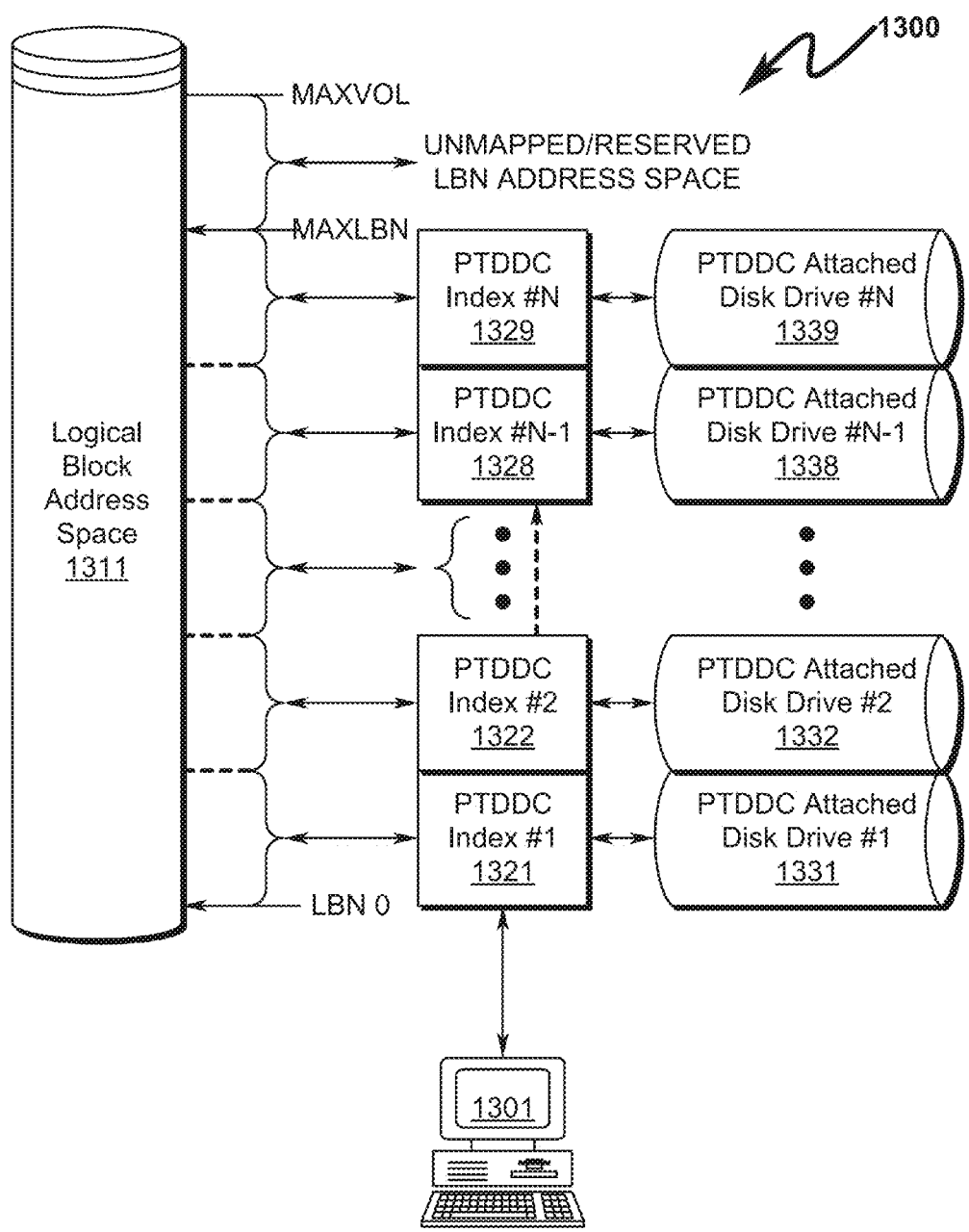
FIG. 13 illustrates an exemplary embodiment of the present invention wherein LBA logical-to-physical mapping occurs sequentially with respect to PTDDC-attached disk drives.

The present invention anticipates a variety of methodologies may be used to provide LBA logical-to-physical mapping from a logical volume request to the physical mapping of PTDDC connected physical disk drives. As previously depicted in FIG. 9 (0900)-FIG. 14 (1400) and generally illustrated in FIG. 13 (1300), LBAs may be mapped contiguously starting from the first LBA of the first PTDDC attached disk drive as seen from the computer system (1301).

Figure 14:
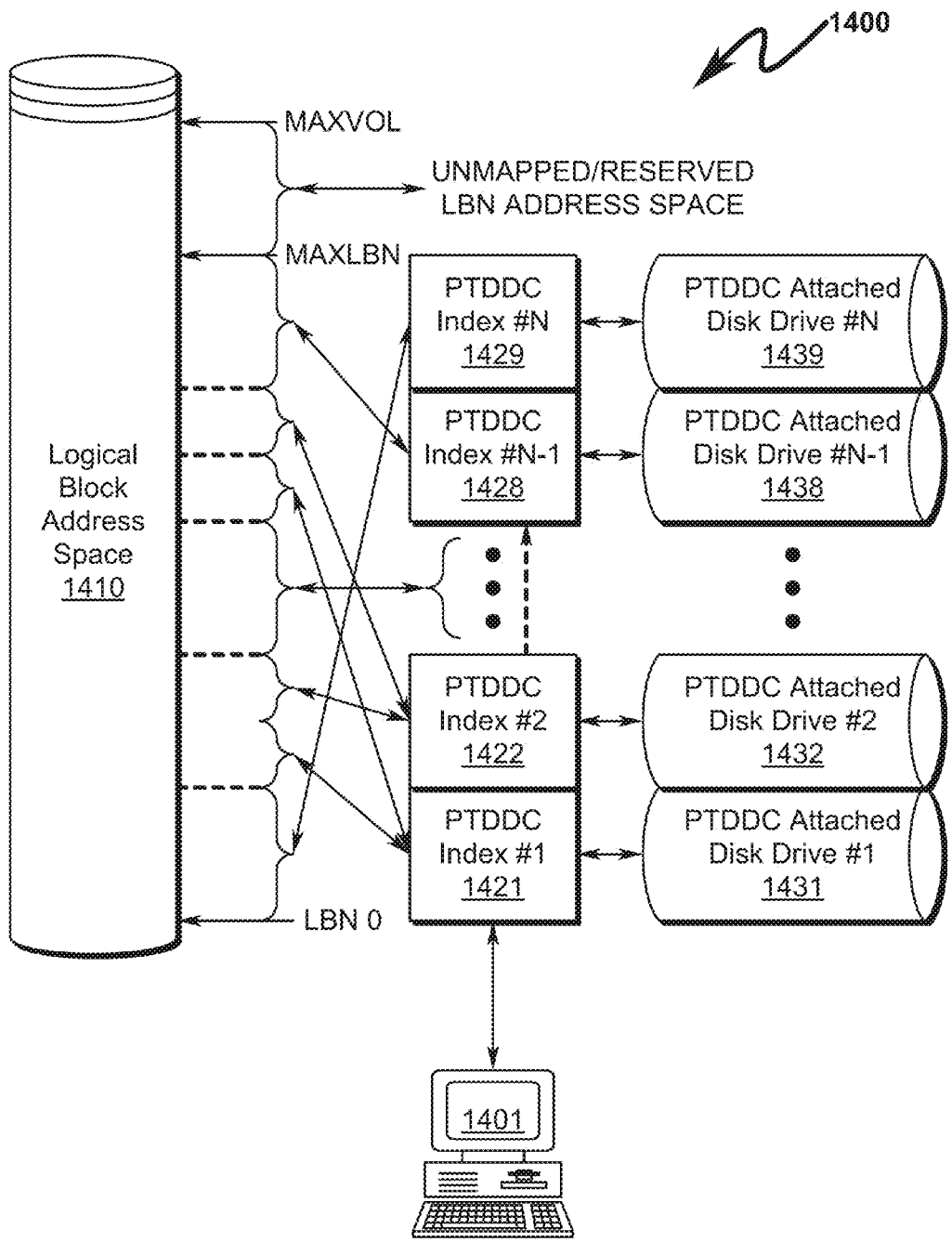
FIG. 14 illustrates an exemplary embodiment of the present invention wherein LBA logical-to-physical mapping occurs non-sequentially with respect to PTDDC-attached disk drives.

However, as generally illustrated in FIG. 14 (1400), LBAs may be mapped non-contiguously wherein the LBA range of a given PTDDC attached disk drive is arbitrarily mapped into the logical address space of the logical drive as seen from the computer system (1401). This approach is more general and permits the greatest flexibility in the physical arrangement of disk drives within a storage array comprising chained PTDDCs. This approach also permits reconfiguration of the array in situations where a failing RAID drive is to be replaced by logically remapping a spare drive within the PTDDC chain to become the mirror drive for another drive within the PTDDC chain.

Furthermore, as generally illustrated in FIG. 14 (1400), a given disk drive (1431, 1432) that is attached to a chained PTDDC (1421, 1422) may have non-contiguous and segmented mapping into the logical address space of the logical block address space (1410). This permits, for example, replacement of a 1-TB disk drive with a 2-TB disk drive such that the first 1-TB of the replacement drive is mapped to the original 1-TB logical address space consumed by the original disk drive, with the remaining 1-TB address space of the 2-TB disk drive mapped somewhere else in the logical block address space (1410). This illustrates the concept that the PTDDC may contain multiple LBA mapping windows into the logical block address space (1410) for a given PTDDC-attached disk drive. This fact is important to keep in mind when interpreting the LBA mapping address comparators detailed elsewhere in this document, as it should be understood that these LBA address comparators may operate on a multiple number of windows into the logical block address space (1410) for a given PTDDC-attached disk drive.

Exemplary NTFS File Structure (1500)

Figure 15:
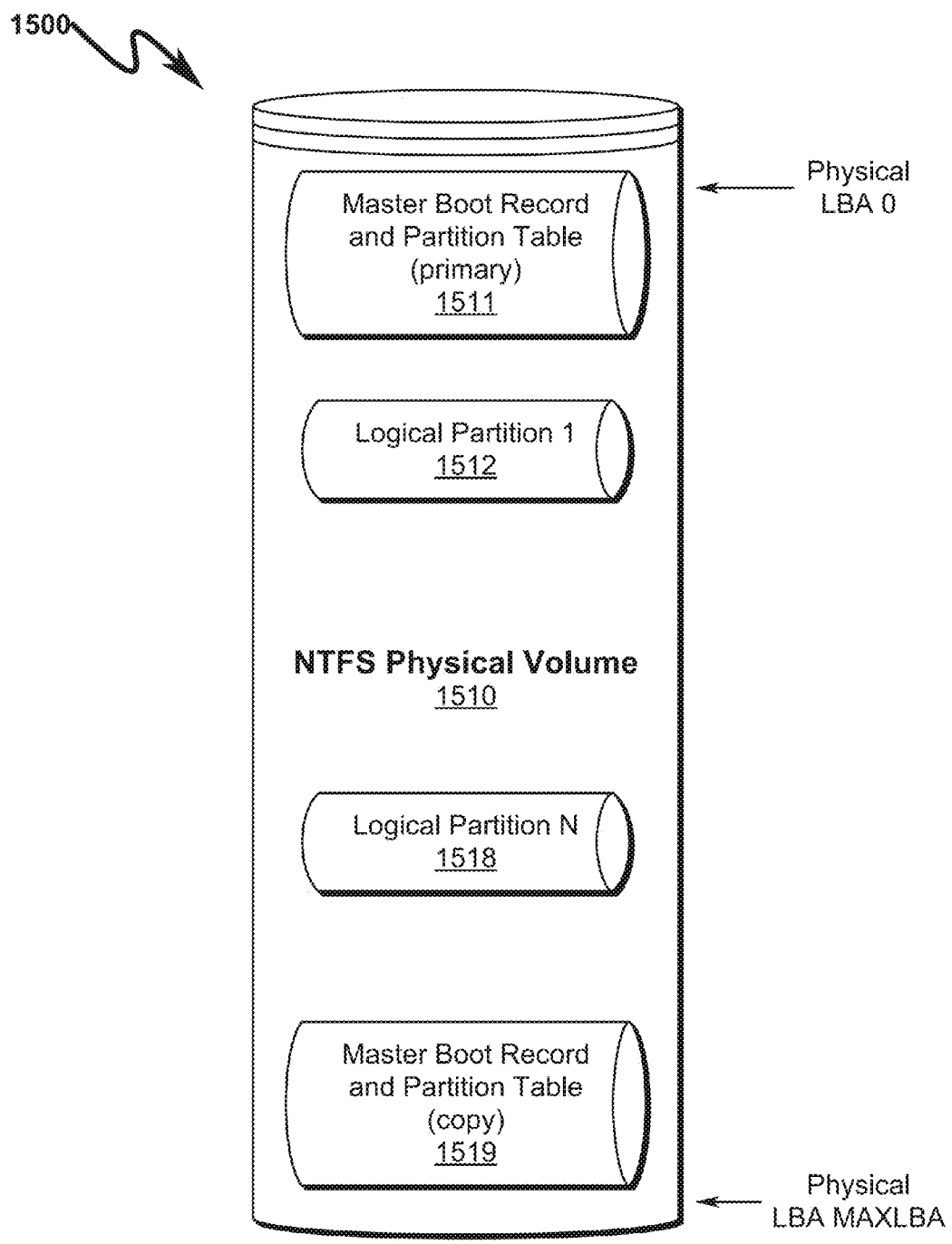
FIG. 15 illustrates an exemplary NTFS volume structure overview.

While the present invention is amenable to implementation on a wide variety of ODS file structures, the MICROSOFT® WINDOWS® NTFS file structure is one that has particular commercial applicability. As generally depicted in FIG. 15 (1500), the NTFS file system maps to a physical disk drive by partitioning the physical volume (1500) into files that are grouped as a primary master boot record (MBR) (in conjunction with a partition table), a number of logical disk partitions (1512, 1518), followed by a secondary copy of the partition header and table backup (1519).

Note that the physical placement of the primary MBR and secondary GPT are hardcoded within the NTFS file system and are intimately tied to the physical structure of the disk drive as reported to the operating system by the disk drive hardware configuration registers. Based on the reported drive size (maximum LBA count), the operating system automatically places the secondary GPT at the END of the disk drive LBA space.

Exemplar NTFS LBA Content (1600)

Protective MBR (1610)

Figure 16:
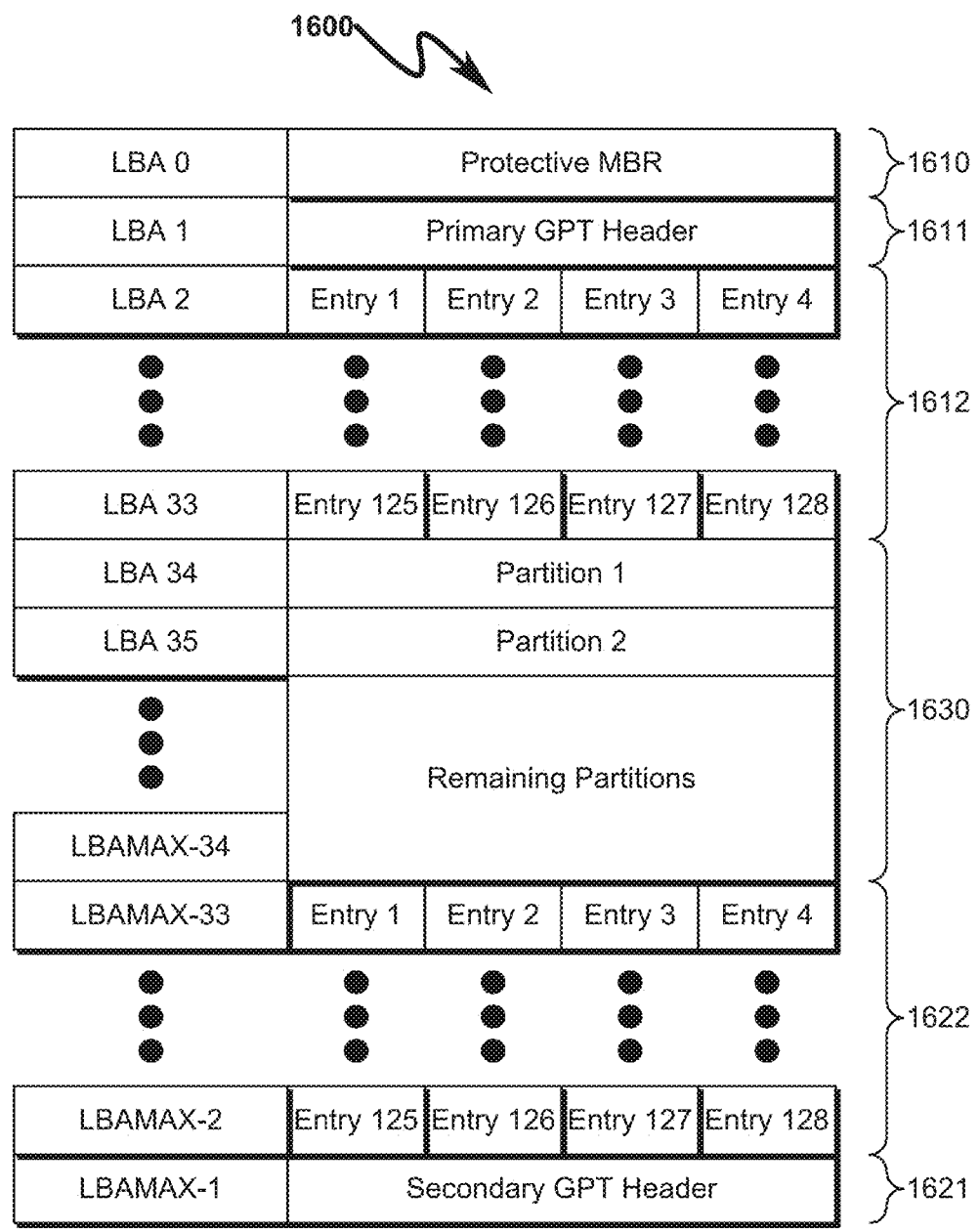
FIG. 16 illustrates an exemplary NTFS volume data structure placement map.

A typical implementation of the NTFS LBA content is depicted in FIG. 16 (1600). Here the first physical logical block (LBA 0) (1610) contains a "protective MBR" that is compatible with older operating systems that do not support NTFS file structures.

The Protective Master Boot Record (MBR), beginning in sector 0 (LBA 0), precedes the globally unique identifier (GUID) Partition Table partition table (GPT) on the NTFS disk. The MBR contains one type 0xEE partition that spans the entire length of the disk. This is the same regardless of the number of partitions that are defined in the GUID Partition Table disk entry array.

Historically, a master boot record (MBR) is a special type of boot sector at the very beginning of partitioned computer mass storage devices like fixed disks or removable drives intended for use with IBM PC-compatible systems and beyond. The concept of MBRs was publicly introduced in 1983 with PC DOS V2.0.

The MBR holds the information on how the logical partitions, containing file systems, are organized on that medium. Besides that, the MBR also contains executable code to function as a loader for the installed operating system (usually by passing control over to the loader's second stage, or in conjunction with each partition's volume boot record (VBR)). This MBR code is usually referred to as a boot loader.

The organization of the partition table in the MBR limits the maximum addressable storage space of a disk to 2 TB ($2^{32} \times 512$ bytes). Therefore, the MBR-based partitioning scheme is in the process of being superseded by the GUID Partition Table (GPT) scheme in computers constructed in the last decade. A GPT can coexist with an MBR in order to provide some limited form of backward compatibility for older systems.

The widespread use of the MBR partitioning scheme (dating from the early 1980s) imposed limitations that affect the use of modern computer hardware. One of the main limitations is the usage of 32 bits for storing block addresses and quantity information. For hard disks with 512-byte sectors, the MBR partition table entries allow up to a maximum of 2 TB ($2^{32} \times 512$ bytes).

Intel developed a new partition table format in the late 1990s as part of what eventually became UEFI. The UEFI (Unified Extensible Firmware Interface) is a standard firmware interface for PCs, designed to replace BIOS (basic input/output system). This standard was created by over 140 technology companies as part of the UEFI consortium, including Microsoft.

As of 2010, the GPT forms a subset of the UEFI specification. The GPT allocates 64 bits for logical block addresses, therefore allowing a maximum disk size of 264 sectors. For disks with 512-byte sectors, the maximum size is 9.4 ZB (9.4×1021 bytes) or 8 ZiB (9,444,732,965,739, 290,427,392 bytes, coming from 16,446,744,073,709,551, 616 ($2^{64}$) sectors×512 ($2^9$) bytes per sector).

Primary GPT Header (1611) and Secondary GPT Header (1621)

As depicted in FIG. 16 (1600), the NTFS file system incorporates a primary GPT header (1611) and a copy of this that is stored at the end of the physical volume as a secondary GPT header (1621). These data structures are replicated in a spatially diverse fashion such that if the primary GPT header (1611) is damaged or corrupted then the secondary GPT header (1621) may be retrieved so as to recover data on the disk volume.

Primary Partition Table (1612) and Secondary Partition Table (1622)

As depicted in FIG. 16 (1600), the NTFS file system incorporates a primary GPT partition table (1612) and a copy of this that is stored at the end of the physical volume as a secondary GPT partition table (1622). These data structures are replicated in a spatially diverse fashion such that if the primary GPT partition table (1612) is damaged or corrupted then the secondary GPT header (1622) may be retrieved so as to recover data on the disk volume. Each entry in the partition table is 128 bytes long.

Exemplary NTFS Data Structures (1700)-(2400)

As an aid to understanding the remapping features of the present invention, an exemplary NTFS disk structure is depicted in FIG. 17 (1700)-FIG. 24 (2400). As depicted in FIG. 17 (1700), exemplary NTFS volume statistics and an exemplary NTFS GPT data formatting outline are provided to summarize the data structures and their placement in a typical 3 TB disk drive having 5,860,533,168 sectors (3,000, 592,982,016 bytes) of storage. This example can scale to any of the PTDDC-enabled daisy-chained disk drive configurations described herein.

Generally speaking, the example provides NTFS parameters in the WINDOWS® NTFS informational dump for a newly formatted disk drive in FIG. 17 (1700). The disk volume is indicated as being approximately 3 TB in size with 4096-byte clusters. Note that while WINDOWS® operating systems will typically only format a GPT in drives larger than 2 TB, there is no intrinsic limitation on implementing a NTFS file systems in drives 2 TB or below where a traditional MBR boot block and four-entry partition table are typically used.

Figure 19:
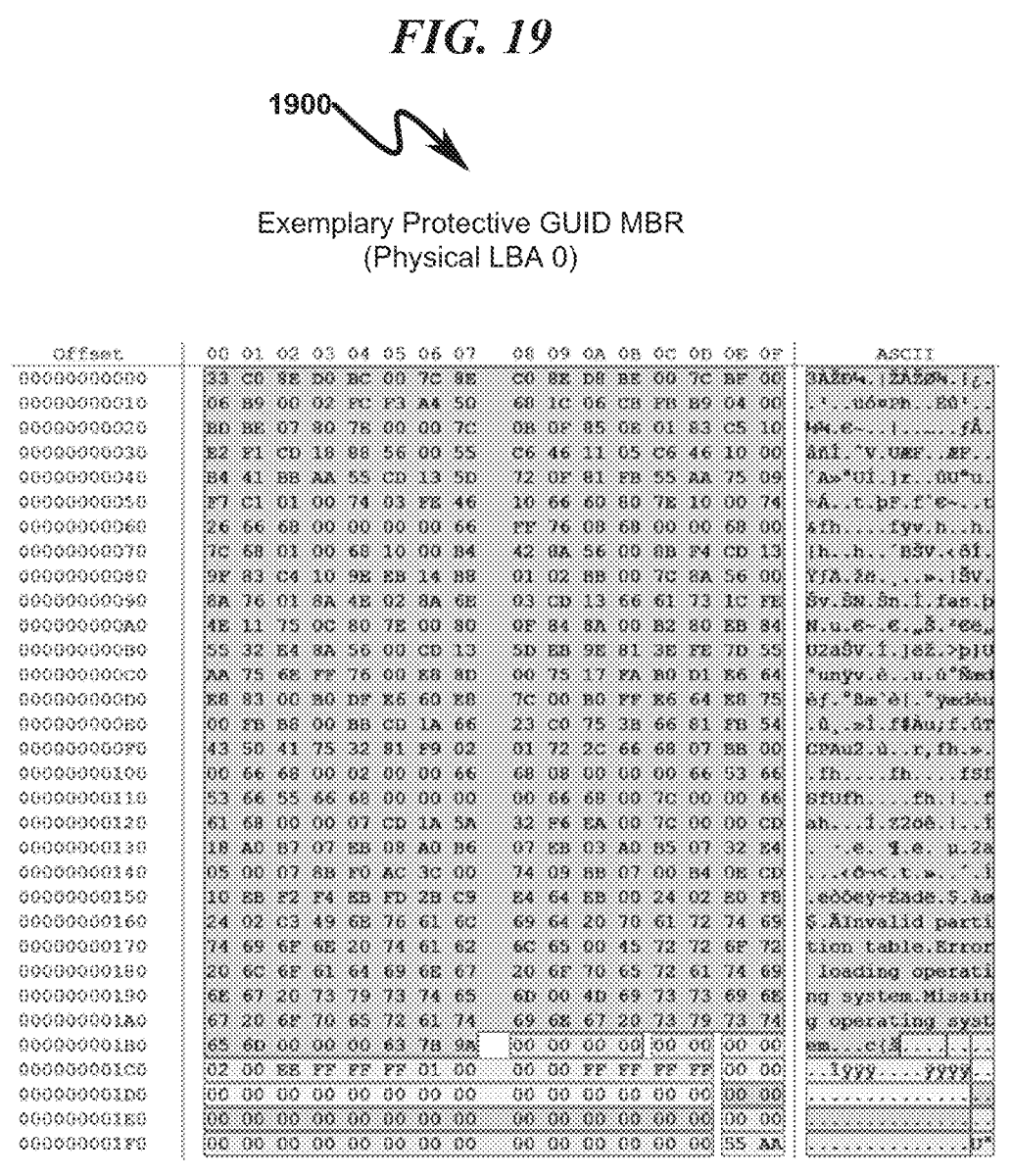

A data structure dump of the protective MBR is provided in FIG. 18 (1800) with raw data formatted in FIG. 19 (1900). As indicated previously, this protective MBR is not used for partitioning information but is merely a protective data structure to prevent non-NTFS compatible operating systems from corrupting the NTFS volume. The use of generic bootstrap code in conjunction with an UNKNOWN PARTITION TYPE and MAXIMUM FAT SECTOR ALLOCATION (2 TB) ensure that for legacy systems the volume is fully allocated in the first partition but with a partition identifier that prevents use by non-NTFS compatible operating systems.

Figure 21:
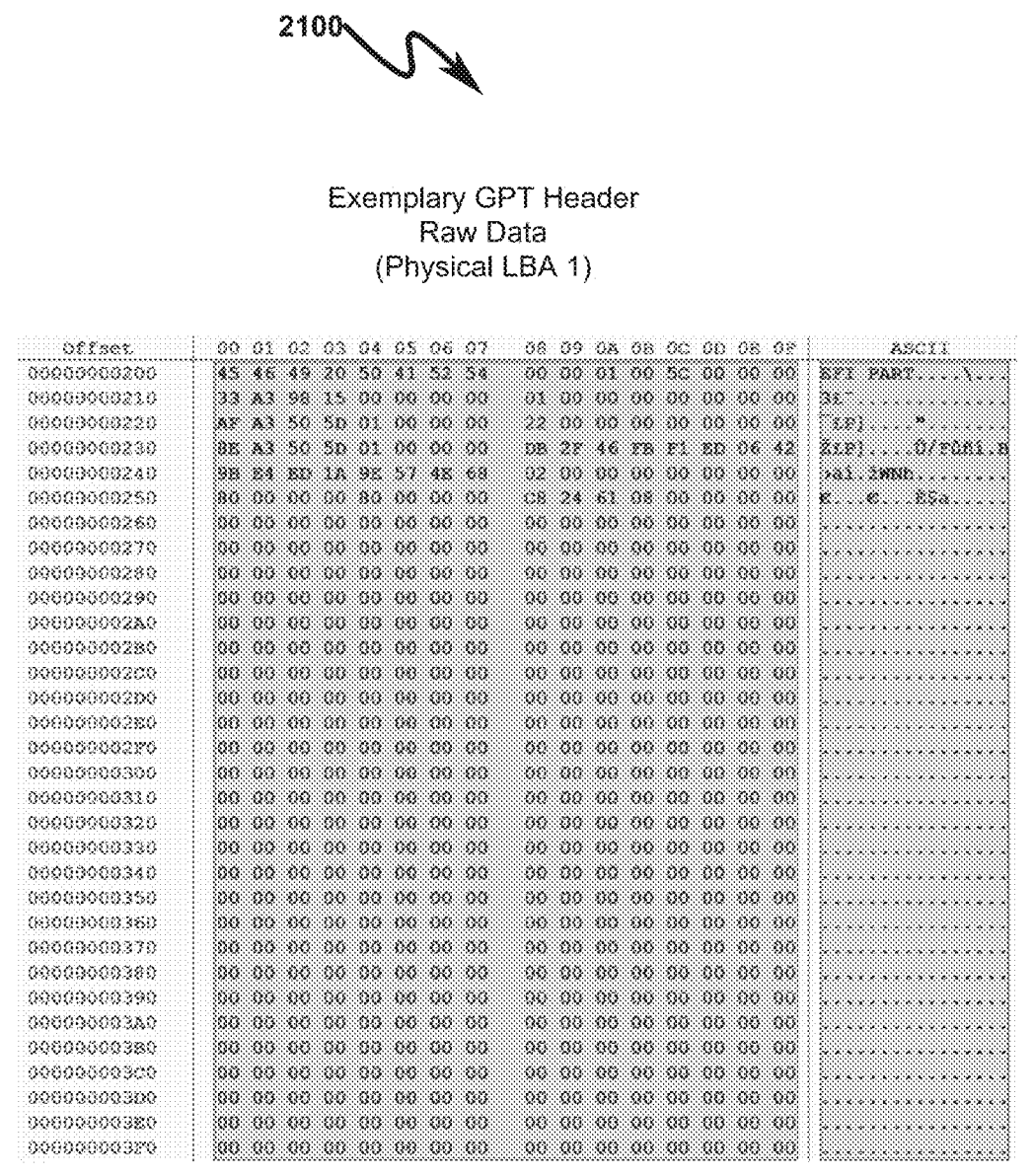
Figure 22:
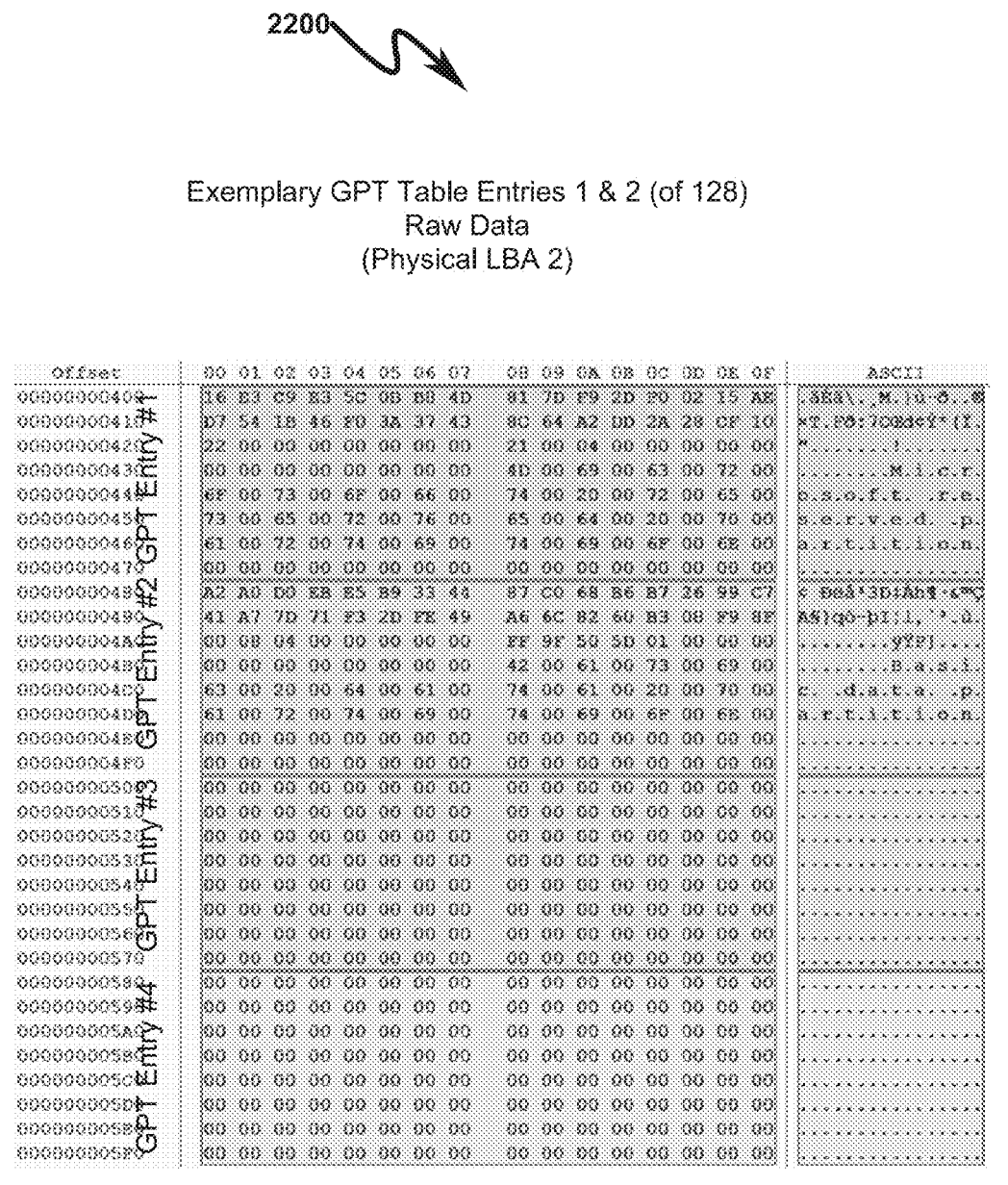

As depicted in FIG. 20 (2000) a data structure of the GPT header and typical GPT table entries is provided. FIG. 20 (2000) provides a data structure interpretation of the GPT header and GPT entries while the raw data sector dumps for these are provided in FIG. 21 (2100) and FIG. 22 (2200).

FIG. 23 (2300) provides a dump of the backup GPT table entries that are maintained starting just after the last useable LBA (here LBA 5,860,533,134+1) until the next-to-last LBA on the disk (here LBA 5,860,533,166, or one sector prior to the GPT header backup located at LBA 5,860,533, 167). FIG. 24 (2400) provides a dump of the backup GPT header that is maintained at the last LBA on the disk (here LBA 5,860,533,167).

The size of each GPT table entry is provided in the GPT header along with the number of GPT table entries. The formula for calculating the number of LBA sectors consumed by the GPT header and GPT table entries is:

$$SectorCount = 1 + EntryCount \times \frac{EntrySize}{SectorSize} \quad (1)$$

Where SectorCount is the number of total sectors required for the GPT Header and GPT table entries, EntryCount is the number of GPT table entries, EntrySize is the number of bytes in each GPT table entry, and SectorSize is the size of each sector on the disk in bytes. Note that this formula normally assumes 512 bytes/sector as the SectorSize parameter but this value may have a higher value in some disk drives, such as 4096-byte sectors that have become more common in modern disk advanced format disk drives.

Calculation of the SectorCount from the LBA 1 location data initially-written by the HCS permits the PTDDC in some circumstances to automatically adjust the count of remapped sectors that are remapped from the LAST LBA locations in the virtual LBA address space to the physical LBA locations that are present in the physical disk drive. For example, it is possible for the PTDDC to scan the write data for LBA 1, dynamically determine the EntryCount and EntrySize parameters from the sector content, and then allocate sufficient storage in the disk drive to provide a physical placement for the duplicate GPT header and GPT table entries using any of the herein described remapping techniques. For example, dynamic recalculation of the SectorCount parameter could adjust the reserved postfix area at the end of the LBA address space on the disk drive to permit replication of the GPT header and GPT table entries at the end of the physical disk.

LBA Remapping Hardware Logic (2500)

Figure 25:
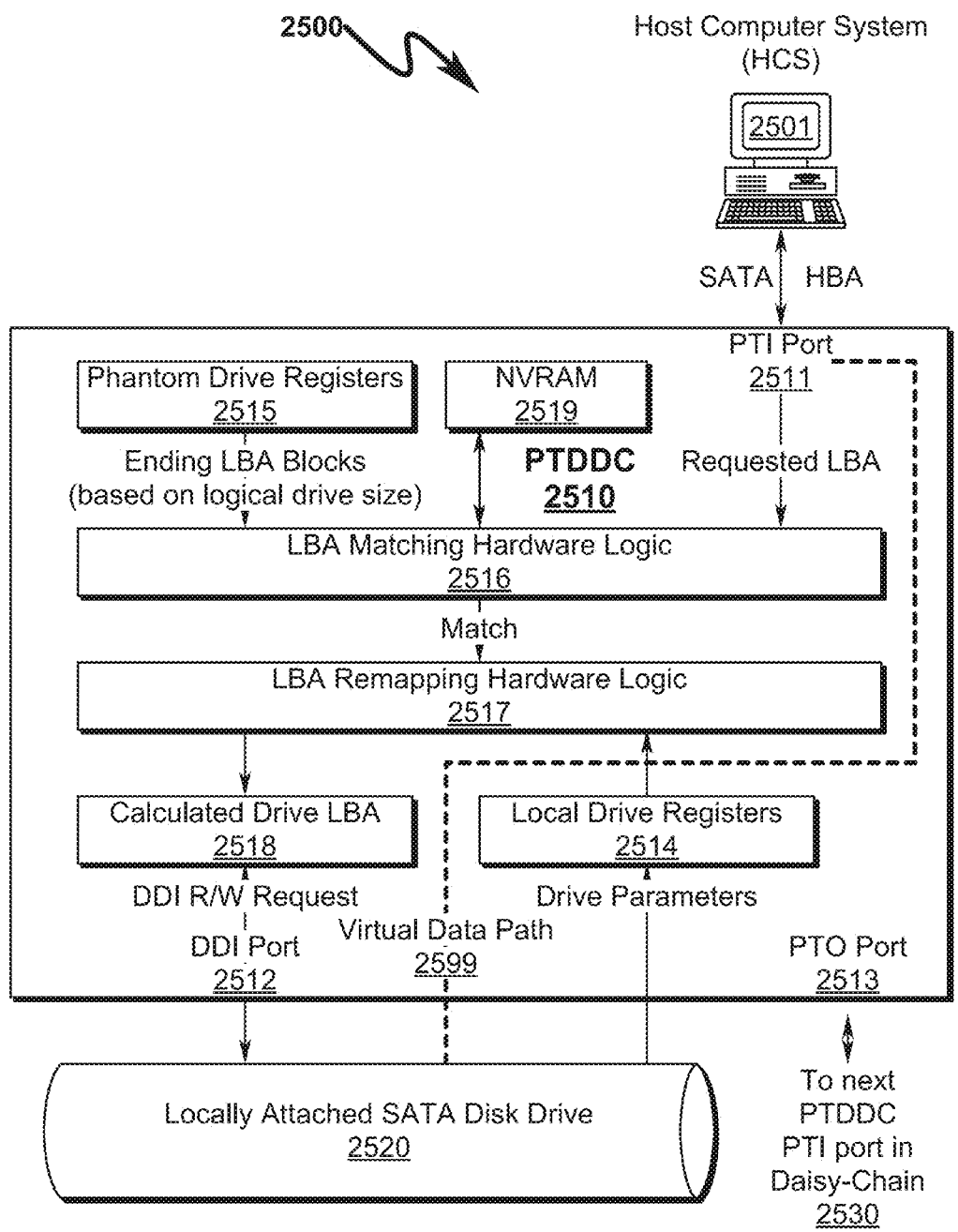
FIG. 25 illustrates an exemplary block diagram of LBA remapping hardware used in some preferred invention embodiments.

A general overview of an exemplary LBA remapping hardware logic useful in many invention embodiments is generally depicted in FIG. 25 (2500). Here a host computer system (HCS) (2501) communicates with a PTDDC daisy-chain comprising one or more PTDDC controllers (2510) that have locally attached disk storage (2520) and optionally connect to downstream PTDDC controller(s) (2530). The configuration depicted incorporates the previously discussed PTI port (2511), DDI port (2512), and PTO port (2513) that are configured as SATA interfaces.

Local Disk Drive Registers

The system as depicted includes a set of local disk drive registers (2514) that correspond to that of the locally attached SATA disk drive (2520). These registers reflect the true current hardware configuration of the locally attached SATA disk drive (2520). As such, parameters associated with the number of LBAs on the locally attached SATA disk drive (2520) as well as the sector size of the locally attached SATA disk drive (2520) are reflected in the local disk drive registers (2514). These local disk drive registers (2514) are used by the PTDDC to direct data transfers to specific PHYSICAL portions of the locally attached SATA disk drive (2520) as a part of a larger LOGICAL address space represented by a set of phantom drive registers (2515) maintained by the PTDDC (2510).

Phantom Disk Drive Registers

In contrast to this physical hardware drive data maintained by the local disk drive registers (2514), phantom drive registers (2515) may represent a much larger LBA address space and be presented to the HCS (2501) as being a logical disk drive having an address space that may be many orders of magnitude larger than that represented by the local disk drive registers (2514) and the corresponding locally attached SATA disk drive (2520). For example, the locally attached SATA disk drive (2520) may have a physical size of 1 TB ($2^{12}$ bytes=1,099,511,627,776 or 2,147,483,648 512-byte sectors or 268,435,456 4096-byte sectors) when in fact the phantom drive registers (2515) may indicate that the overall PTDDC daisy-chain has a logical size of 1 PB ($2^{15}$ bytes=1,125,899,906,842,624 or 2,199,023,255,552 512-byte sectors or 274,877,906,944 4096-byte sectors).

LBA Remapping Hardware Logic

The PTDDC (2510) may be configured to remap LBAs in response to the requirements of a spatially-diverse ODS file system as follows. As requests for data transfers to/from the logical disk volume represented by the PTDDC daisy-chain are received by the PTI port (2511) from the HCS (2501), a LBA matching hardware logic block (2516) compares these LBA transfer requests to the phantom drive registers (2515) to see if these requests correspond to accesses to the ending LBA blocks within the logical drive represented by the phantom drive registers (2515). This can be accomplished by noting that the phantom drive registers (2515) will contain a maximum LBA parameter associated with the logical size of the PTDDC daisy-chain. This maximum LBA parameter can be compared to the incoming LBA data transfer request in real-time to determine if a spatially diverse data (SDD) transfer request has occurred. If the incoming LBA request falls within a spatially diverse data (SDD) region of the logical drive represented by the phantom drive registers (2515), then a LBA remapping hardware logic block is activated to remap these LBA transfer requests to a physically present portion of the locally attached SATA disk drive (2520).

A calculated drive LBA register (2518) is generated based on the content of the local drive registers (2514) and offsets generated by the LBA remapping hardware logic (2517). The calculated drive LBA (2518) is then used to perform the actual data transfer request to/from the locally attached SATA disk drive (2520) via the DDI port (2512) as indicated by the virtual data path (2599) within the PTDDC (2510) that is implemented with bidirectional transceivers/FIFOs or equivalent hardware logic.

It should be noted that the data transfers discussed in this LBA mapping hardware occur as the result of hardware implemented comparisons and data transfers. In typical applications the PTI/DDI/PTO ports are operating at SATA bus transfer speeds ranging anywhere from 3 Gb/s-12 Gb/s using current SATA interface technologies. As such, the PTI port will typically receive a data transfer command indicating a starting LBA address followed immediately by a data transfer request (READ or WRITE command) indicating the number of sectors to transfer starting at the indicated starting LBA address that has been previously loaded. It is this sequence of loading the starting LBA address before the data transfer is initiated that permits the PTDDC (2510) sufficient time to make the comparison between the requested LBA logical data space and that representing the spatially-diverse LBA blocks that are remapped by the LBA remapping hardware logic (2517). Following this LBA remapping, data is transferred to/from the locally attached SATA disk drive (2520) via an internal virtual data path (2599) within the PTDDC (2510).

NVRAM (2519)

The PTDDC (2510) may be configured with non-volatile RAM (2519) that may be used to store drive parameters but in some circumstances used to store critical ODS data structures to prevent catastrophic data loss in the event of a drive failure.

Exemplary LBA Remapping Scenarios

The exact methodology in which the calculated drive LBA (2518) is determined by the PTDDC hardware may vary based on application, but there are several preferred methodologies that are discussed below in detail.

Postfix LBA SDD Mapping (2600)

Figure 26:
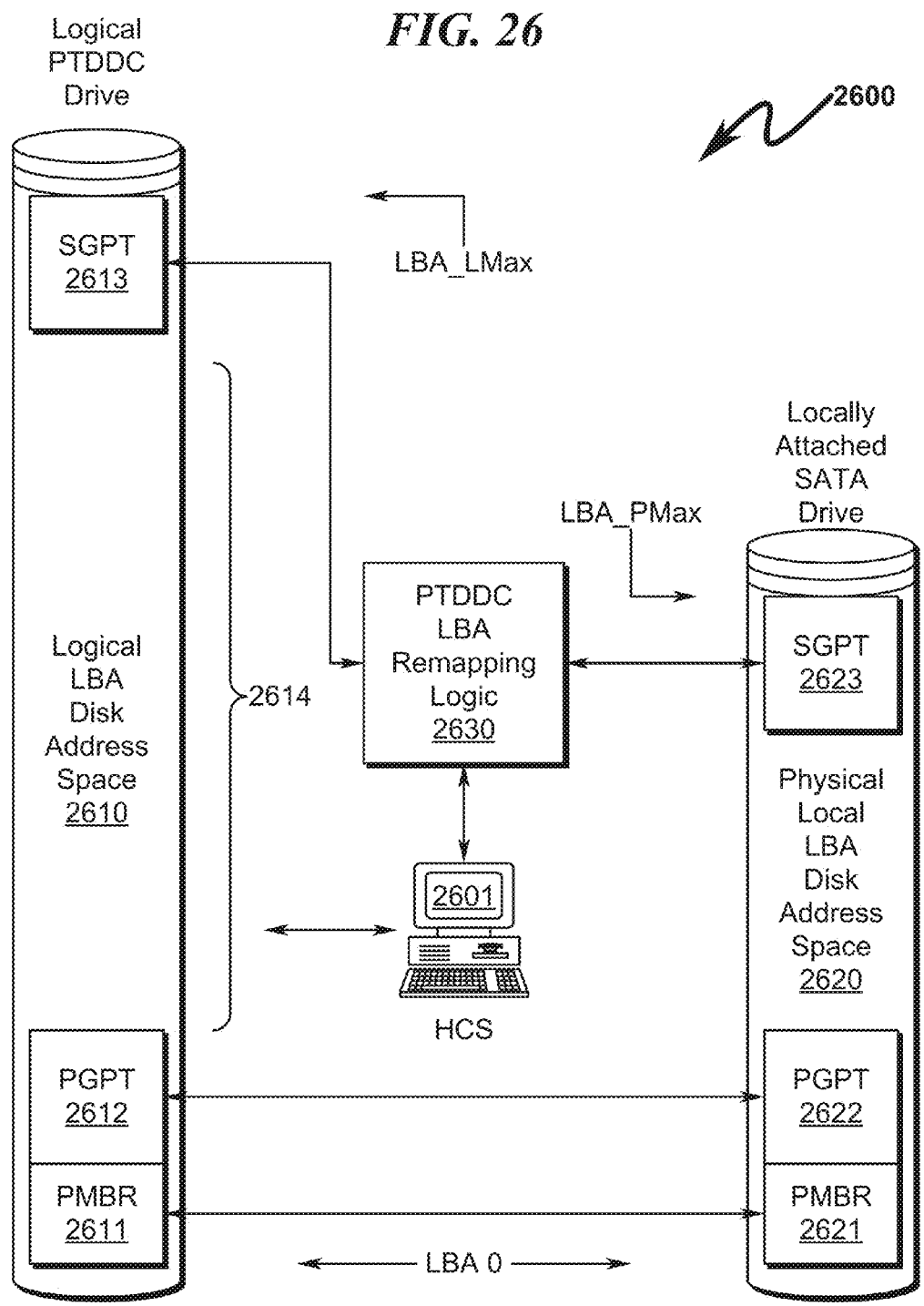
FIG. 26 illustrates an exemplary implementation of postfix LBA SDD mapping.

One preferred method of SDD LBA mapping using postfix mapping is generally depicted in FIG. 26 (2600). In this SDD remapping implementation the logical PTDDC drive comprises a large address space (2610) in which the locally attached SATA drive represents a potentially smaller physical address space (2620). Addresses representing the local protective MBR (2611) and primary GUID partition table (PGPT) are mapped to the corresponding PMBR (2621) and PGPT (2622) LBAs starting at LBA 0 in the locally attached address space (2620) using normal read/write operations to the locally attached drive.

However, HCS references to the end of the logical address space (LBA_LMax) for access to the secondary GPT (2613) within the phantom register address space (2610) are automatically mapped by the PTDDC LBA mapping logic (2630) to the end of the physical address space (LBA_PMax) of the locally attached disk drive address space (2620) to store the SGPT (2623). In this manner, large portions of the logical address space (2614) may be "empty" and not actually mapped to physical disk storage while still allowing storage mapping of the SGPT (2613) from the logical address space (2610) to the locally attached storage address space (2620) copy of the SGPT (2623).

In a typical NTFS implementation the PMBR (2611, 2621) represent one sector and the PGPT (2612, 2622) and SGPT (2613, 2623) each consume 33 sectors (1 sector for the GPT header and 32 sectors for the GUID partition table (GPT)). In some circumstances for performance reasons these structures may be aligned to power-of-two boundaries to improve drive access performance characteristics of the hardware.

Hidden LBA SDD Mapping (2700)

Figure 27:
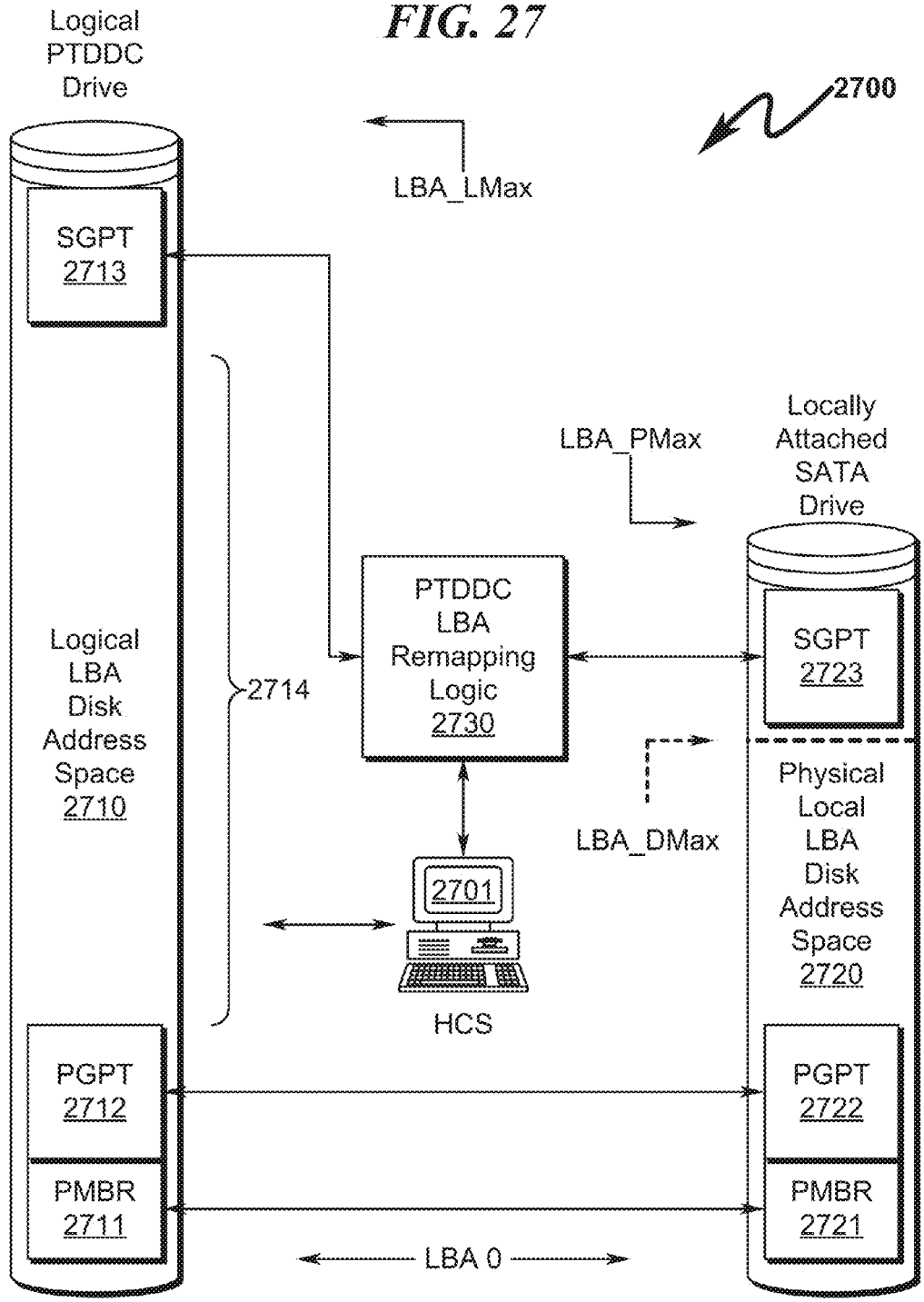
FIG. 27 illustrates an exemplary implementation of hidden LBA SDD mapping.

Another preferred method of SDD LBA mapping using hidden mapping is generally depicted in FIG. 27 (2700). This technique is similar to the postfix LBA SDD mapping discussed above with the exception that the physical size of the locally attached address space is "cut" or logically reduced such that the physical drive size (LBA_PMax) is not entirely available for general read/write access but is rather reduced to a local drive size (LBA_DMax) in which data is normally stored. The area between the LBA_DMax and LBA_PMax is used to store the SGPT (2723) by the LBA remapping logic (2730). Since the SGPT (2723) is infrequently accessed, this storage mechanism permits storage of this data structure in a protected area of the local hard drive that cannot be overwritten absent a resizing of the disk drive.

A typical write sequence for the SGPT (2723) in this implementation would involve the following steps:
  Sizing the locally attached disk drive to LBA_PMax.
  Storing or retrieving the SGPT (2723) in the area between LBA_DMax and LBA_PMax.
  Resizing the locally attached disk drive back to LBA_DMax to protect the SGPT (2723) from possible inadvertent writing or corruption.

In this manner the SGPT is protected from inadvertent corruption by errant writes to the end of the physical address space (2720) of the locally attached disk drive.

Postfix-Hidden LBA SDD Mapping (2800)

Figure 28:
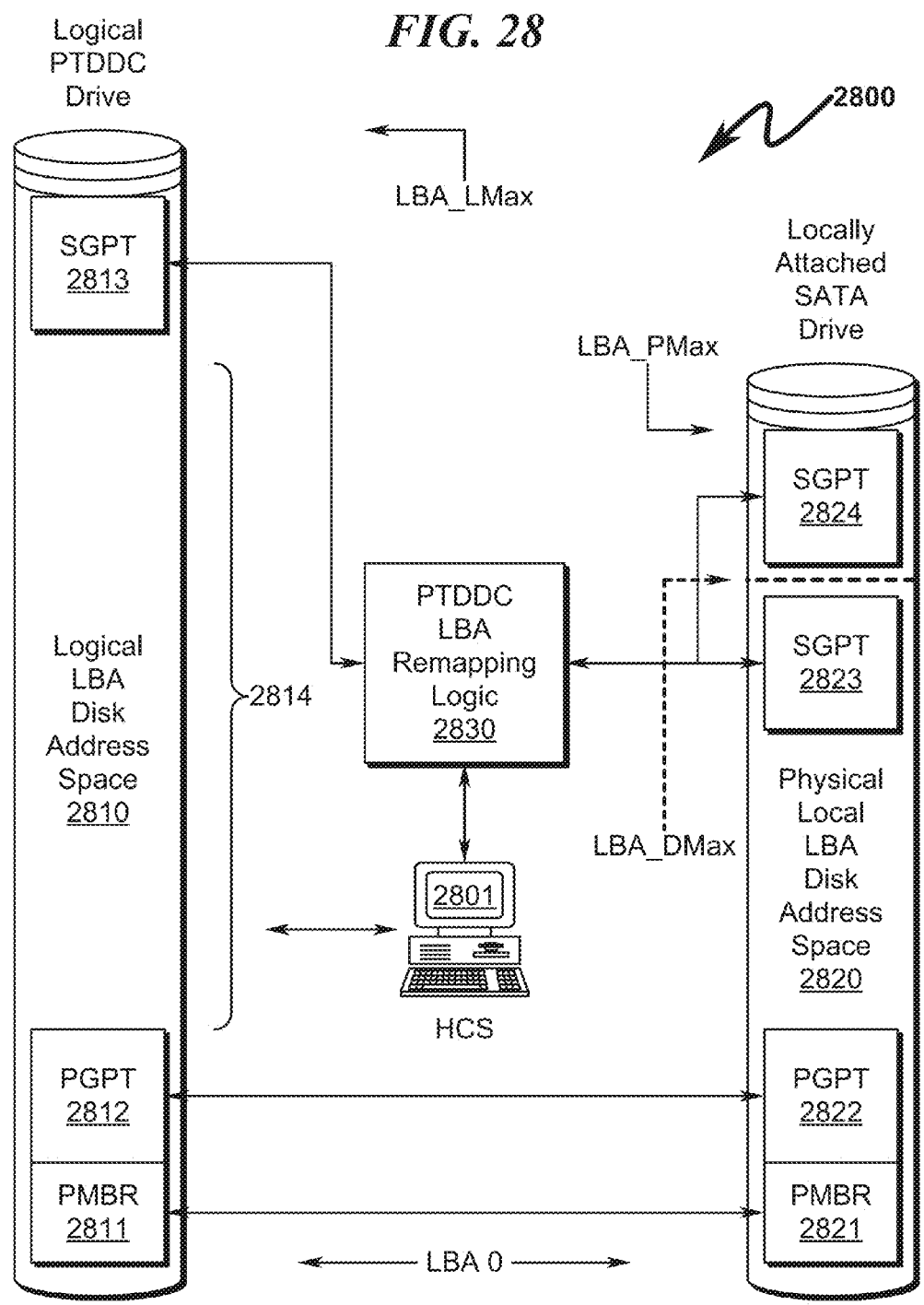
FIG. 28 illustrates an exemplary implementation of postfix-hidden LBA SDD mapping.

Another preferred method of SDD LBA mapping using postfix-hidden mapping is generally depicted in FIG. 28 (2800). This technique is similar to the postfix LBA SDD mapping and hidden LBA SDD mapping discussed above with the exception that both postfix (2823) and hidden (2824) copies of the SGPT (2813) in the logical address space are maintained in the physical address space (2820) of the locally attached disk drive.

In this manner, if access to the secondary SGPT (2823) is somehow corrupted, a tertiary SGPT (2824) is available to ensure that the file system can be properly recovered.

Prefix LBA SDD Mapping (2900)

Figure 29:
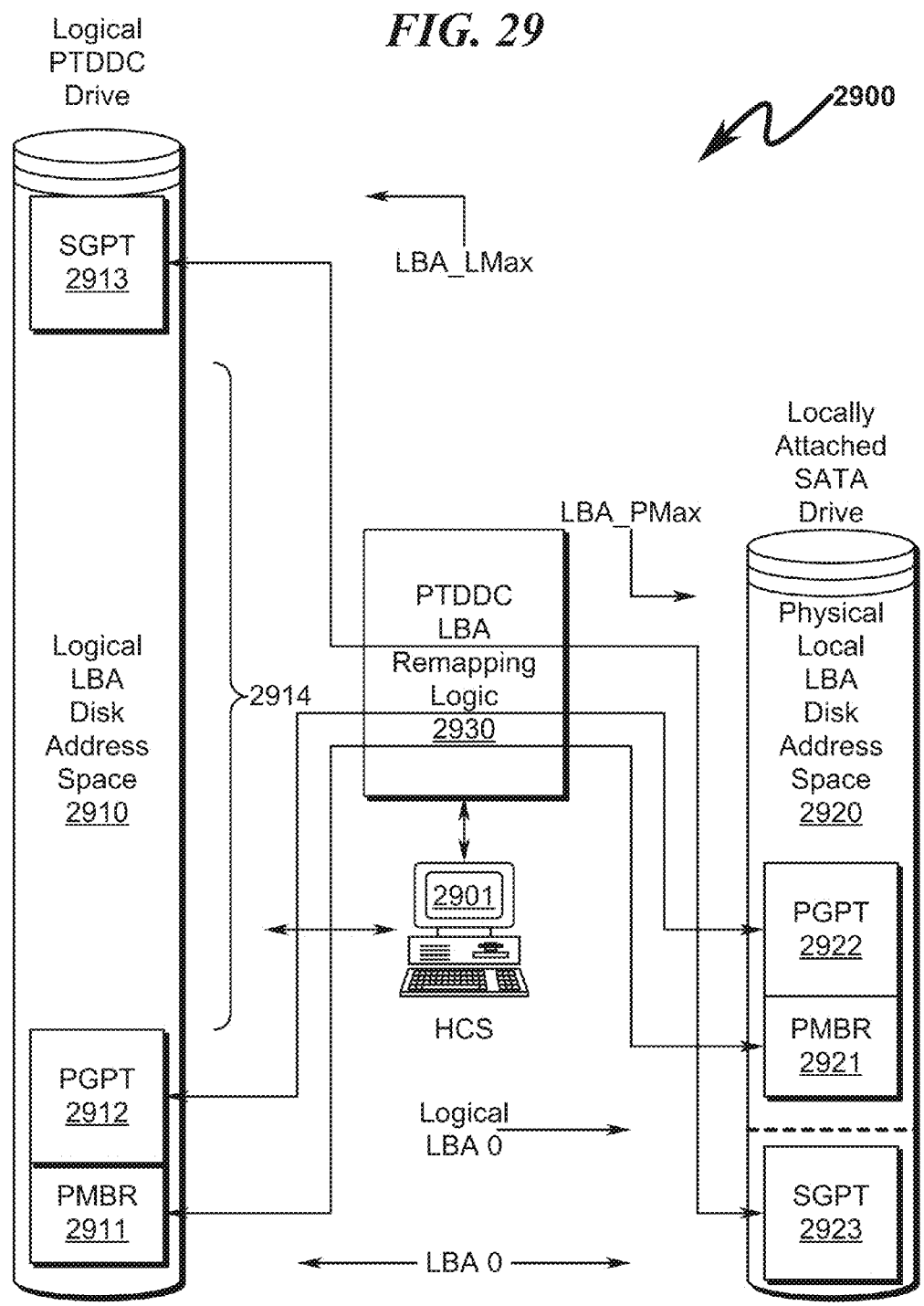
FIG. 29 illustrates an exemplary implementation of prefix LBA SDD mapping.

Another preferred method of SDD LBA mapping using prefix mapping is generally depicted in FIG. 29 (2900). This prefix LBA SDD mapping configuration offsets all LBA addresses for normal disk operations from the logical LBA disk address space (2910) to the physical disk address space (2920) by an offset equal to the size of the SGPT (2913) that is mapped to its physical placement (2923) in the locally attached SATA drive. Thus, the PMBR (2911) and PGPT (2912) as well as all other disk accesses are LBA offset by the size of the SGPT (2913, 2923). This reduces the available physical size of the physical address space (LBA_PMax) by the size of the SGPT (2923), but renders all other LBA access to the locally attached SATA drive to be transparent.

The mapping operation for the PTDDC LBA remapping logic (2930) in this instance can be accomplished by implementing a hardware subtraction of the requested logical LBA disk address (2910) by the size of the SGPT (2913) before the transfer request is presented to the locally attached SATA disk drive for processing. Addresses in the range of the SGPT (2913) have their LBA addresses subtracted from the base address of the SGPT (2913) before being presented to the locally attached SATA disk drive for processing. Other addresses have their LBA increased by the size of the SGPT (2913) before being presented to the locally attached SATA disk drive for processing.

Duplicate LBA SDD Mapping (3000)

Figure 30:
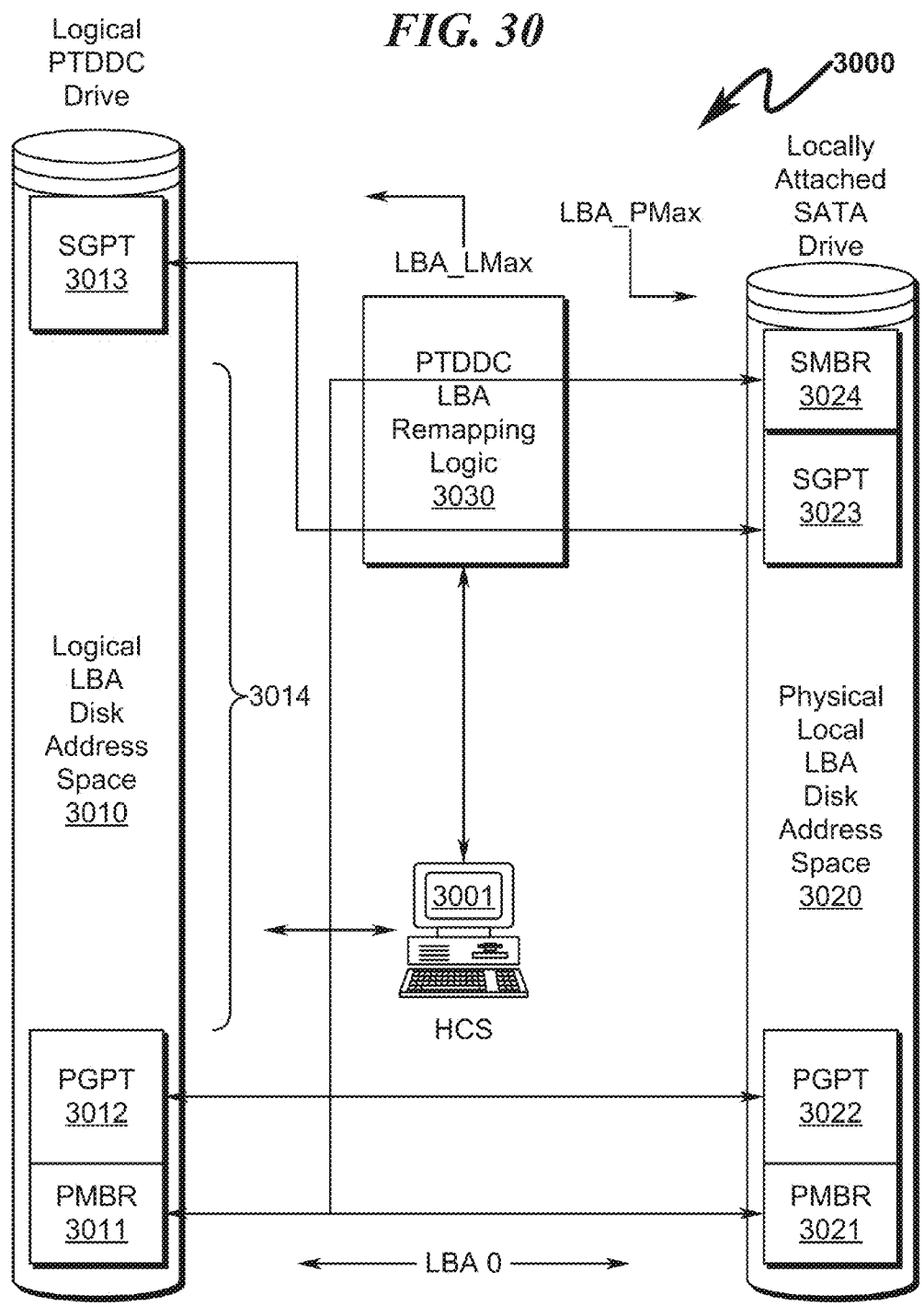
FIG. 30 illustrates an exemplary implementation of duplicate LBA SDD mapping.

Another preferred method of SDD LBA mapping using duplicate mapping is generally depicted in FIG. 30 (3000). Here it can be seen that the PTDDC LBA mapping logic (3030) is configured to duplicate both the SGPT (3013) in the locally attached drive (3023) but also generate a duplicate copy of the PMBR (3021) as a secondary protective MBR (3024) in the locally attached SATA disk. This automatic duplication of critical data structures (CDS) allows a read failure on any of the critical NTFS ODS data to be recoverable in the following manner. Logic within the PTDDC LBA mapping logic (3030) can be configured to detect a read/write failure of the data space associated with the PMBR (3021) or PGPT (3022) and automatically initiate a data transfer to the secondary SMBR (3024) or SGPT (3023) as they are remapped within the physical drive address space (3020). This duplication and/or automatic LBA redirection logic can be utilized within any of the LBA remapping scenarios described herein.

NVRAM LBA SDD Mapping (3100)

Figure 31:
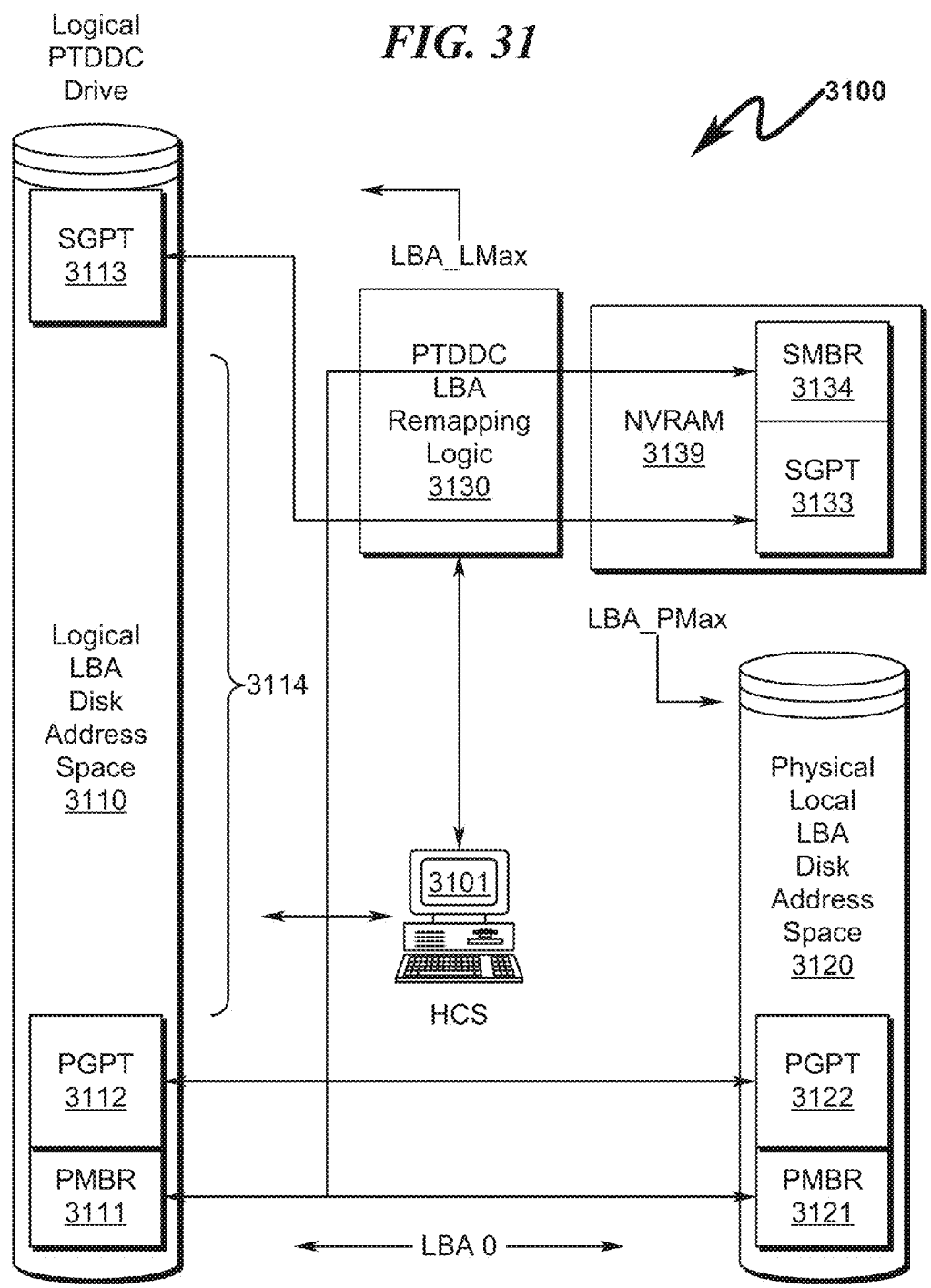
FIG. 31 illustrates an exemplary implementation of NVRAM (non-volatile random access memory) LBA SDD mapping.

Another preferred method of SDD LBA mapping using NVRAM mapping is generally depicted in FIG. 31 (3100). Here it can be seen that the PTDDC LBA mapping logic (3130) is configured to store the SGPT (3123) (and optionally the SMBR (3124)) in non-volatile memory (NVRAM) stored within the PTDDC (see also (2519) in FIG. 25 (2500)). In this manner the PTDDC can maintain a copy of these critical ODS data structures in FLASH/EEPROM or other NVRAM such that a catastrophic data loss in the locally attached SATA drive can be recovered by simply copying these data structures to a replacement drive and reloading remaining data from a RAID duplicate in the PTDDC daisy-chain. The use of NVRAM in this application context is anticipated for any of the LBA remapping scenarios described herein.

Mirrored LBA SDD Mapping (3200)

Figure 32:
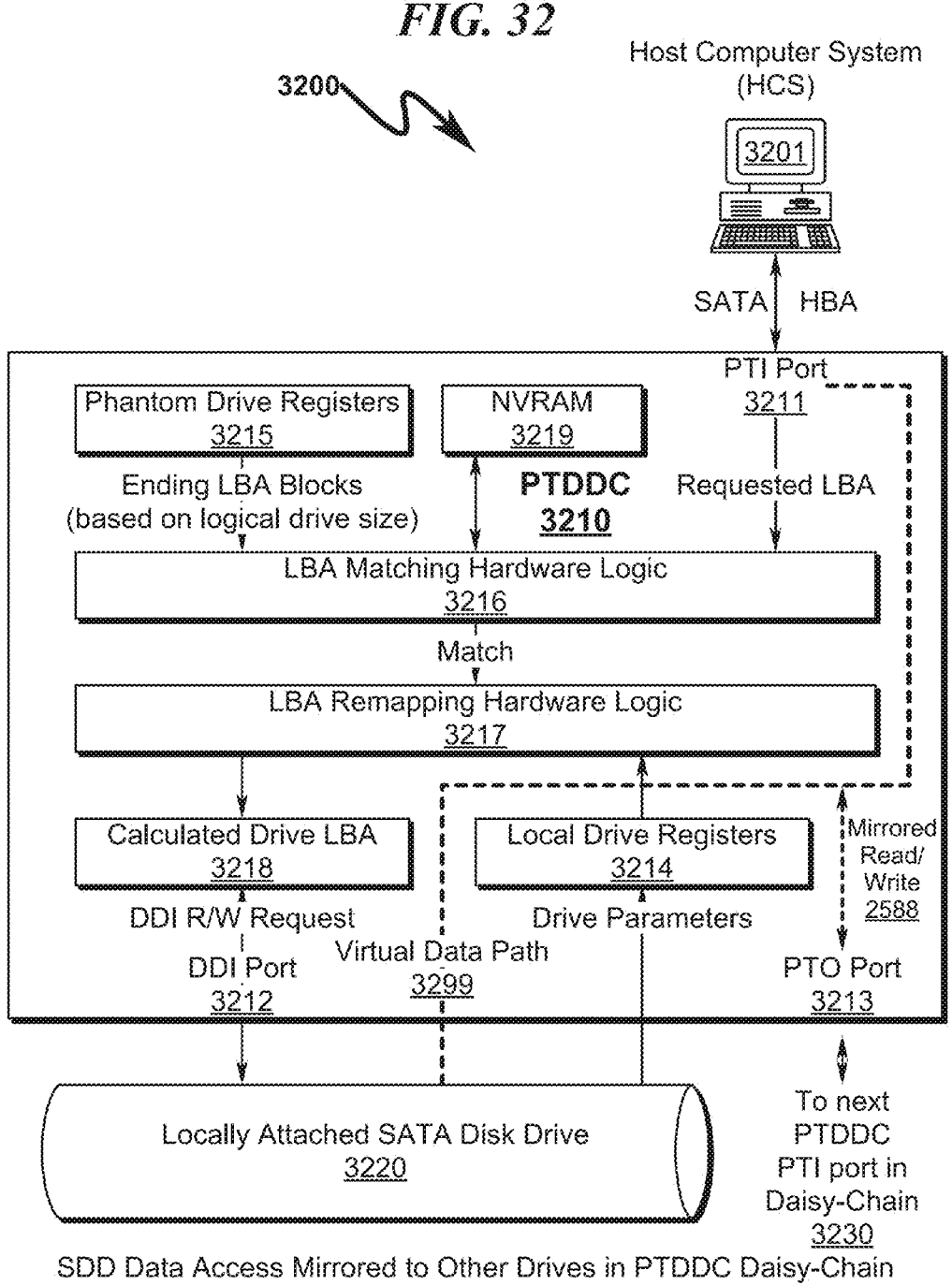
FIG. 32 illustrates an exemplary implementation of mirrored LBA SDD mapping.

Another preferred method of SDD LBA mapping using mirrored mapping is generally depicted in FIG. 32 (3200). In this system variant, the SDD data is remapped to the locally attached SATA disk but also forwarded to other members of the PTDDC daisy-chain. In this configuration the loss of a given drive does not preclude access to data on all other drives as the GPT information is mirrored among the remaining drives in the PTDDC daisy-chain. This permits partial recovery of data in the event of a catastrophic drive failure at the beginning of the PTDDC daisy-chain.

Storage Extension Application Context (3300)-(3600)

Prior Art Overview (3300, 3400)

Figure 33:
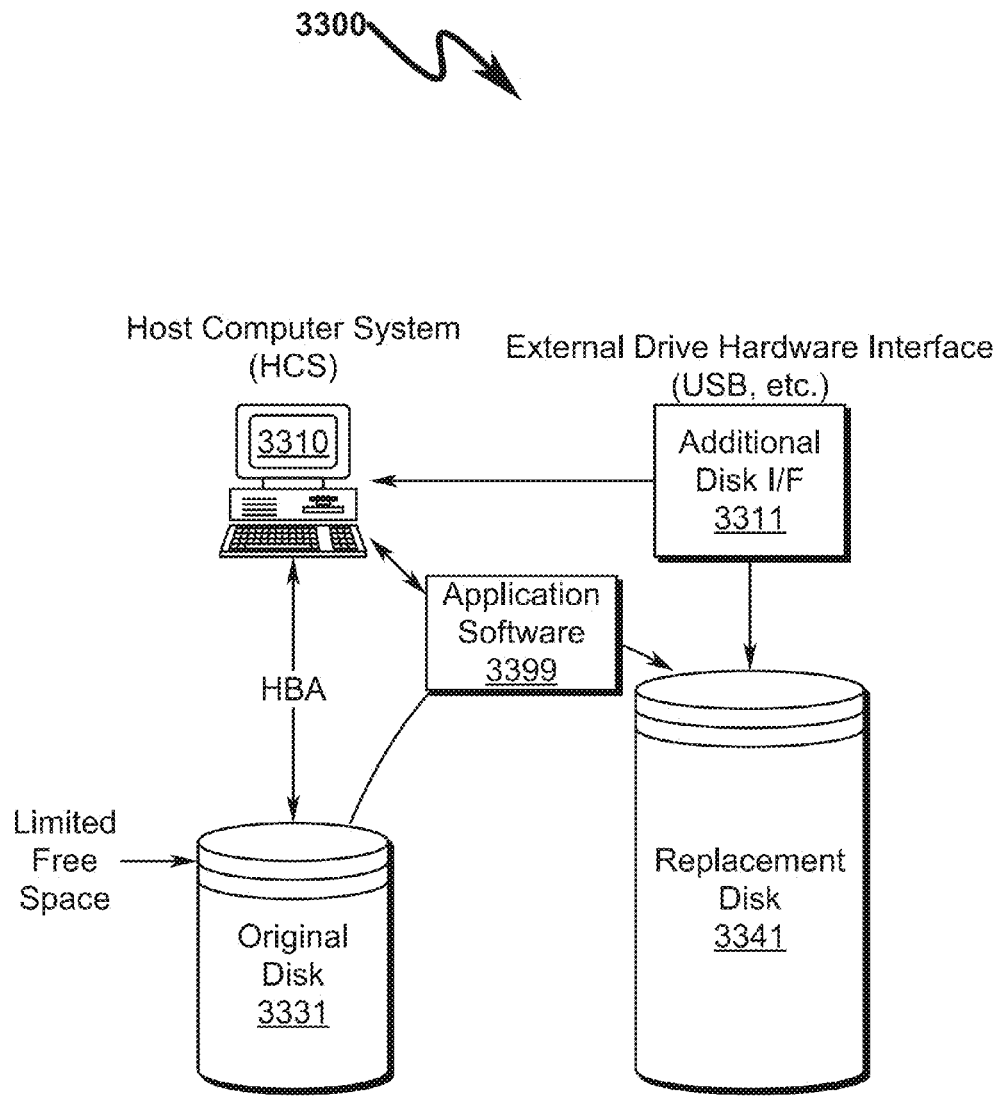
FIG. 33 illustrates a block diagram depicting prior art data migration from a single ORIGINAL disk drive to a REPLACEMENT disk drive.
Figure 34:
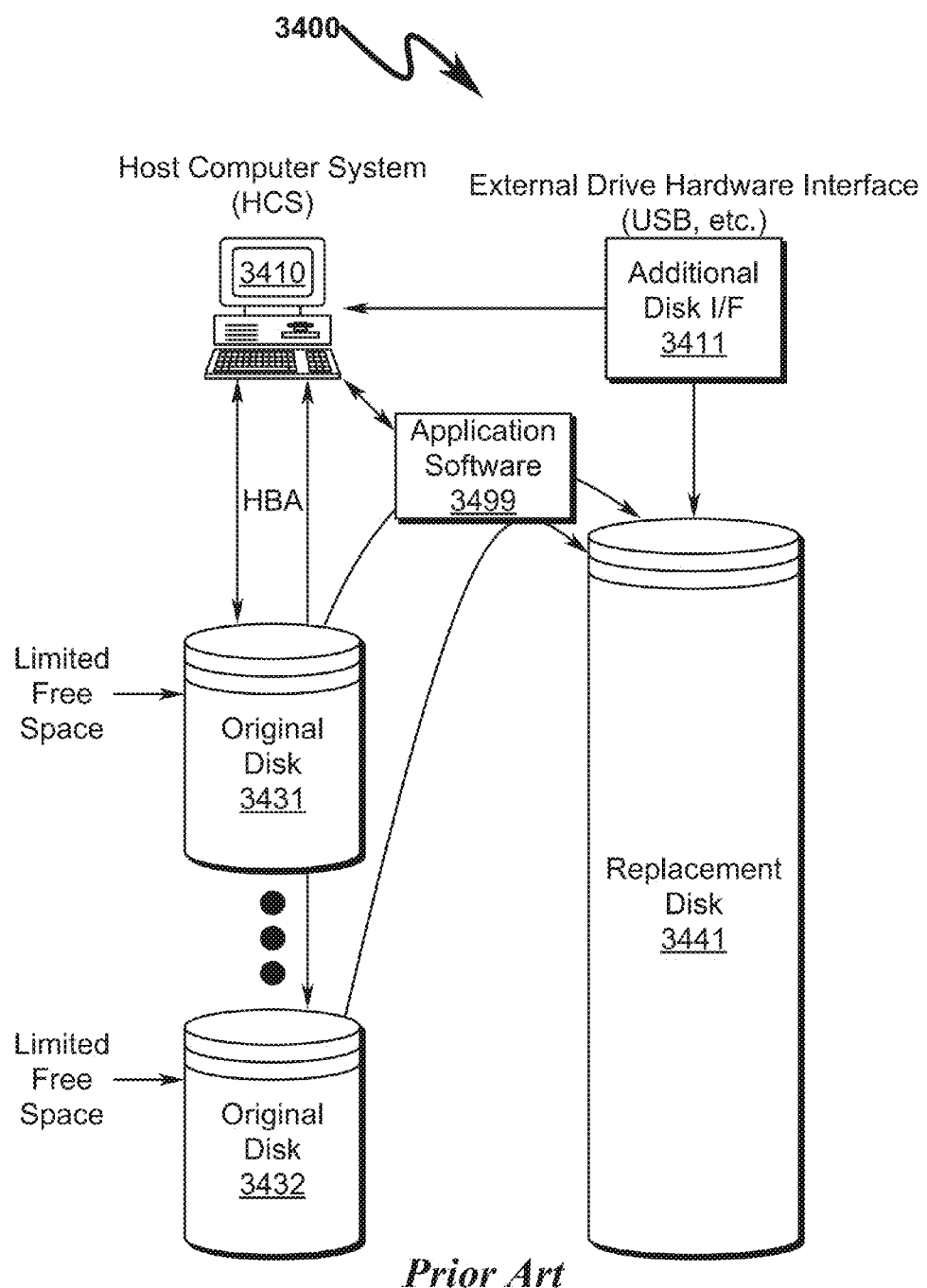
FIG. 34 illustrates a block diagram depicting prior art data migration from multiple ORIGINAL disk drives to a REPLACEMENT disk drive.

A significant advantage of the present invention over that of the prior art is in the application context of expanding the disk storage on an existing computer platform. It is a common occurrence in the IT industry for a computer system such as a desktop or server to be faced with a situation where the existing attached disk storage becomes full or insufficiently capable of storing additional data. This can occur in a variety of scenarios, but two scenarios are very common:

As depicted in FIG. 33 (3300), an existing desktop, laptop, or other computer system (3310) with a single original hard drive (or limited drive bays) (3331) fills the existing disk drive and requires a larger replacement disk drive (3341) to continue operation; or As depicted in FIG. 34 (3400), an existing desktop, laptop, or other computer system (3410) with multiple disk drives (3431, 3432) has sufficient TOTAL storage on all drives to store additional data, but has INSUFFICIENT STORAGE ON ANY ONE DISK DRIVE to store a given file or dataset (this can occur, for example, if a large file must be stored but there are only fragments of space available on multiple disk drives), and requires a larger replacement disk drive (3441) to continue operation.

In either of these scenarios, the solution is generally to replace one or more of the ORIGINAL disk drives with a REPLACEMENT drive having larger capacity to enable the computer system to continue operation. This process for migration from the ORIGINAL drive to the REPLACEMENT drive generally involves the following steps:

Procuring a REPLACEMENT drive having a larger storage capacity than the ORIGINAL drive.

Shutting down the host computer system on which the ORIGINAL disk drive resides.

Attaching the REPLACEMENT drive to the computer system using either a host bus adapter (HBA) (if available) or a special USB-to-disk hardware converter (3311, 3411).

Rebooting the host computer system with the newly attached REPLACEMENT drive.

Partitioning the REPLACEMENT drive with proper operating system data structures to define one or more logical drive partitions on the disk drive. This format process generally involves the use of an operating system utility such as the WINDOWS® ADMINISTRATIVE TOOLS/COMPUTER MANAGEMENT/STORAGE/DISK MANAGEMENT utility.

Formatting the REPLACEMENT drive with proper operating system file structure which will by its placement on the REPLACEMENT disk drive identify the drive as having a storage capacity that is larger than the ORIGINAL disk drive. This format process generally involves the use of an operating system utility such as the WINDOWS® ADMINISTRATIVE TOOLS/COMPUTER MANAGEMENT/STORAGE/DISK MANAGEMENT/FORMAT command.

It should be noted that the PARTITIONING and FORMATTING operations are directly dependent on the hardware capabilities of the REPLACEMENT disk and are FIXED at the time the REPLACEMENT disk is selected and cannot be changed after installation. Thus the ODS structure on the REPLACEMENT disk is intimately tied with its hardware configuration and cannot be modified after installation.

Invoking special application software (3399, 3499) operating on the host computer system to copy disk partitions and their associated data from the ORIGINAL drive to the REPLACEMENT drive. This copy operation must have an intimate knowledge of the underlying file structures present on the ORIGINAL drive and remap these structures in a new format on the REPLACEMENT drive.

Shutting down the host computer system.

Removing the ORIGINAL disk drive and replacing it with the REPLACEMENT disk drive.

Rebooting the host computer system with the newly installed REPLACEMENT disk drive.

The problem with this common sequence of operations is that it is time consuming and often error prone and requires either the availability of a spare HBA adapter to connect the REPLACEMENT drive or the availability of special USB hardware to act as an interface to the REPLACEMENT drive during the copy operation. Furthermore, special application software is required to perform the copy operation from the smaller-sized ORIGINAL disk drive to the larger REPLACEMENT disk drive. This is because partition sizes on the ORIGINAL disk drive and REPLACEMENT disk drive are by necessity different and therefore a direct block-for-block copy of the ORIGINAL disk drive to the REPLACEMENT disk drive is not possible. It is not currently possible under standard operating systems to perform a direct block-for-block LBA copy from a smaller disk drive to a larger disk drive and preserve the ODS structure such that the larger disk drive can function without the use of special application software in the ORIGINAL-to-REPLACEMENT copy operation.

Port Multiplier not Suitable

The use of a port multiplier in this application context is not suitable because additional host software is necessary to recognize the individual drives connected to the port multiplier. Additionally, as stated previously from the SATA specification, Port multipliers cannot be nested or cascaded (per the SATA specification, "A Port Multiplier shall not be connected to another Port Multiplier (i.e. no cascading)".

Port multipliers are limited to 15 connected disk drives. Thus, one SATA port multiplier is capable of supporting a maximum of 15 "SATA disk drives" from a single HBA port but there is no provision to transparently access additional disk drives without some software modification to the host computer.

However, the present invention allows these rules to be violated at will via the use of the PTDDC technology described herein. In this example, any "SATA disk drive" as seen by a SATA port multiplier connected to a host computer consists of a PTDDC-enabled daisy-chain that may have an indefinite number of daisy-chained SATA disk drives. In this particular application context, only the first disk drive in the PTDDC chain need have a PTDDC attachment. Thus, while the host SATA port multiplier is still limited to 15 physical drive port disk interfaces, each of these physical drive ports may contain a plurality of SATA disk drives each configured by the PTDDC to appear as one large logical disk drive.

This architecture is very useful in situations where the capacity of an existing storage array needs to be increased but there is insufficient rack space to support additional SATA port multipliers. In this scenario, ESATA interfaces to PTDDC daisy-chains may be utilized to increase the overall storage array capacity with no additional SATA port multiplier hardware. The ability of the PTDDC to logically combine drives within the daisy-chain and appear as a singular large disk drive via the HBA/PTI port makes this an ideal retrofit for many existing storage arrays.

Present Invention Solution (3500, 3600)

Figure 35:
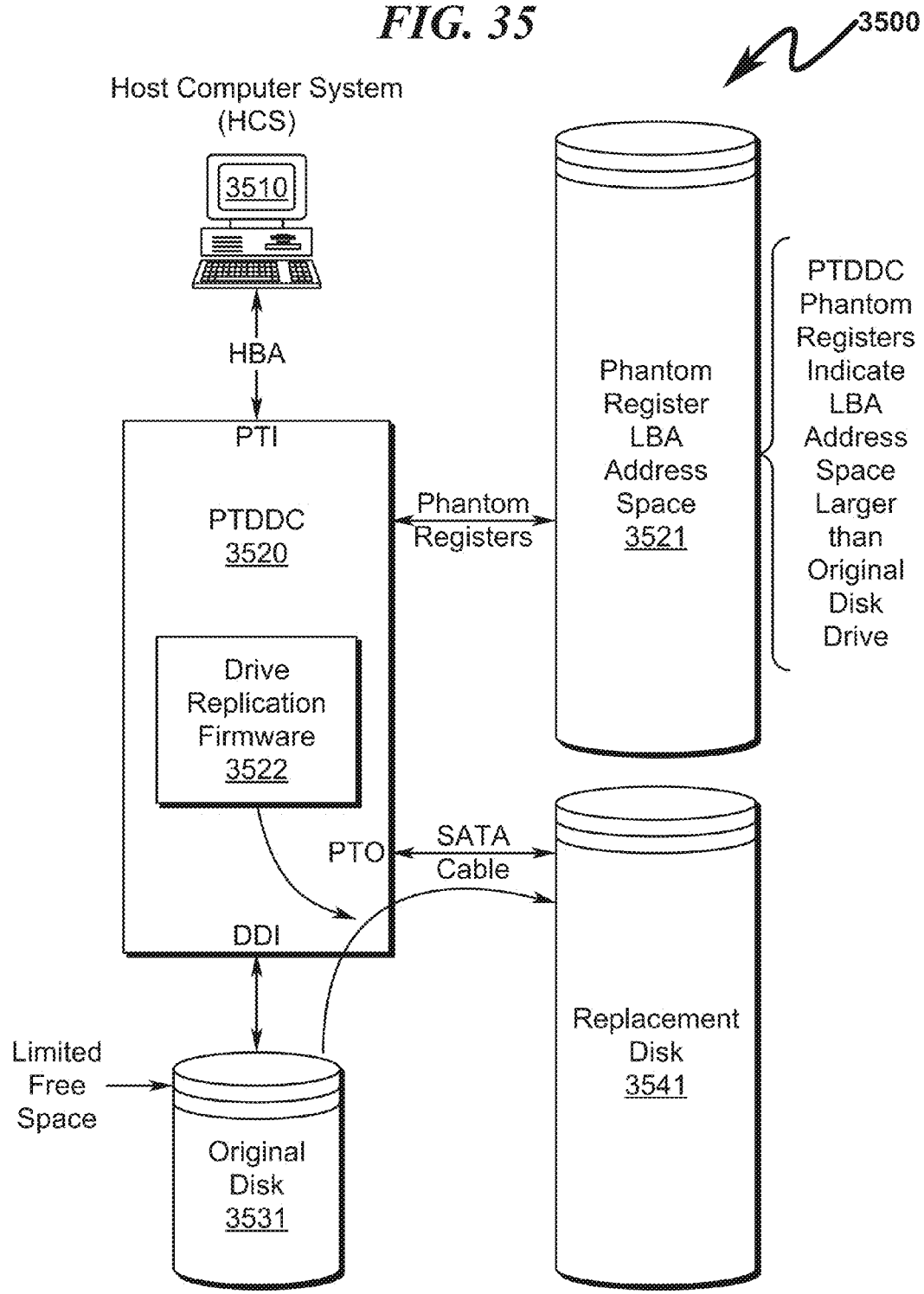
FIG. 35 illustrates a block diagram depicting an exemplary present invention data migration from a single ORIGINAL disk drive to a REPLACEMENT disk drive having larger physical capacity.

The present invention may be used in this application context to solve this common disk drive upgrade/replacement operation as follows. Reference in this discussion is made to FIG. 35 (3500) and FIG. 36 (3600).

First, the ORIGINAL disk drive (3531) if configured with PTDDC (3520) daisy-chain functionality (whether located on the HCS (3510) motherboard, a piggy-back module, PTDDC-enabled backplane, or within the original disk drive (3531) logic board) permits the attachment of a REPLACEMENT disk drive directly to the PTO port of the PTDDC controller that services the ORIGINAL disk drive using just a standard SATA interface cable. While most applications of the PTDDC controller are used in the context of a daisy-chain that connects a plurality of disk drives (each associated with a PTDDC controller), a single-disk PTDDC chain is also possible in which the first PTDDC in the chain services one locally attached disk drive and this disk drive only. The attachment of another disk drive to the PTO port of this first and only PTDDC in this configuration is anticipated in this application context.

Second, the PTDDC (3520) in this application context may be configured to indicate a LBA logical address space (3521) for the PTDDC chain that greatly exceeds that of the locally attached disk drive that is connected to the DDI port of the PTDDC. For example, suppose that the PTDDC in this context indicates by way of the phantom disk register bank that the PTDDC chain supports 32 TB of storage, when in fact the largest currently available disk drive for local SATA attachment is 1 TB. The SDD remapping logic described above permits this 1 TB drive to be partitioned and formatted as a 32 TB drive on the ORIGINAL disk drive (3541) despite the fact that only 1 TB of space is actually available. Space within the 32 TB address space that is not actually backed by the 1 TB locally attached drive can be marked as "RESERVED" during the formatting process. Note that this formatting process may be accomplished by the PTDDC (3520) itself instead of relying on operating system utilities such as those supplied by MICROSOFT® or other vendors.

Substitution of the ORIGINAL drive by the REPLACEMENT drive can occur as follows:

Procuring a REPLACEMENT drive (3541) having a larger storage capacity than the ORIGINAL drive (3531). The ORIGINAL drive (3531) and REPLACEMENT drive (3541) are both PTDDC configured or alternatively the host computer system is configured with a PTDDC that communicates with an ORIGINAL non-PTDDC enabled generic SATA drive and the REPLACEMENT drive is also non-PTDDC enabled generic SATA drive Shutting down the host computer system (3510) on which the ORIGINAL disk drive resides.

Attaching the REPLACEMENT drive (3541) to the PTO port of the PTDDC (3520) serving the ORIGINAL drive (3531).

Rebooting the host computer system (3510) with the newly attached REPLACEMENT drive (3541).

Activating a block-for-block LBA copy utility (3532) residing on the PTDDC (3520) to copy all data from the ORIGINAL drive (3531) to the REPLACEMENT drive (3541) using the DDI and PTO ports respectively.

Shutting down the host computer system (3510).

Removing the ORIGINAL disk drive (3531) and replacing it with the REPLACEMENT disk drive (3541).

Rebooting the host computer system (3510) with the newly installed REPLACEMENT disk drive (3541).

With application firmware/software (3522) executing on the PTDDC (3520), reducing the size of the "RESERVED" area on the REPLACEMENT drive to reflect the true physical size of the REPLACEMENT drive. This process is termed herein as "RESIZING" the logical address space of the REPLACEMENT drive.

Once the RESIZING operation is complete, space on the REPLACEMENT drive corresponding to the resized area becomes visible to the operating system and can be used for storage. No repartitioning of the REPLACEMENT drive is necessary because the partition sizes were originally generated based on the original 32 TB logical size example and need not be increased or modified as a result of the block-for-block LBA copy operation performed when duplicating the ORIGINAL disk drive to the REPLACEMENT disk drive.

This methodology using the PTDDC (3520) having a logical address space (3521) that is much larger than available physical drives provides several advantages. First, as technology advances, a given hard drive can be replaced without any need for software modifications to the file structure on the host computer system (3510). Second, the block-for-block copy (3522) reduces the chances of errors causing data corruption during the copy operation. Third, no additional hardware is necessary to support the interface to the REPLACEMENT drive during the ORIGINAL-to-RE- PLACEMENT copy operation. Fourth, the block-for-block LBA copy operation from the ORIGINAL disk drive to the REPLACEMENT disk drive occurs along a full speed SATA bus at 3 Gb/s-16 Gb/s without host computer intervention which is orders of magnitude faster than possible using conventional disk replication software running on the host computer system.

Merging ORIGINAL Disk Drives (3600)

Figure 36:
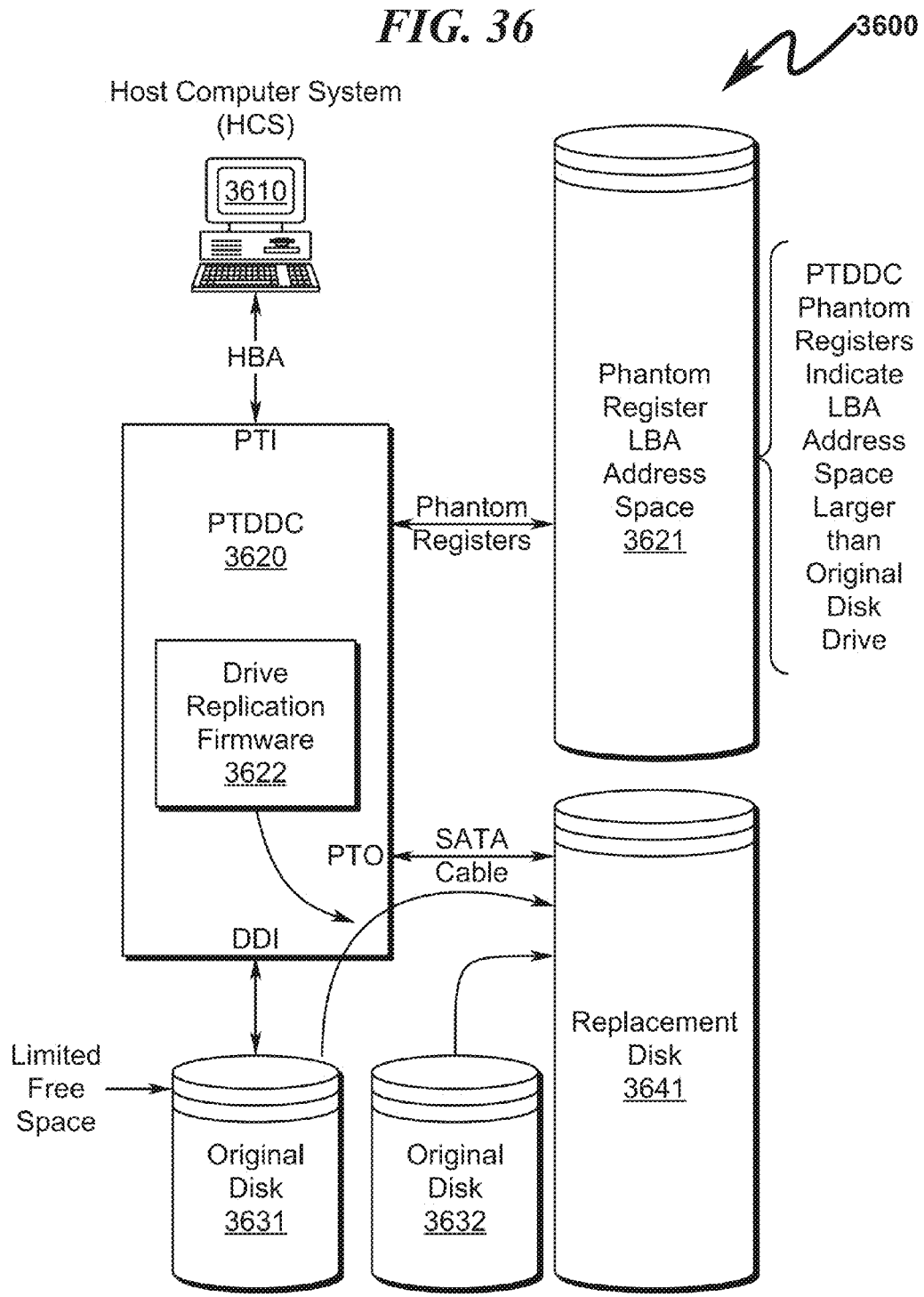
FIG. 36 illustrates a block diagram depicting an exemplary present invention data migration from multiple ORIGINAL disk drives to a REPLACEMENT disk drive having larger physical capacity.

As generally depicted in FIG. 36 (3600), multiple ORIGINAL disk drives (3631, 3632) may be merged onto the REPLACEMENT drive (3641) using this technique without the need for additional PTDDC controllers. In this example only one PTDDC controller (3620) is utilized to attach the REPLACEMENT drive (3641) to the system and affect the copy of the first ORIGINAL drive (3631) to the REPLACEMENT drive (3641). Subsequent to this first copy, data from the second and subsequent ORIGINAL disk drives (3632) may be copied to the REPLACEMENT drive (3641) without the need for any additional hardware attachments or drive reformatting. Since the directory structure of the second ORIGINAL drive (3632) may not be compatible with that of the first ORIGINAL disk drive (3631), this data can be placed in a separate partition on the REPLACEMENT drive (3641) or manually copied to a separate directory tree on the REPLACEMENT drive (3641) with standard host computer system (3610) file copy utilities.

Storage Replication Application Context (3700)-(4000)

Prior Art Overview (3700, 3800)

Figure 37:
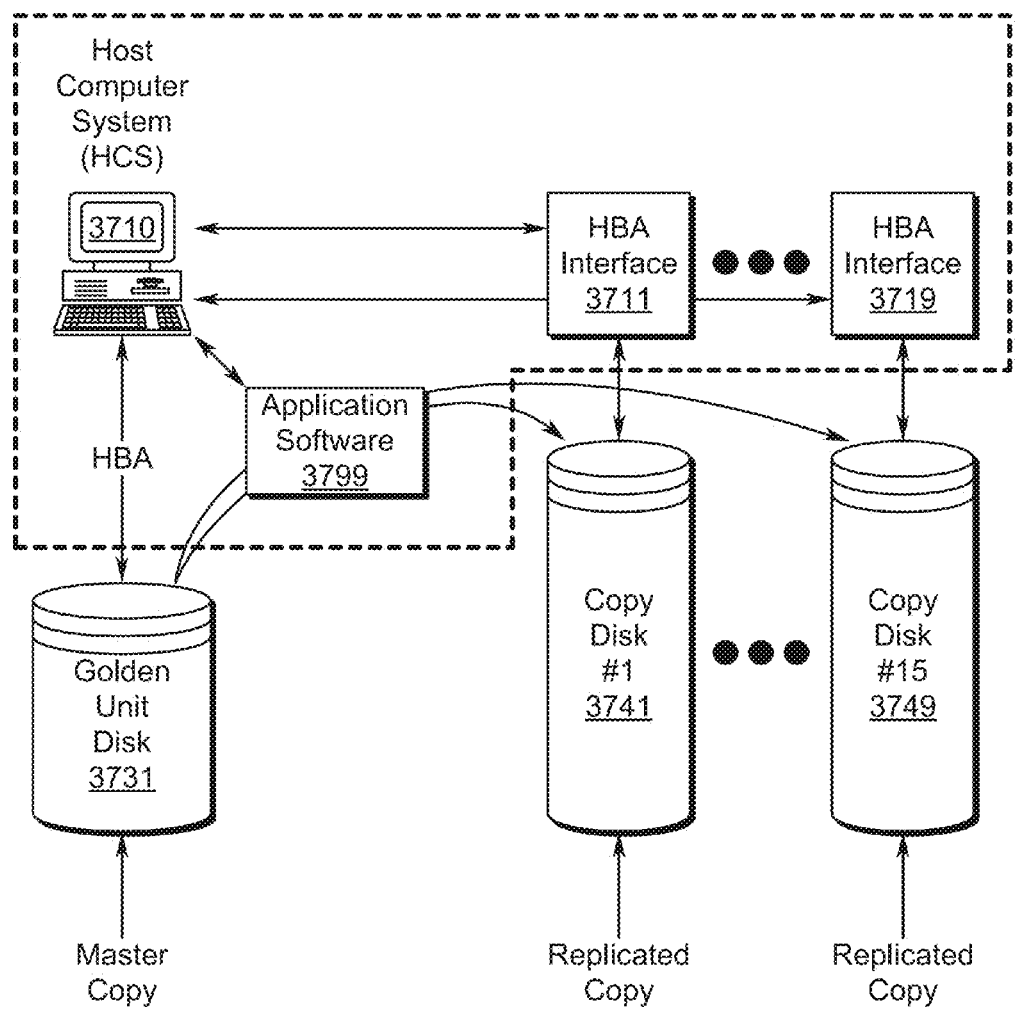
FIG. 37 illustrates a block diagram depicting prior art data replication from a MASTER disk drive to a number of REPLICATED disk drives connected using individual HBA interfaces.
Figure 38:
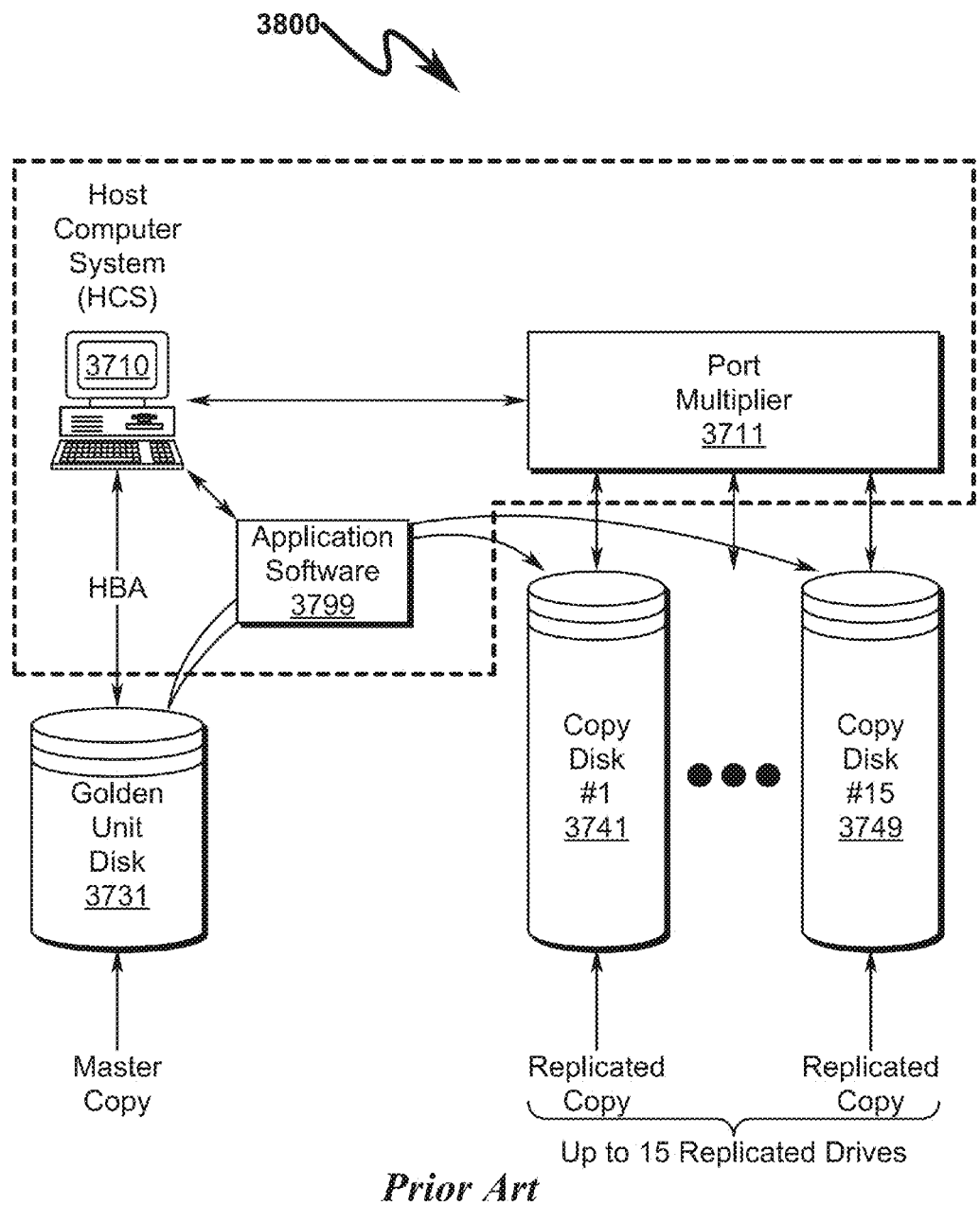
FIG. 38 illustrates a block diagram depicting prior art data replication from a MASTER disk drive to a number of REPLICATED disk drives connected using a port multiplier.

A significant advantage of the present invention over that of the prior art is in the application context of replicating disk storage when assembling standalone computer systems in a factory or manufacturing environment. It is a common occurrence in the IT manufacturing industry for a "golden unit" disk drive to be used as a replication "master" for the creation of thousands of "copy" units that are installed on newly-assembled standalone computer systems such as a desktop or server. This can occur in a variety of scenarios, but two scenarios are very common:

- As depicted in FIG. 37 (3700), an existing desktop, laptop, or other host computer system (3710) using one or more standard HBA disk drive adapters (3711) and a single master hard drive (3731) is used to make replicate disk drives (3741, 3749) that are placed into standalone computer systems; or
- As depicted in FIG. 38 (3800), an existing desktop, laptop, or other host computer system (3810) using a port multiplier (3811) and a single master hard drive (3831) is used to make replicate disk drives (3841, 3849) that are placed into standalone computer systems.

In either of these scenarios, the solution is generally to use application software (3799, 3899) operating on the host computer system (3810) to sequentially copy data from the master disk drive (3731, 3831) to the replicate disk drives (3741, 3749, 3841, 3849). This process for migration from the master disk drive (3731, 3831) to the replicate disk drives (3741, 3749, 3841, 3849) by necessity requires multiple data copies from the master disk drive (3731, 3831) to EACH of the replicate disk drives (3741, 3749, 3841, 3849). This process therefore takes N times the master-to-replicate copy time, where N is the number of replicate disk drives (3741, 3749, 3841, 3849).

Present Invention Solution (3900, 4000)

Figure 39:
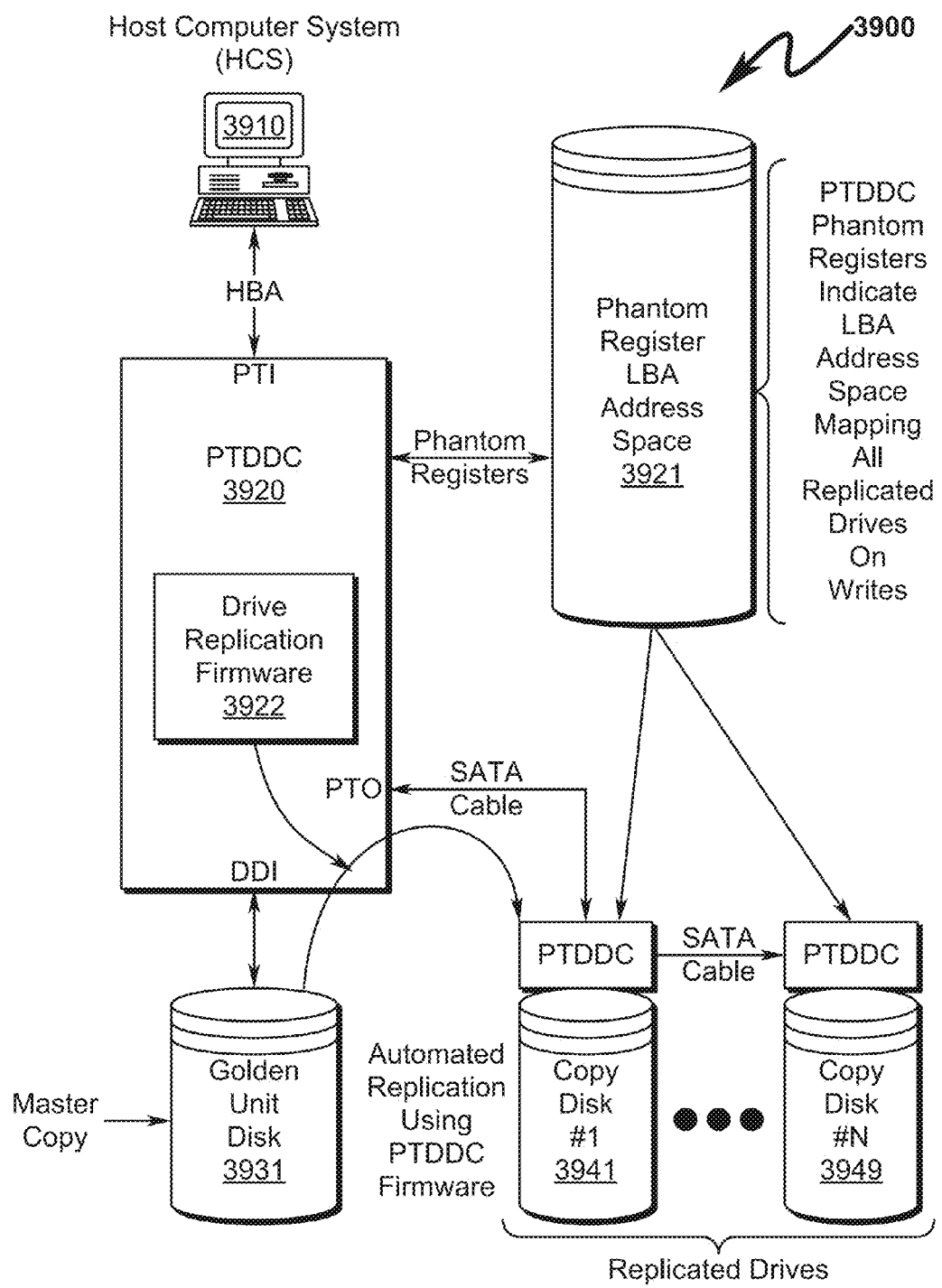
FIG. 39 illustrates a block diagram depicting exemplary present invention data replication from a MASTER disk drive to a number of REPLICATED disk drives connected to the MASTER disk drive using a PTDDC-enabled daisy-chain and PTDDC-based replication transfers.
Figure 40:
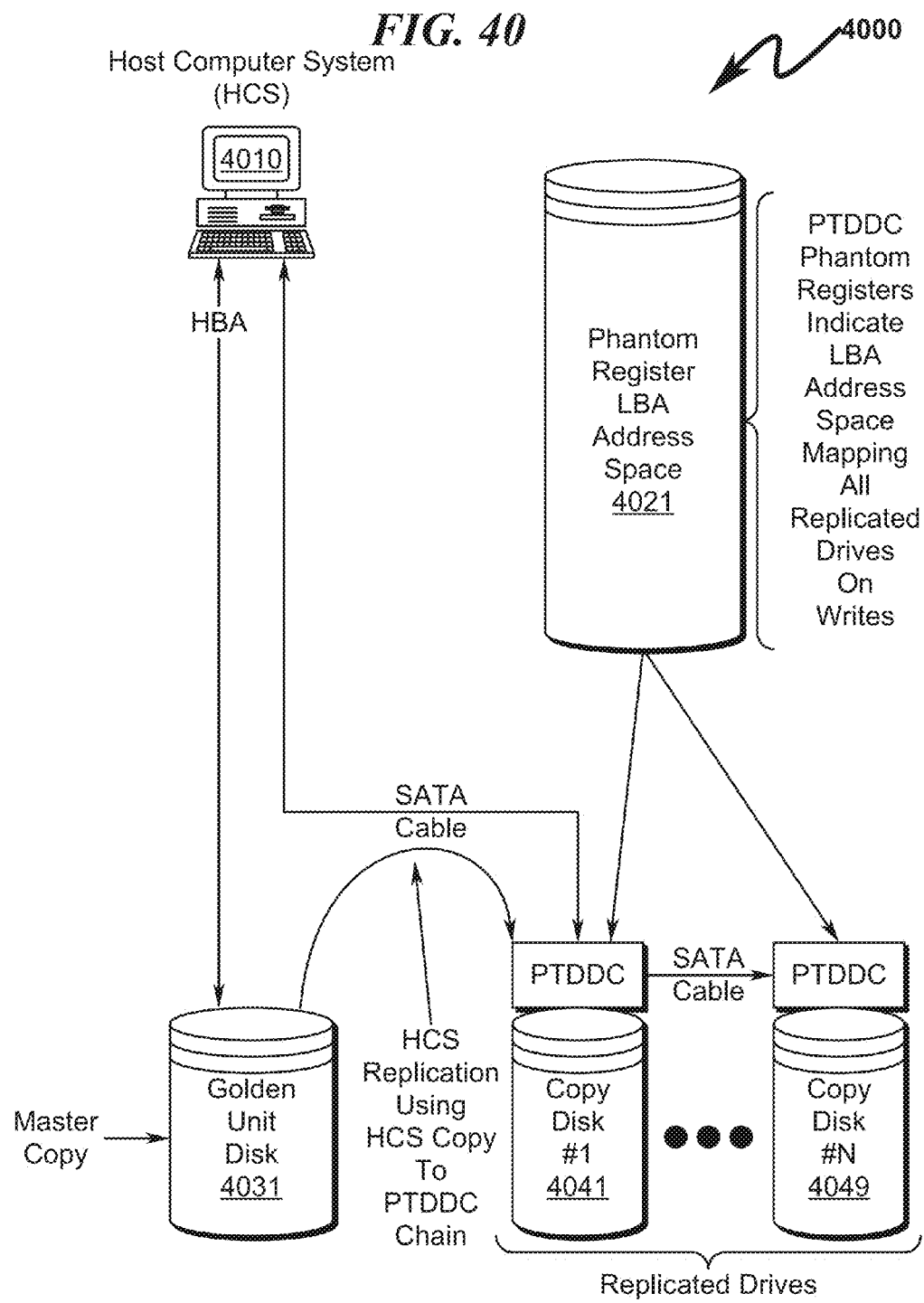
FIG. 40 illustrates a block diagram depicting exemplary present invention data replication from a MASTER disk drive to a number of REPLICATED disk drives connected to the MASTER disk drive using a PTDDC-enabled daisy-chain and HCS-based replication transfers.

The present invention addresses the N-copy replication delay associated with the prior art in the manner as generally depicted in FIG. 39 (3900) and FIG. 40 (4000). Here the HCS (3910) maintains a PTDDC-enabled (3920) master disk drive (3931) that sources data for the replication operation. However, this master disk drive (3931) is not used as a source for block-for-block writes to multiple sequential replicated drives (3941, 3949), but rather is used as a source for a SINGLE write operation in which the PTDDC LBA mapping table (3912) for the replicated drives (3941, 3949) is identical. This SINGLE write operation may be initiated by firmware/software (3922) resident on the PTDDC (3920) or may be initiated by a HCS write operation which copies data to the second drive in the PTDDC chain (as generally depicted in FIG. 40 (4000). Additionally, the write operation may optionally/automatically be followed by a PTDDC read operation to verify the data transfer integrity without the need for host computer intervention.

By setting up the LBA mapping registers to be identical for all of the replicated drives (3941, 3949), a single write to the first replicated drive (3941) will automatically be transmitted to all remaining drives in the PTDDC chain and will essentially be performed as a simultaneous single-shot write operation to all the drives. This eliminates the delays normally associated with the HCS writing to one replicated drive, then another, and another, and so on. Note that the PTDDC daisy-chain as depicted does not have the 15-drive limit imposed by port-multipliers used in the prior art nor does it incur the sequential copy penalty associated with the prior art replication methodology.

Finally, it must be mentioned that the data transfer rates associated with the present invention can be significantly higher than that of the prior art. If the data replication occurs under control of internal PTDDC firmware (3922) as depicted in FIG. 39 (3900), data may be streamed from the master drive copy (3931) to the replicated drives (3941, 3949) at speeds approaching the 1.5 Gbs-16 Gbs full bus speed of the SATA interface. Since there is significant software overhead associated with a HCS (3910) write operation, the use of internal PTDDC-based block-for-block copy firmware (3922) significantly reduces the data transfer latency as the write operations can be performed using hardware registers that sequence through the entire LBA space of the master drive copy (3931) and send this data stream directly to the PTDDC-chain for writing to the replicated drives (3941, 3949).

As indicated above and depicted in FIG. 40 (4000), the replication methodology can also be accomplished using a HBA-attached master disk drive (4031) that is used as source data for writes to the PTDDC daisy-chain (4041, 4049) in which all drives are mapped to the same LBA address space and any writes to a given LBA are automatically and simultaneously replicated among the PTDDC daisy-chain (4041, 4049) without any additional intervention by the HCS (4010).

Those skilled in the art will recognize that the replication scheme described above amounts to configuring the replicated drives (3941, 3949, 4041, 4049) in a RAID-1 configuration where all data written to the first drive (3941, 4041) in the PTDDC chain is automatically replicated on all other drives in the PTDDC daisy-chain. Note that the concepts taught previously with respect to the configuration of phantom registers in the PTDDC chain to indicate a much larger logical drive than which is physically present are applicable here as well. In this manner, each of the replicated drives (3941, 3949, 4041, 4049) may be replaced/augmented/expanded/copied in the future after installation in the standalone computer system without need for software reformatting of the drive to indicate a larger physically-present LBA address space. This utilization of inherent RAID-1 write replication within the PTDDC daisy-chain also illustrates how highly redundant RAID arrays may be easily constructed using the present invention without any additional time or software overhead on the HCS (3910, 4010).

Cold Storage Application Context (4100)-(4800)

Overview

The present invention is particularly amenable to use in situations where data must be placed in "cold storage" or otherwise stored for infrequent or intermittent access. One significant issue that all data centers must address is that of power consumption for storage arrays, as data storage power consumption represents approximately 30% of overall data center energy consumption. Within this context, there are situations in which large storage arrays must be constructed to store data that is infrequently accessed. In these situations it may be possible to "spin down" the disk drives in the storage array to reduce power consumption associated with operating the disk drive at its normal operating ready condition.

The present invention using the PTDDC controller may take this concept further by introducing the concept of "dynamic" cold storage that adapts the power consumption of a daisy-chain of PTDDC-enabled disk drives to be powered on only in circumstances where there is a need for data access. Normally in a traditional server environment, there may be options to "spin down" drives in the disk server farm during periods of non-use, but there has yet to be a system capable of full power shutdown based on dynamic data access. The PTDDC concept taught herein provides this next-generation power conservation capability.

Typical PTDDC-Array Structure RAID (4100)-(4200)

Figure 41:
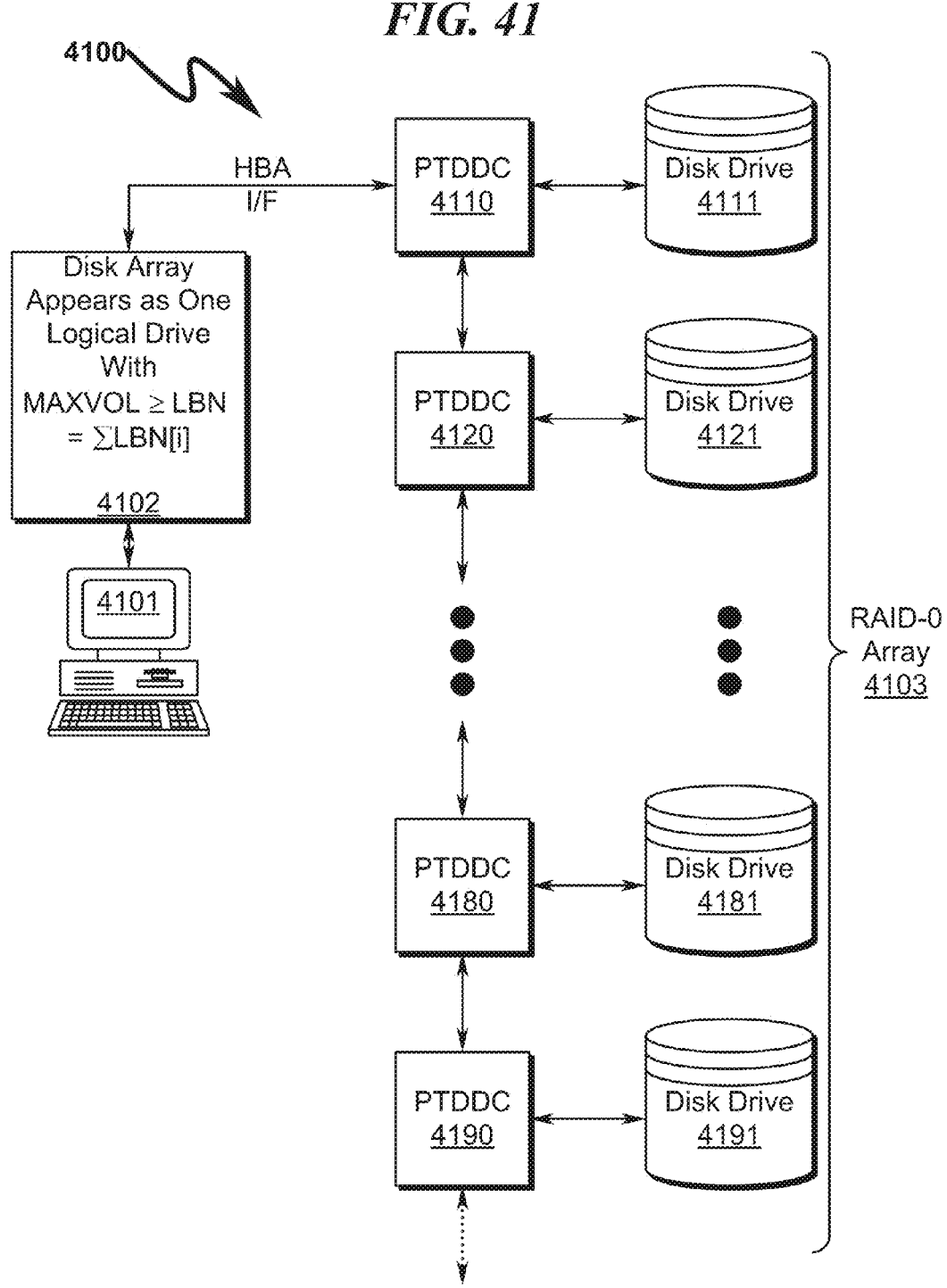
FIG. 41 illustrates a typical PTDDC-enabled RAID-0 disk storage array.
Figure 42:
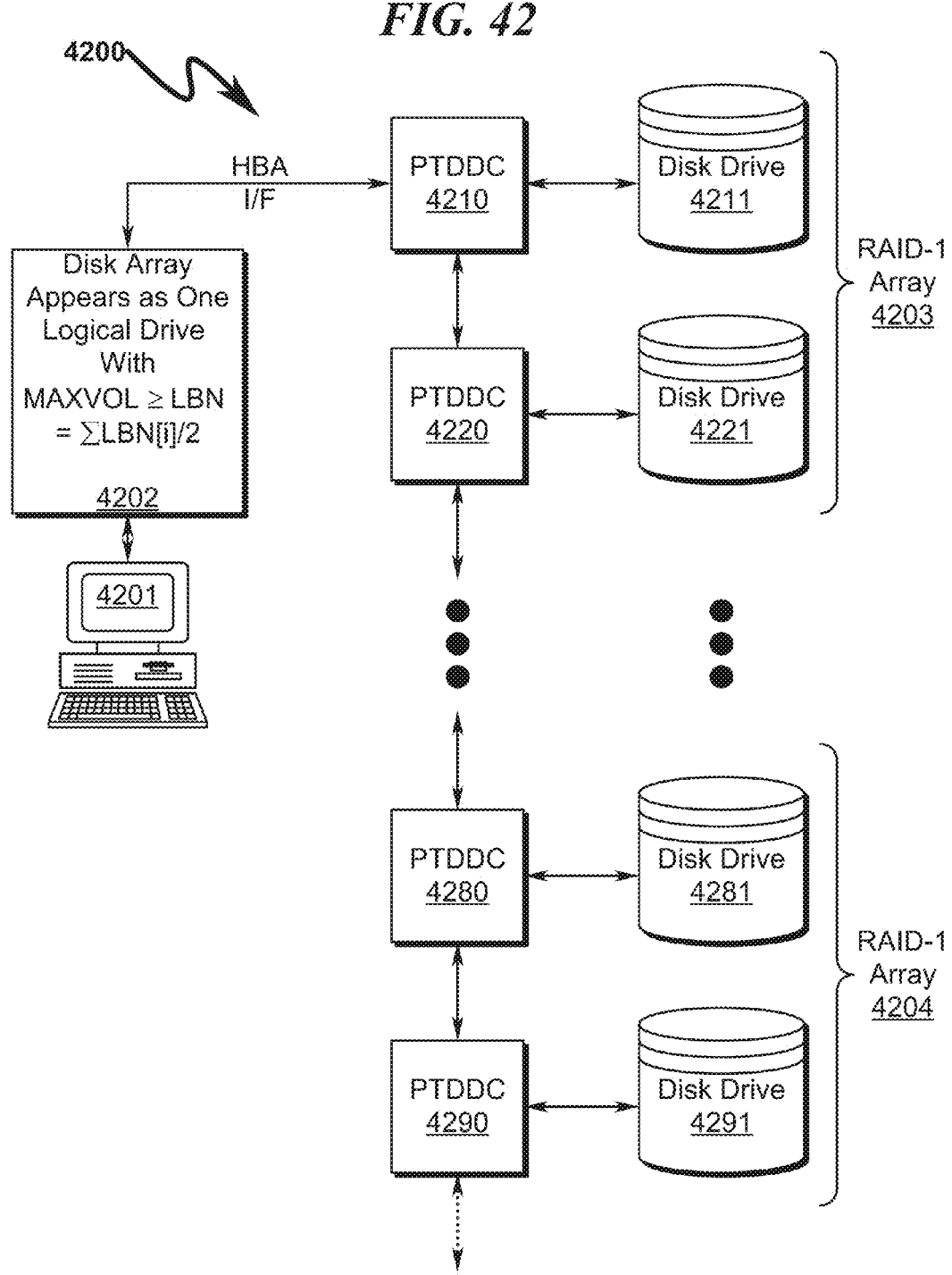
FIG. 42 illustrates a typical PTDDC-enabled RAID-1 disk storage array.

As generally depicted in FIG. 41 (4100) and FIG. 42 (4200), a PTDDC-enabled daisy-chain of disk drives may be configured as a RAID-0 configuration (FIG. 41 (4100)) as well as a RAID-1 configuration (FIG. 42 (4200)) by simply configuring the remapping registers on the individual PTDDC controllers (4110, 4120, 4180, 4190, 4210, 4220, 4280, 4290). In high-data-availability scenarios it is envisioned that the drives in these configurations will be "spun up" and continuously available to process read/write requests from the PTDDC controllers as initiated by the host computer system (4101, 4201).

Switched-Power PTDDC (4300)

Figure 43:
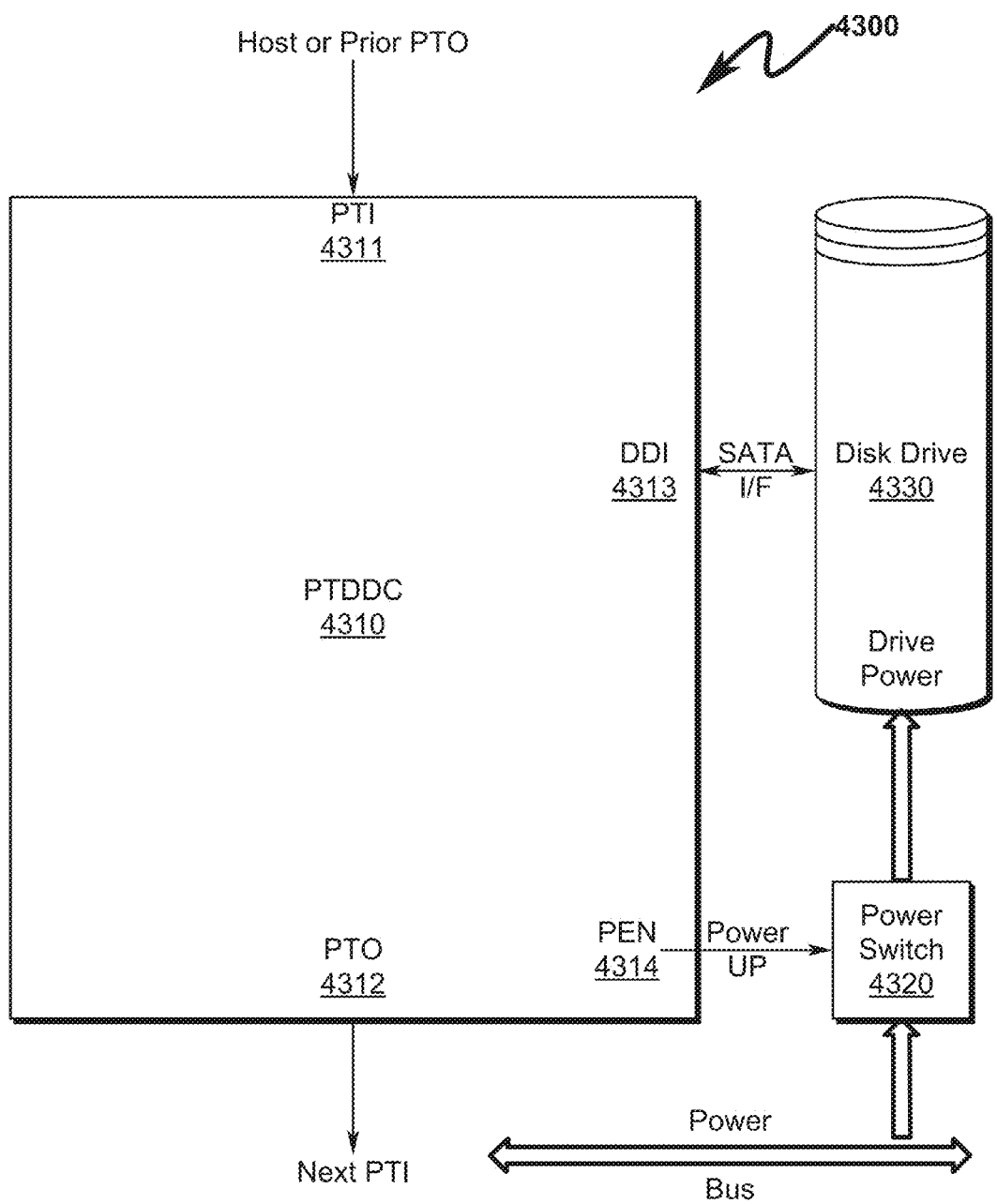
FIG. 43 illustrates an exemplary PTDDC-enabled disk drive incorporating switched disk drive power.

The PTDDC may be augmented as depicted in FIG. 43 (4300) with the ability to provide in addition to the normal PTI (4311), PTO (4312), and DDI (4313) ports a power enable (PEN) (4314) signal that permits switching of power to a power controller (4320) that services the locally attached disk drive (4330). In this manner, power to the locally attached disk drive (4330) may be completely shut down during periods of disk drive inactivity.

Note that this level of shutdown is more than just a "spinning down" of the disk drive, but can entail complete suspension of power to the drive electronics as well. This full shutdown mode is very compatible with "cold storage" applications in which data is archived to disk drives and not frequently accessed thereafter. Such would be the case for most types of archival backup performed in the IT industry, as well as many applications involving television recordings, video surveillance, telephone audio recording, and the like.

Switched Power PTDDC Detail (4400)

Figure 44:
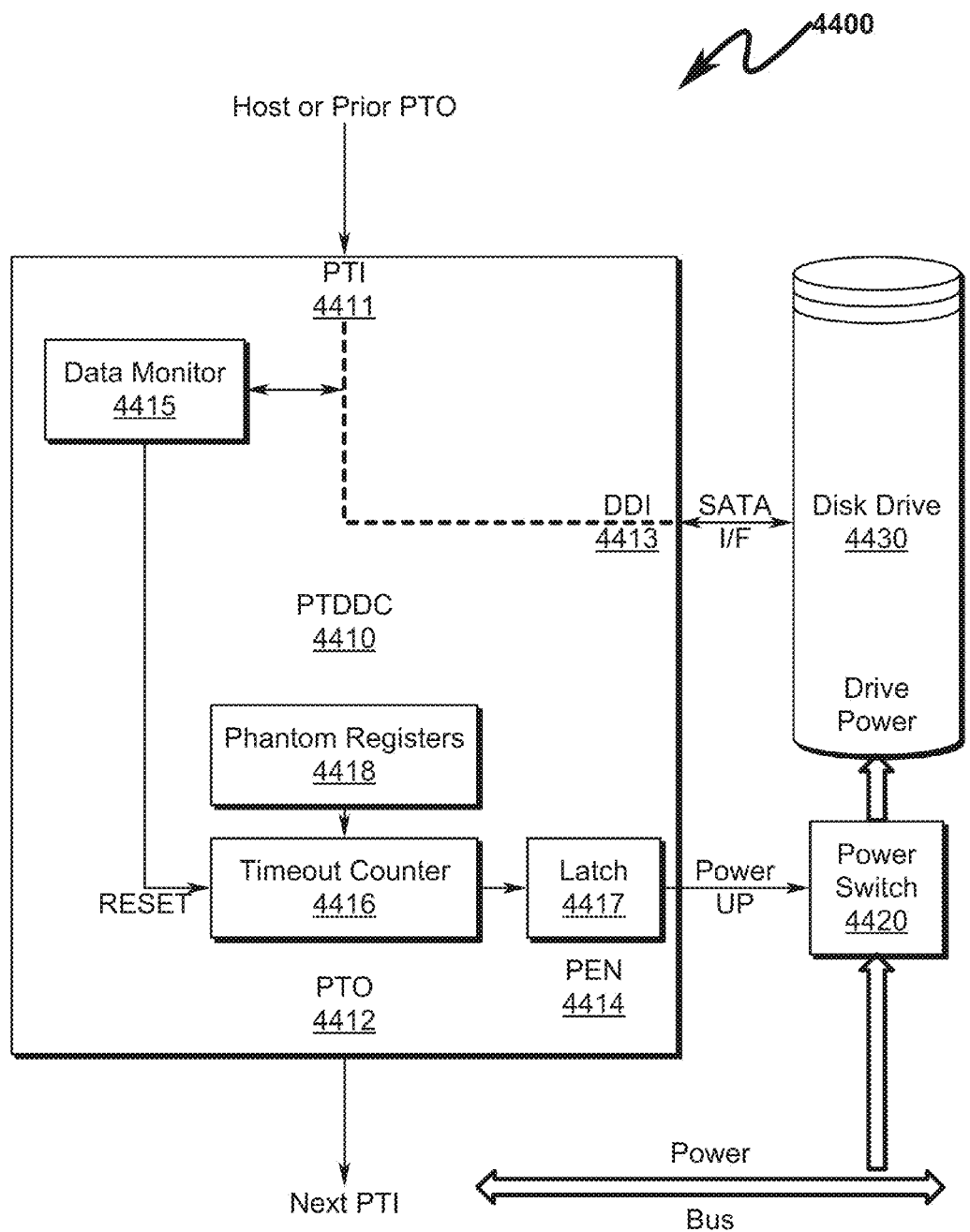
FIG. 44 illustrates a detail view of an exemplary PTDDC-enabled disk drive incorporating switched disk drive power.

As generally depicted in FIG. 44 (4400), the PTDDC (4410) may be augmented with a data monitor (4315) that monitors any read/write traffic to the DDI port (4413) and if this traffic is detected, a RESET is generated to a timeout counter (4416) that normally counts to a predetermined value and then sets a latch (4417) that terminates power (disables PEN (4414)) to the power switch (4420) thus disabling power to the disk drive (4430). Note that the value for the timeout counter (4416) may be set via access to the phantom registers (4418) within the PTDDC (4410). In this manner the PTDDC may be configured to automatically shut down power to the disk drive (4430) after a certain period of inactivity. Upon detection of new I/O requests directed to the disk drive (4430), the data monitor (4315) reverses the procedure and enables the latch (4417) and PEN signal (4414) to activate power to the disk drive (4430) and thus permit data access to the drive.

Asymmetric READ/WRITE Timeouts (4500)

Figure 45:
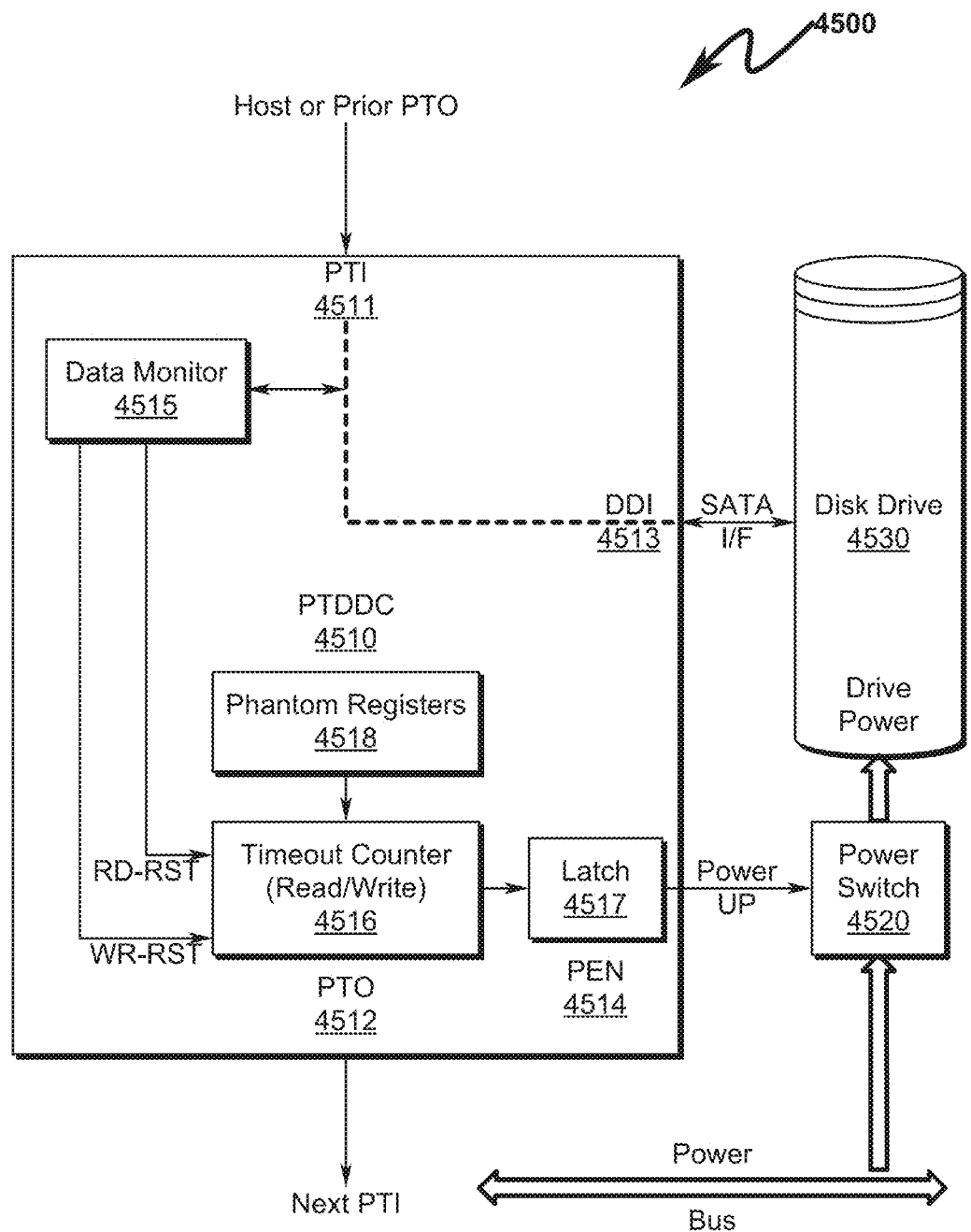
FIG. 45 illustrates a detail view of an exemplary PTDDC-enabled disk drive incorporating switched disk drive power with asymmetric READ/WRITE timeouts.

As generally depicted in FIG. 45 (4500), the data monitor (4515) may be configured for separate READ-RESET and WRITE-RESET signals to the timeout counter (4516) based on the type of data access to the disk drive (4530). This would, for example, permit an infrequent write to the drive to trigger a much longer timeout delay for power shutdown that that which was incurred by an infrequent drive read operation.

Time-Based Calendar Timeouts (4600)

Figure 46:
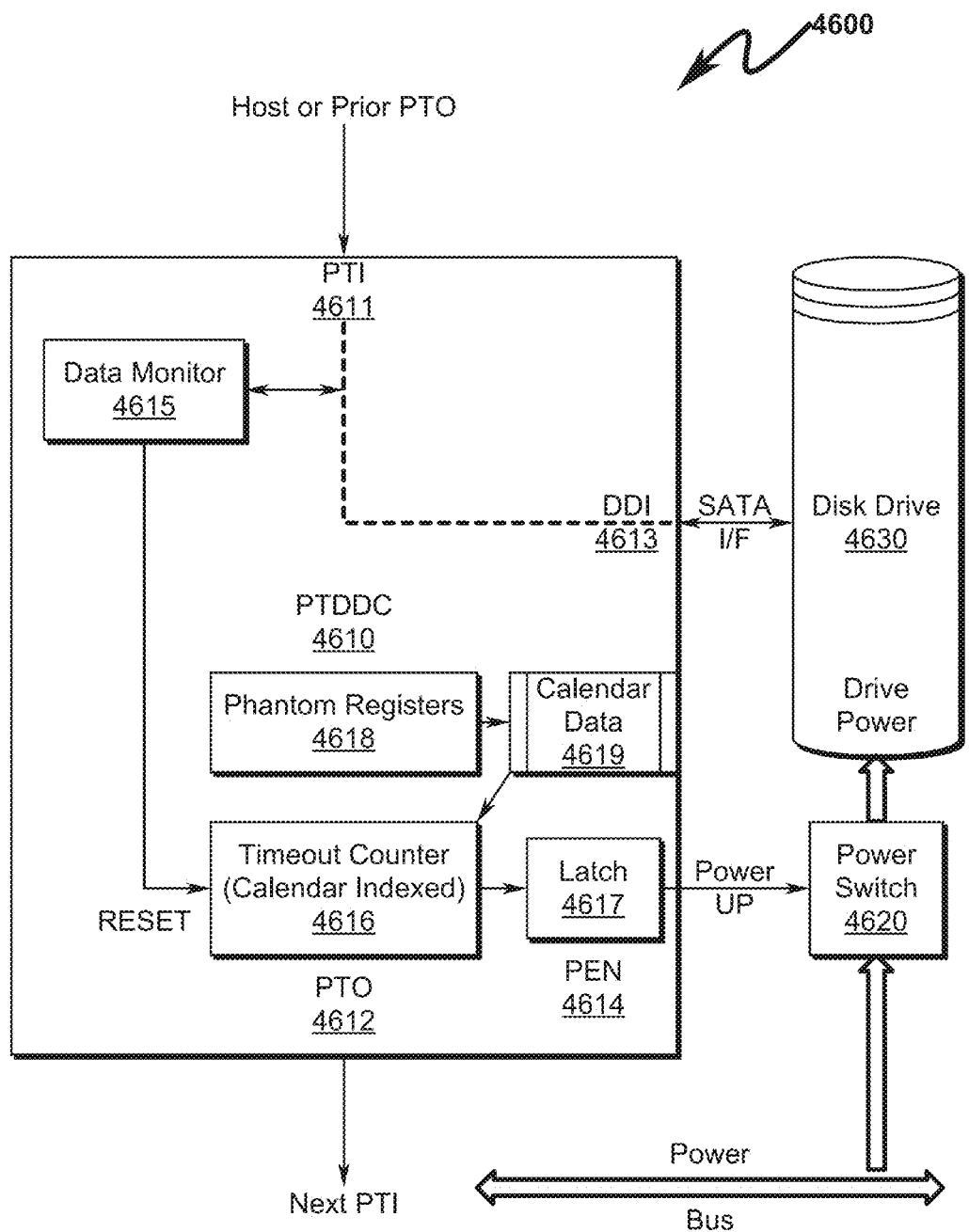
FIG. 46 illustrates a detail view of an exemplary PTDDC-enabled disk drive incorporating switched disk drive power with time based calendar timeouts.

As generally depicted in FIG. 46 (4600), the timeout counter (4616) may be configured to vary the timeouts for power disconnection based on calendar information (4619) configured by the phantom registers (4618). In this manner, historical data on data accesses to the disk drive (4630) may be analyzed to enable the disk drive to be more available during certain times of day or based on other calendar information. For example, this would permit high-traffic times of the day to have more responsive data access than lower traffic times of day. The same rationale might be used to anticipate holiday traffic or traffic at the end of a month or business quarter.

Switched Power PTDDC Switching Example (4700)

Figure 47:
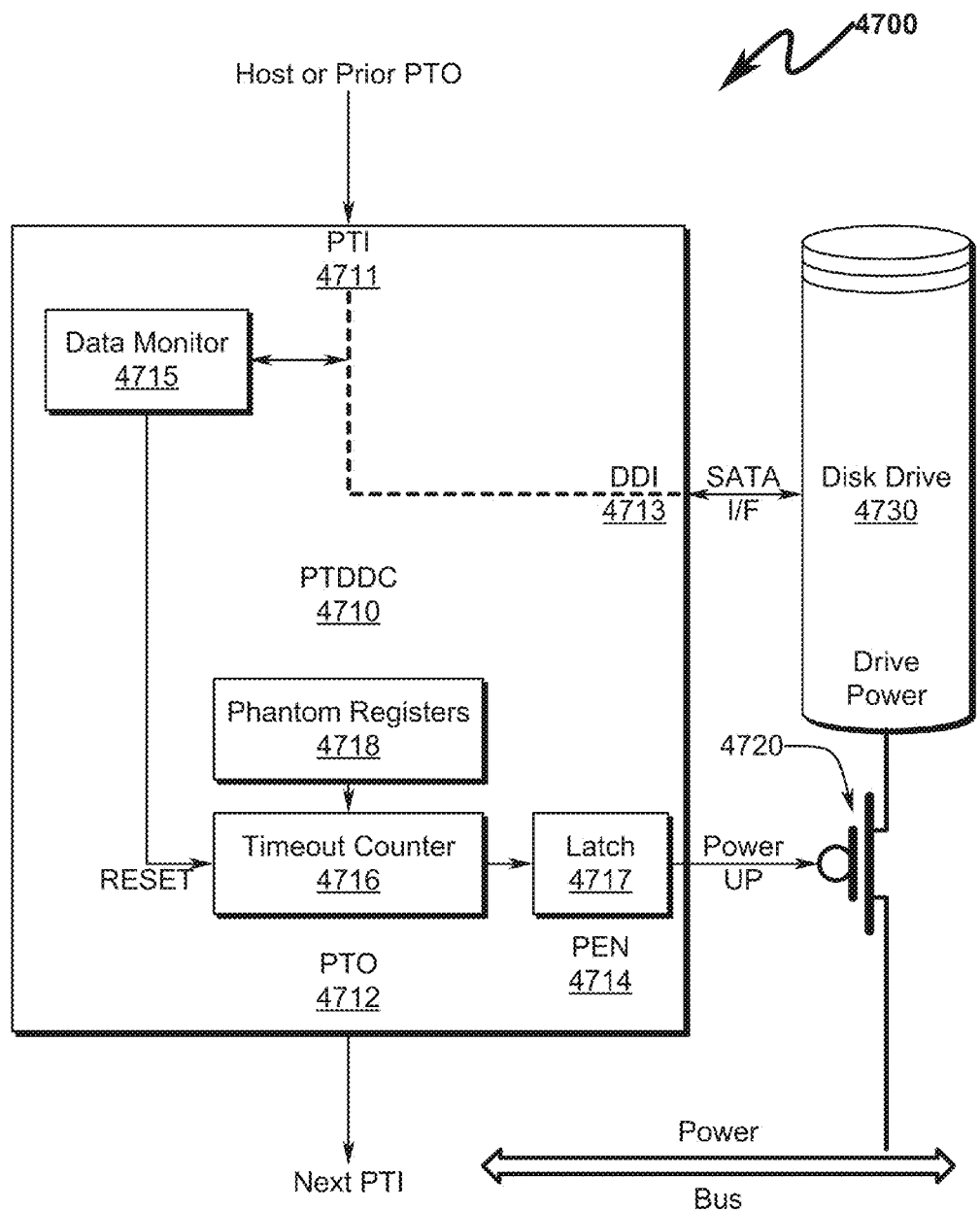
FIG. 47 illustrates a detail view of an exemplary PTDDC-enabled disk drive incorporating switched disk drive power using a PCH MOSFET.

As generally depicted in FIG. 47 (4700), the power switching device may comprise a power MOSFET (4720) (typically selected for low RDS-on characteristics). In this instance the PEN signal (4714) would have ACTIVE-LO characteristics.

Switched Power PTDDC POL Control (4800)

Figure 48:
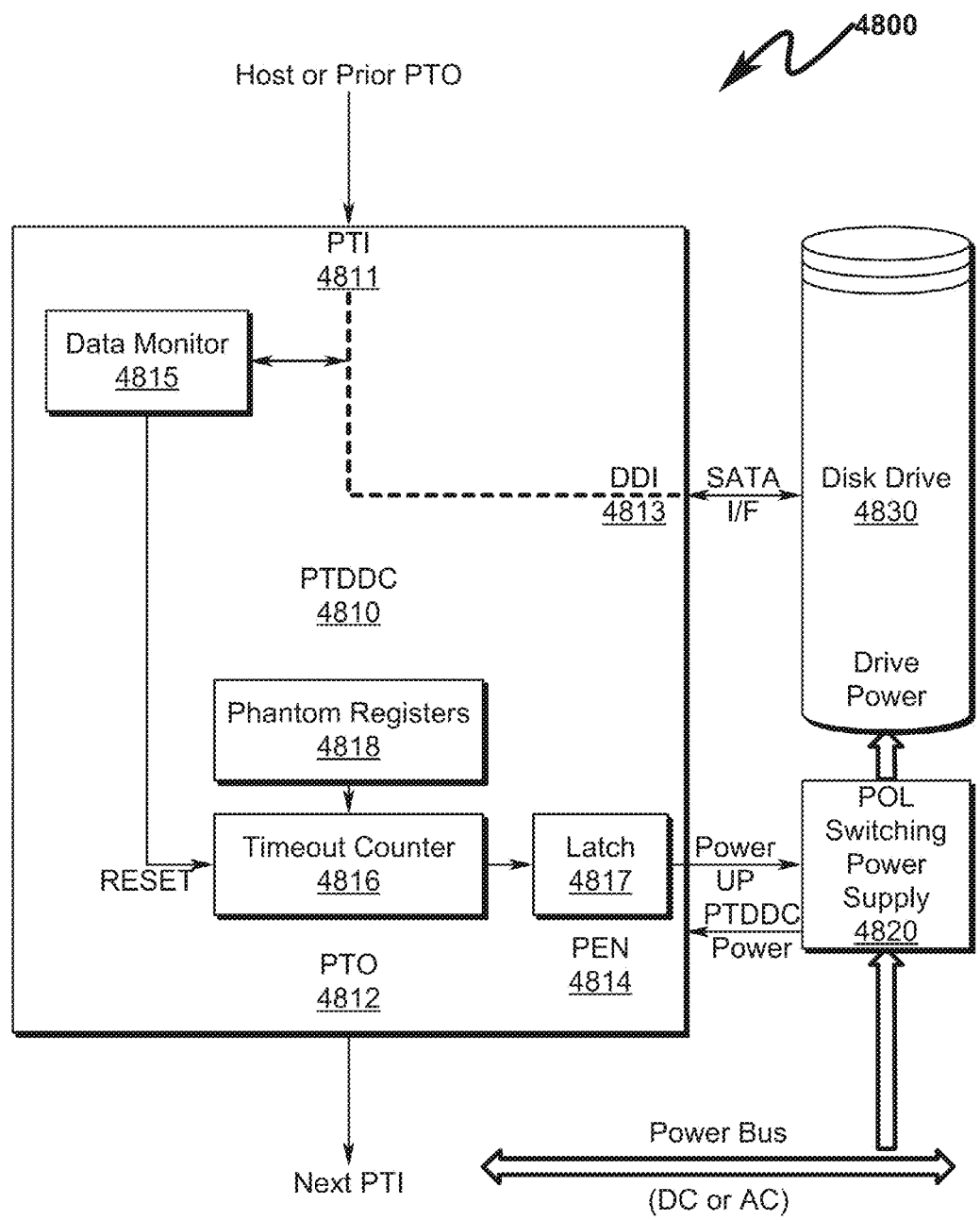
FIG. 48 illustrates a detail view of an exemplary PTDDC-enabled disk drive incorporating switched disk drive power using switched mode point-of-load (POL) power supply.

As generally depicted in FIG. 48 (4800), the power switching device may comprise a point-of-load (POL) switching power supply (4820). This provides a very efficient method of power transfer to the individual disk drives because in this circumstance the power bus can be a conventional 48 VDC power bus or a conventional AC power bus. By distributing the power supply down to the individual disk drive it is possible to reduce the hardware required to support a large rack of disk drives with a single power supply that, for example, provides regulated 5 VDC and 12 VDC to the disk drive daisy-chain. Localized POL power supplies for each disk drive can be economically fabricated using a number of switching power supply ICs available on the market and well known to those skilled in the art. The POL power supply (4820) as indicated may optionally incorporate separate non-switched low-power circuitry to supply power to the PTDDC (4810).

Integration with Disk Drive

Figure 3:
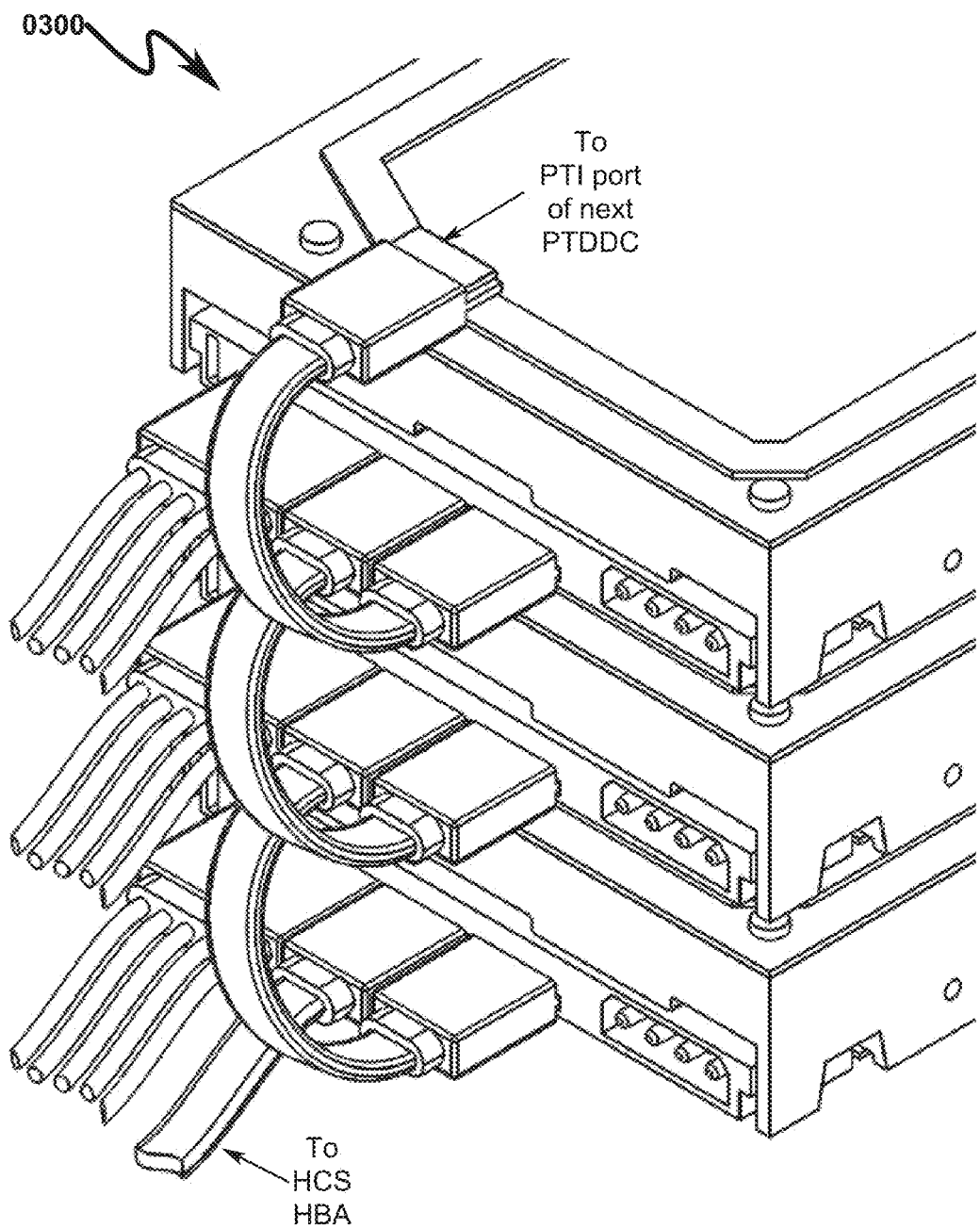
FIG. 3 illustrates a front view of a PTDDC active PCB backplane with detail of a modified SATA interface connector.
Figure 4:
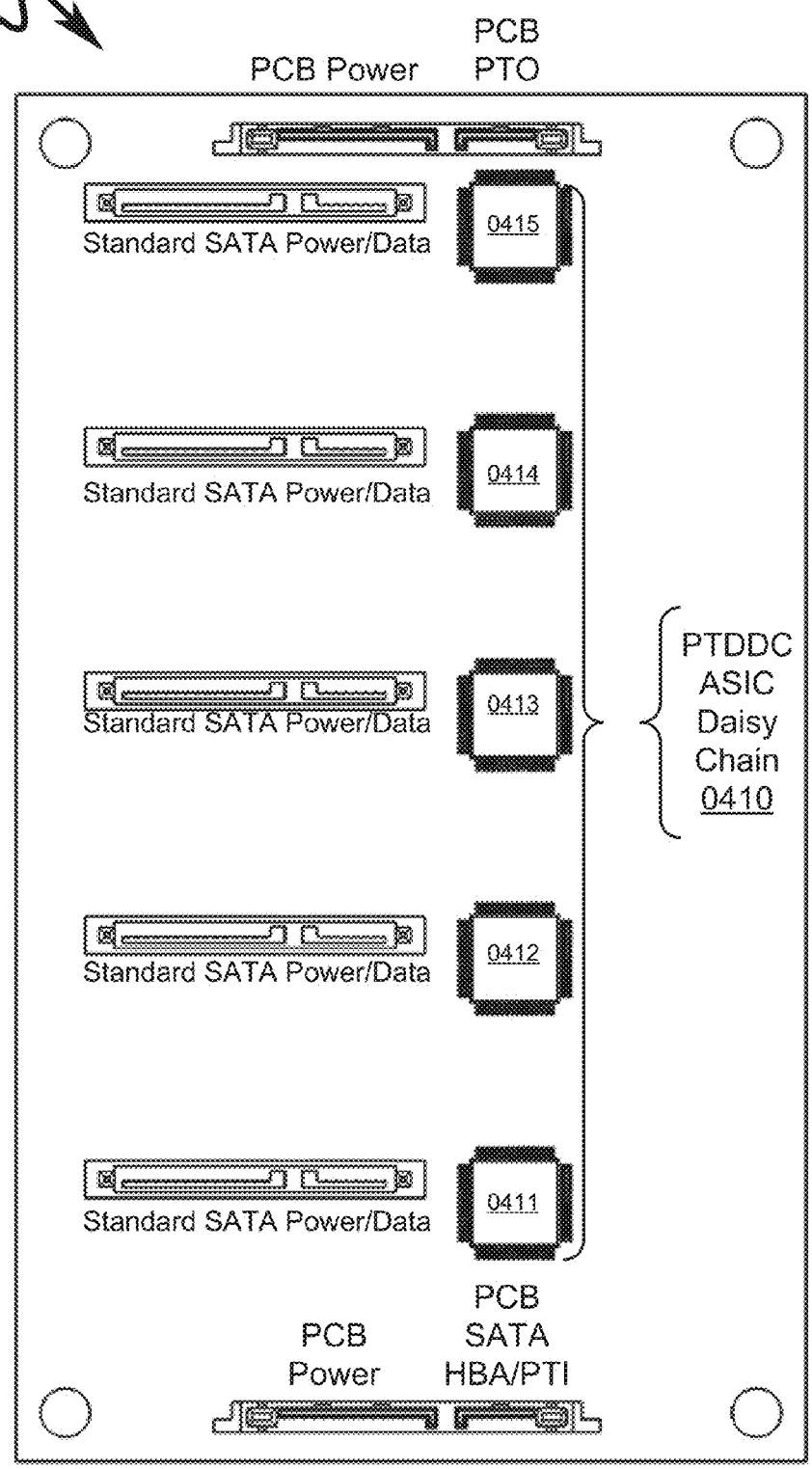
FIG. 4 illustrates a front left perspective view of a PTDDC active PCB backplane with a PTDDC-enabled SATA disk drive inserted into the PCB backplane (partially filled virtual storage)
Figure 5:
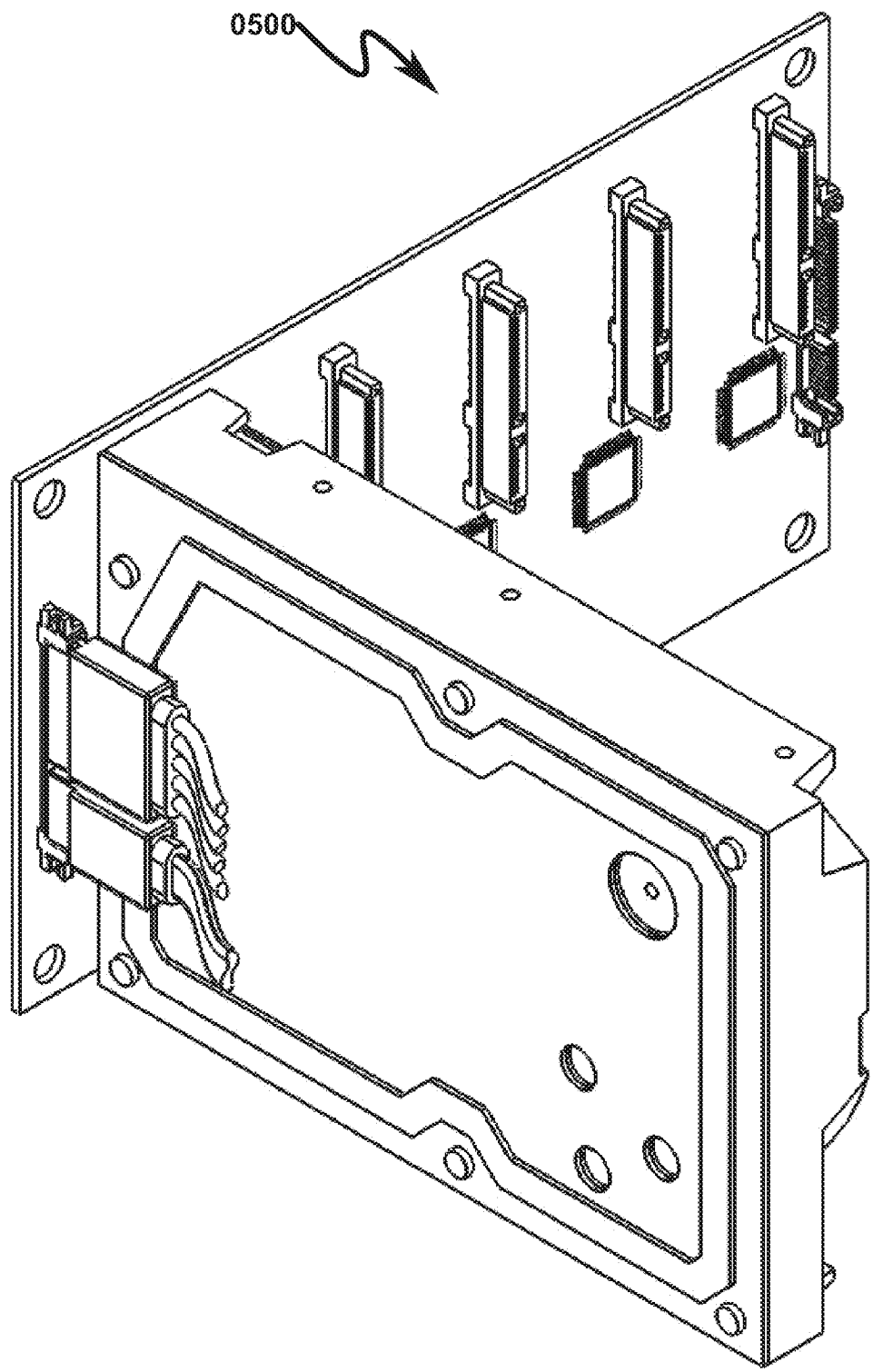
FIG. 5 illustrates an empty rack/backplane integrated subassembly implementing a PTDDC daisy-chain.
Figure 6:
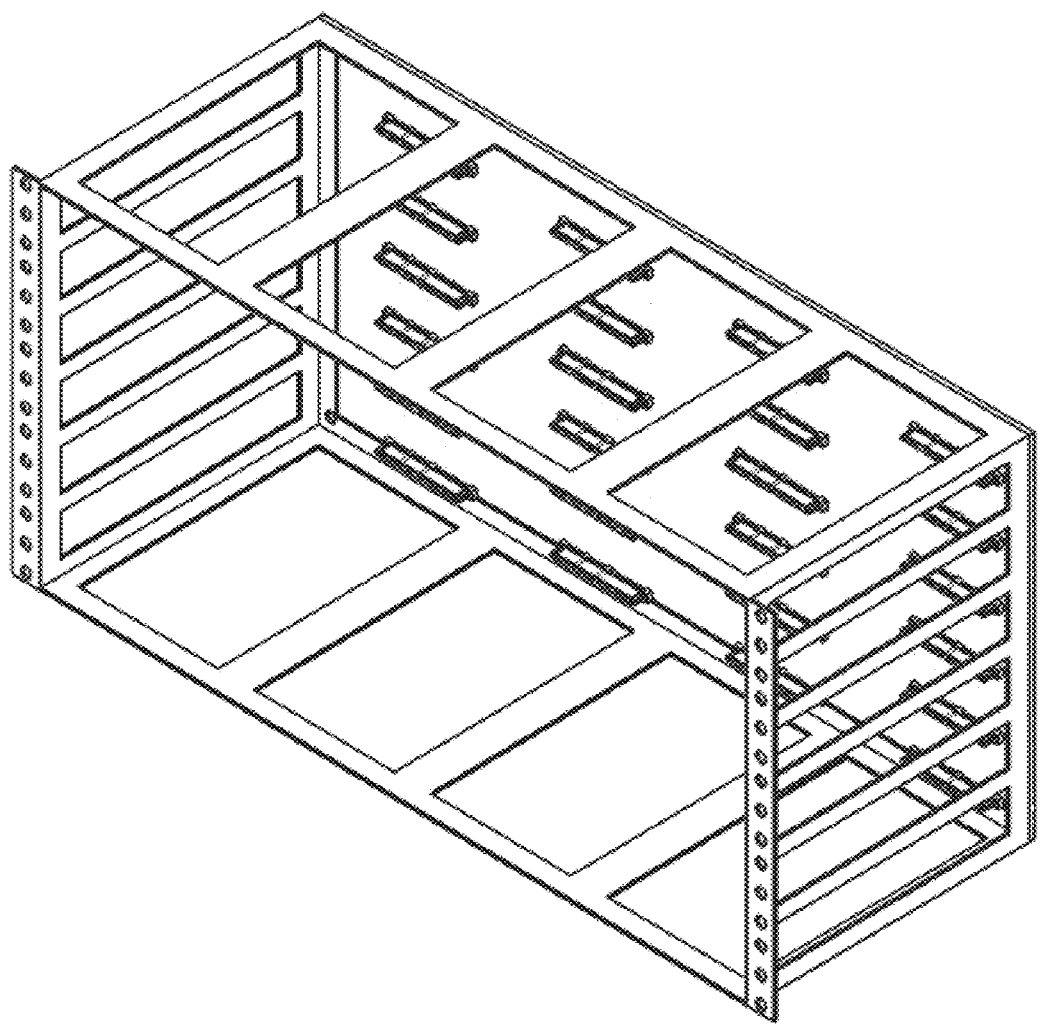
FIG. 6 illustrates a populated rack/backplane integrated subassembly implementing a PTDDC daisy-chain.

Any of the power control techniques discussed herein can be integrated within the disk drive itself or incorporated on a backplane containing PTDDC control ASICs. Normal disk drives incorporate a power connector and SATA I/O connector. The modified PTDDC-enabled disk drives as generally depicted in FIG. 3 (0300) incorporate a power connector, PTI/HBA port, and PTO port. Power supplied in this example could be configured as unregulated DC bus voltage (e.g., 48 VDC) that could then be regulated on-board the disk drive PCB or switched by the PTDDC on the disk drive PCB. Integration of the power switching logic on the PTDDC-enabled backplanes as depicted in FIG. 4 (0400) and FIG. 5 (0500) is also anticipated.

Distributed Power Control

Normally the type of distributed power supply control discussed above would require significant additional cabling and control logic. The advantage of the PTDDC-enabled daisy-chain approach is that this power control (and power conditioning if using a switched-mode power supply) can be distributed along the daisy-chain and thus reduce the interconnection costs associated with this fine granularity of power control. These interconnection costs are the driving force in interconnecting disk drives into large arrays and as such to reduce power consumption would significantly increase cost for most conventional disk arrays. The present invention, by distributing this control along the daisy-chain, permits large-scale integration of disk drives incorporating individual power control without increasing the overall cost of the storage array.

Coordination with READ/WRITE Operations

The use of the PTDDC to provide power control to the locally attached disk drive in the above-discussed scenarios has the advantage that the PTDDC can communicate with the locally attached disk drive to ensure that read and write operations have fully completed and are committed to the disk drive before power is removed from the disk drive. This granular distributed coordination permits a high degree of data integrity and eliminates the need for any operating system or software monitoring of the power-up/power-down sequencing of the disk drive during the power switching operations. In this way the power control functions remain transparent to the operating system and host application software.

Exemplary PTDDC SDD Mapping Functionality (4900)-(5600)

Figure 49:
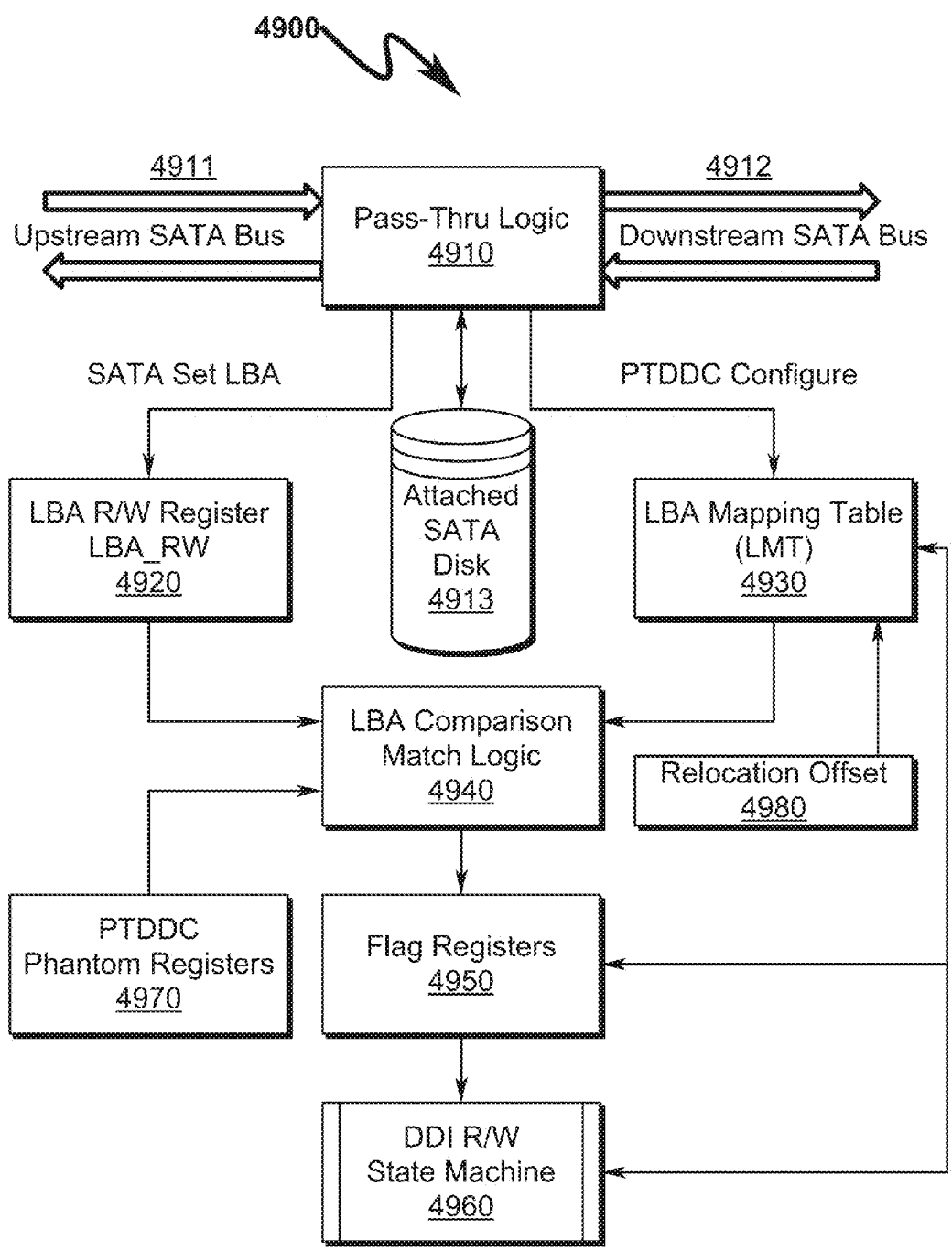
FIG. 49 illustrates an overview of a LBA mapping table (LMT) structure useful in some preferred invention embodiments.

The LBA comparison logic operation described in related patent applications including the disk LBA R/W address, LBA mapping table, and LBA mapping comparator may take a single-entry form or may as depicted in FIG. 49 (4900) and involve a multiple number of entries that permit LBA mapping within a single PTDDC-attached SATA disk drive to be fragmented. This fragmented LBA mapping may be utilized to remap the SDD information to physical locations on the attached DDI disk drive by various methods as described herein. While a simple mapping table may include just a single HBA-to-LBA map, more complex embodiments of the present invention may use multiple maps within a given PTDDC. In this manner, a variety of SDD information may be remapped by the PTDDS such that an operating system accessing the PTDDC daisy-chain will be unaware of the sparsely populated virtual storage within the PTDDC daisy-chain. Further information on how this may be accomplished is provided below.

LBA Matching Overview (4900)

While there are a variety of methods to implement the PTDDC daisy-chain functionality, one preferred system implementation is depicted in FIG. 49 (4900) wherein the PTDDC pass-thru hardware logic (4910) ties an upstream (PTI) (4911) SATA data stream to a downstream (PTO) (4912) SATA data stream. Within this context an attached SATA disk drive (4913) is connected via the PTDDC DDI port. As depicted in this diagram, any WRITE by the host to the LBA start register (4920) is written internally to the PTDDC. This internal register is then compared to a LBA mapping table (LMT) (4930) by hardware match logic (4940) that then configures a number of FLAG registers (4950) depending on the results of the match. Information from these matches is then used by a DDI R/W state machine (4960) to determine what data is transferred to/from the attached SATA disk (4913) and under what circumstances this data is transferred.

As depicted in this diagram, the PTDDC phantom register set (4970) may be used as part of the comparison match logic to affect relocation of the SDD-specific LBA request to a specific part of the disk drive determined by a relocation offset register (4980). The type of relocation that can be performed may vary based on application context an may involve arithmetic operations performed on elements of the PTDDC phantom register set (4970), such as a calculation involving the maximum LBA in the virtual address space, or a range of addresses relative to the maximum LBA in the virtual address space.

LBA Mapping Table (LMT) Detail (5000)

Figure 50:
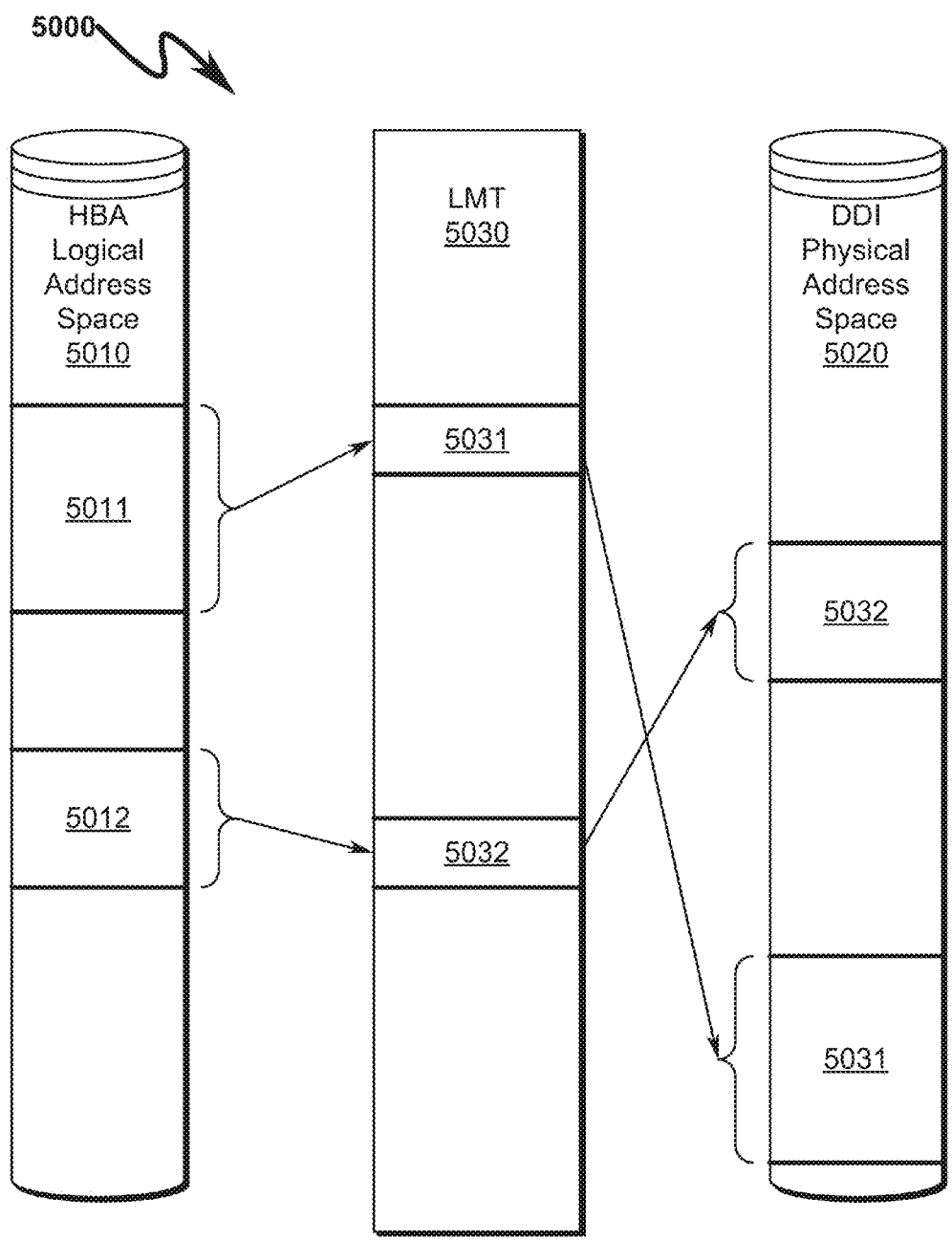
FIG. 50 illustrates a detail view of a LBA mapping table (LMT) structure useful in some preferred invention embodiments.
Figure 51:
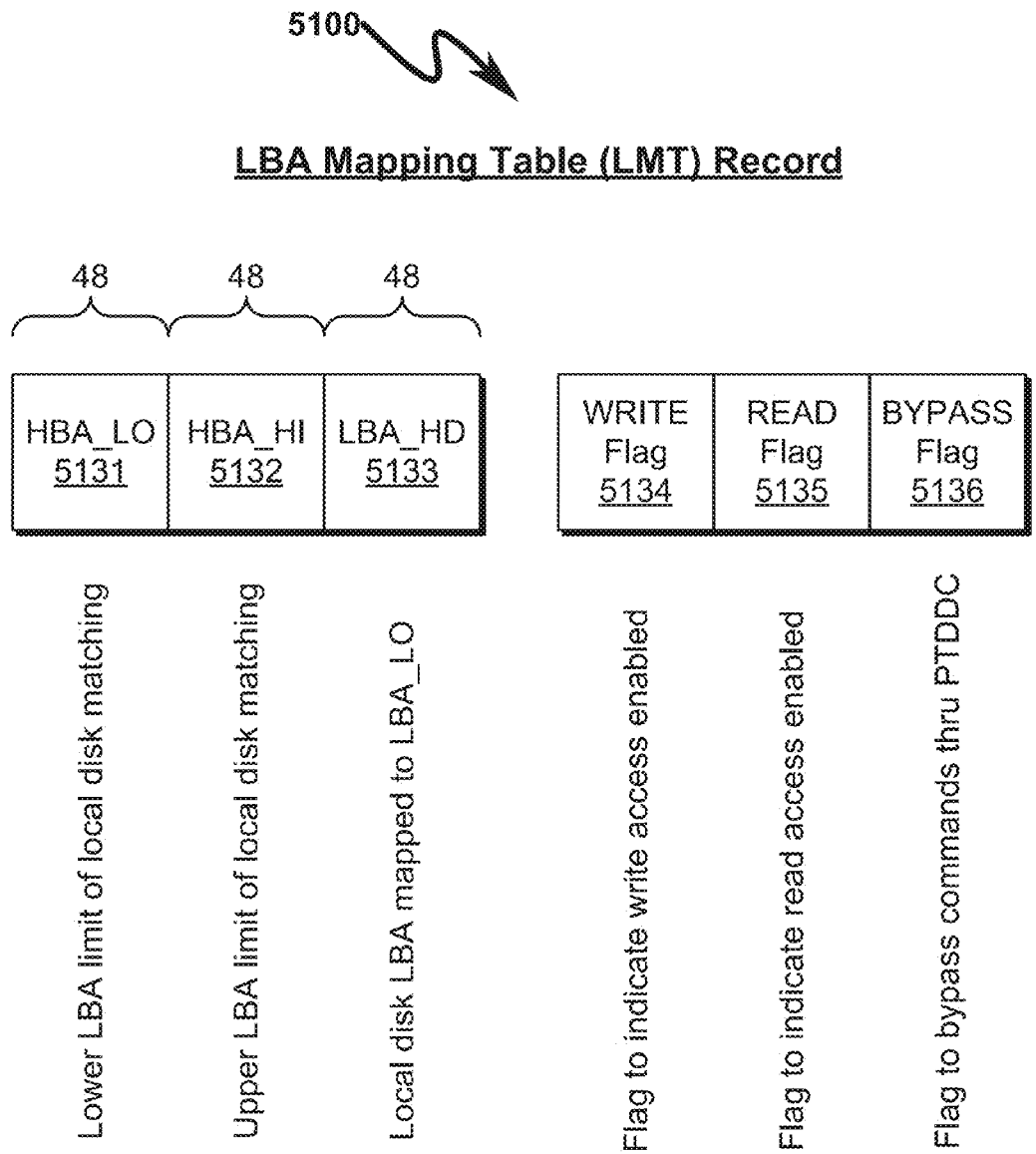
FIG. 51 illustrates a detail view of LBA mapping table (LMT) record structure useful in some preferred invention embodiments.

An exemplary LBA mapping table (LMT) is depicted in FIG. 50 (5000) with record detail presented in FIG. 51 (5100). In FIG. 50 (5000) the HBA logical address space (5010) (as seen from the HBA/PTI ports) is mapped to the locally attached SATA DDI physical address space (5020) via the LMT (5030). Portions (5011, 5012) of the HBA address space (5010) are matched via the LMT (5030) record entries (5031, 5032) to the DDI (5020) physical address space (5021, 5022). As depicted in the diagram, the mappings may overlap and not necessarily be contiguous within either of the entities (5010, 5020, 5030). Note that in some cases SDD information in the HBA logical address space (5010) may be mapped to beginning or end structures (5031) in the DDI physical address space (5030).

LBA Mapping Table (LMT) Record Detail (5100)

Additional detail of the LMT is presented in FIG. 51 (5100) that depicts a LMT record. Each LMT record in this preferred embodiment contains a LOW (HBA_LO) (5131) and HIGH (HBA_HI) (5132) mapping address tied to the HBA address map and a corresponding DDI HD (LBA_HD) (5133) LBA address associated with the attached SATA disk drive. Within this exemplary application context, the LBA_HD starting physical address corresponds to the HBA_LO logical HBA address. As depicted, the HBA_LO, HBA_HI, and LBA_HD entries are 48-bits in length, corresponding to the width of a traditional SATA LBA register.

Associated with the LBA record is a WRITE flag (5134) that indicates that HBA writes are to be processed by this mapping record. Note in some circumstances (such as RAID implementations), the DDI writes may be processed from downstream data. A READ flag (5135) permits reading of data from this DDI port. As with the WRITE flag (5134), this data may be sourced from other drives in the PTDDC chain, as in the case where a master/slave are written, but only the master is read by the HBA. A BYPASS flag (5136) indicates that HBA commands are to be ignored and merely passed through the PTDDC for this LBA map range (HBA_LO-HBA_HI).

This LMT example may be loaded with SDD information such that, for example, the HBA logical addresses corresponding to the end of the virtual address space are mapped to a specific portion of the physically present local LBA address space in of the DDI-attached disk drive. This could, for example, provide for remapping of the duplicate NTFS GPT header and GPT table to a physical portion of the DDI-attached disk drive.

LMT Parallel Comparison Logic (5200)

Figure 52:
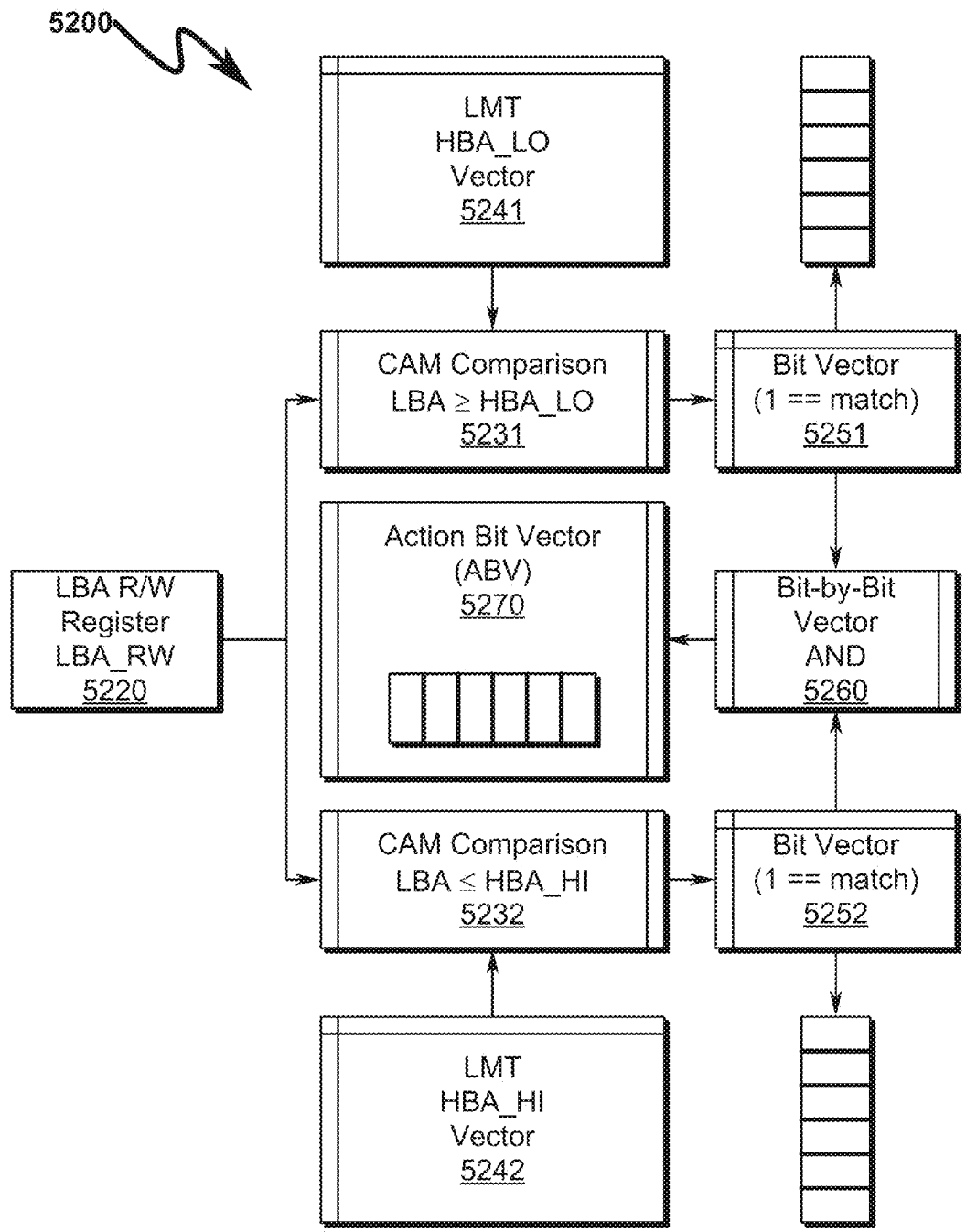
FIG. 52 illustrates an exemplary schematic depicting parallel LMT comparison logic.
Figure 53:
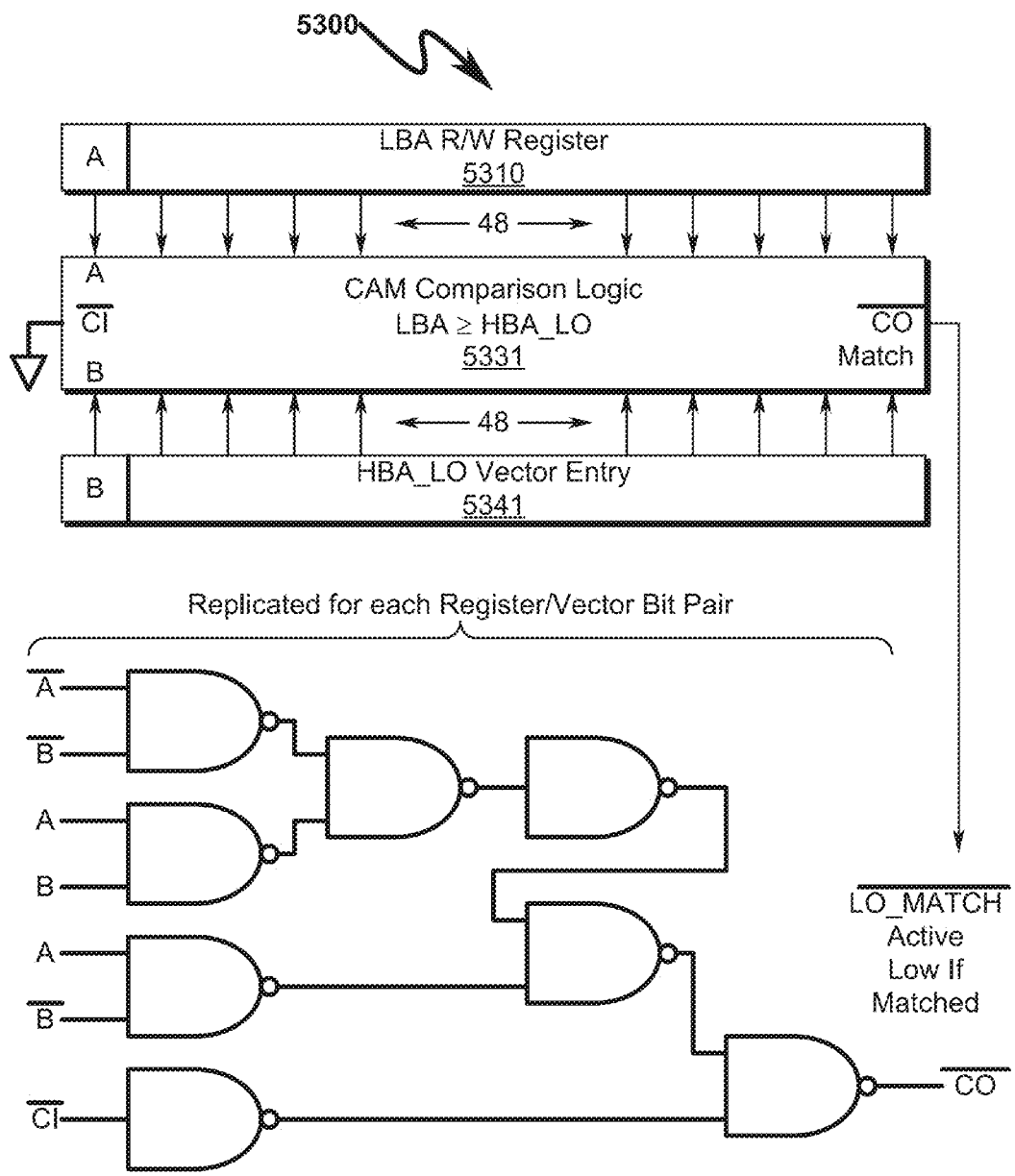
FIG. 53 illustrates an exemplary schematic depicting CAM comparison logic.

It is anticipated that in many preferred invention embodiments the LBA to which the next disk read/write will occur will be matched in parallel with entries in the LMT. An exemplary parallel LMT comparison logic schematic is provided in FIG. 52 (5200) wherein the LBA R/W register (loaded form the HBA/PTI SATA input port) is placed through a context associative memory (CAM) to perform a simultaneous base comparison (5231) against the HBA_HI mapping vector (5241) and an upper limit comparison (5232) against the HBA_HI mapping vector (5242). CAM memories are known to those skilled in the art. As an example, a preferred CAM comparison logic implementation that compares the active base LBA (the LBA to which the next disk read/write will occur) against the HBA_LO (5241) and HBA_HI (5242) limits is generally depicted in FIG. 53 (5300) and FIG. 54 (5400) respectively. The results of these CAM comparisons are two bit vectors (5251, 5252) that indicate if the comparison operations were matched within the appropriate LBA ranges. These bit vectors (5251, 5252) are then simultaneously compared bit-by-bit (5260) to form an action bit vector (ABV) (5270) which indicates whether the requested LBA R/W register falls within the mapping range of the PTDDC.

CAM Comparison Logic (5300)-(5400)

Figure 54:
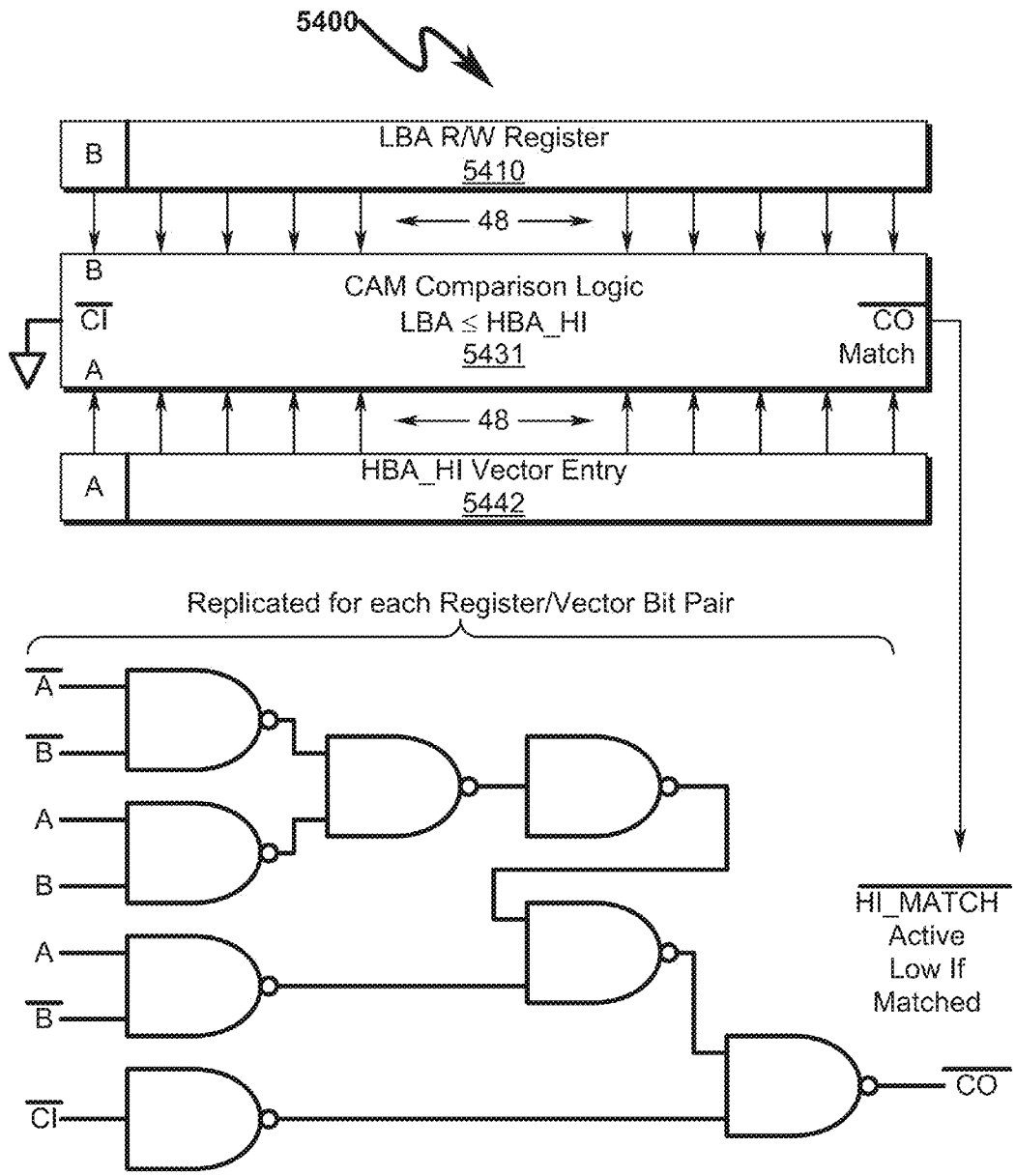
FIG. 54 illustrates an exemplary schematic depicting CAM comparison logic.

FIG. 53 (5300) and FIG. 54 (5400) depict preferred LBA comparison logic for the HBA_LO and HBA_HI limits. These comparison logic blocks generate an active low signal (LO_MATCH, HI_MATCH) corresponding to the match results between the LBA R/W register (5310, 5410) and the corresponding HBA_LO register (5341) and HBA_HI register (5441). In each of these figures the bit-by-bit comparison logic function is provided as an example circuit implementation of this function. These active low signals (LO_MATCH, HI_MATCH) are then inverted before being combined (5260) to form the ABV (5270). One skilled in the art will recognize that this function could equivalently be accomplished by NORing the active-low (LO_MATCH, HI_MATCH) signals.

CAM Sequencer Logic (5500)

Figure 55:
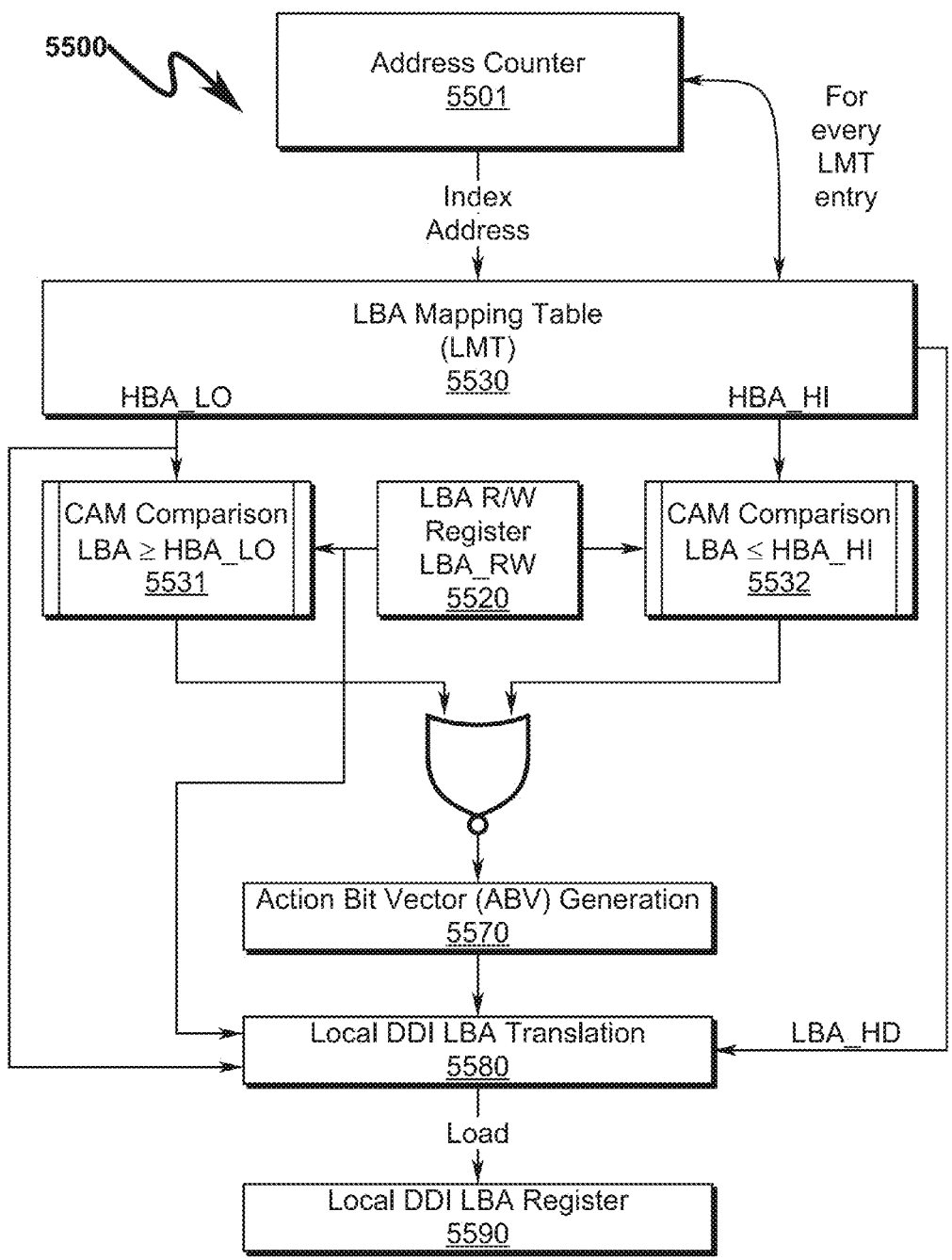
FIG. 55 illustrates an exemplary schematic depicting CAM sequencer logic.

The generation of the action bit vector (ABV) is detailed in FIG. 55 (5500). Here an address counter (5501) sequences through each entry in the LMT (5530) which retrieves the HBA_LO and HBA_HI addresses. This information is applied to the CAM comparison blocks (5531, 5532) that compare this mapping information against the LBA R/W (LBA_RW) register (5520). The results of this comparison are placed in the ABV (5570) and associated with mappings of the LBA_HD index which maps the LBA_LO value to a portion of the attached SATA disk drive. A local DDI LBA translation block (5580) associates the LBA to be read/written (LBA_RW) (5520) with a local DDI LBA value (5590) by adjusting the requested LBA (LBA_RW) (5520) by the offsets associated with the HBA_LO data (representing the offset into the LBA logical address space mapped by the PTDDC) and the LBA_HD data (representing the mapped offset into the locally attached SATA disk drive). The resulting local DDI LBA value (5590) is then written to the local disk via the PTDDC DDI port to setup the next read/write operation if the ABV indicates a match to the locally attached disk drive for one entry in the LMT.

Address Translation Logic (5600)

Figure 56:
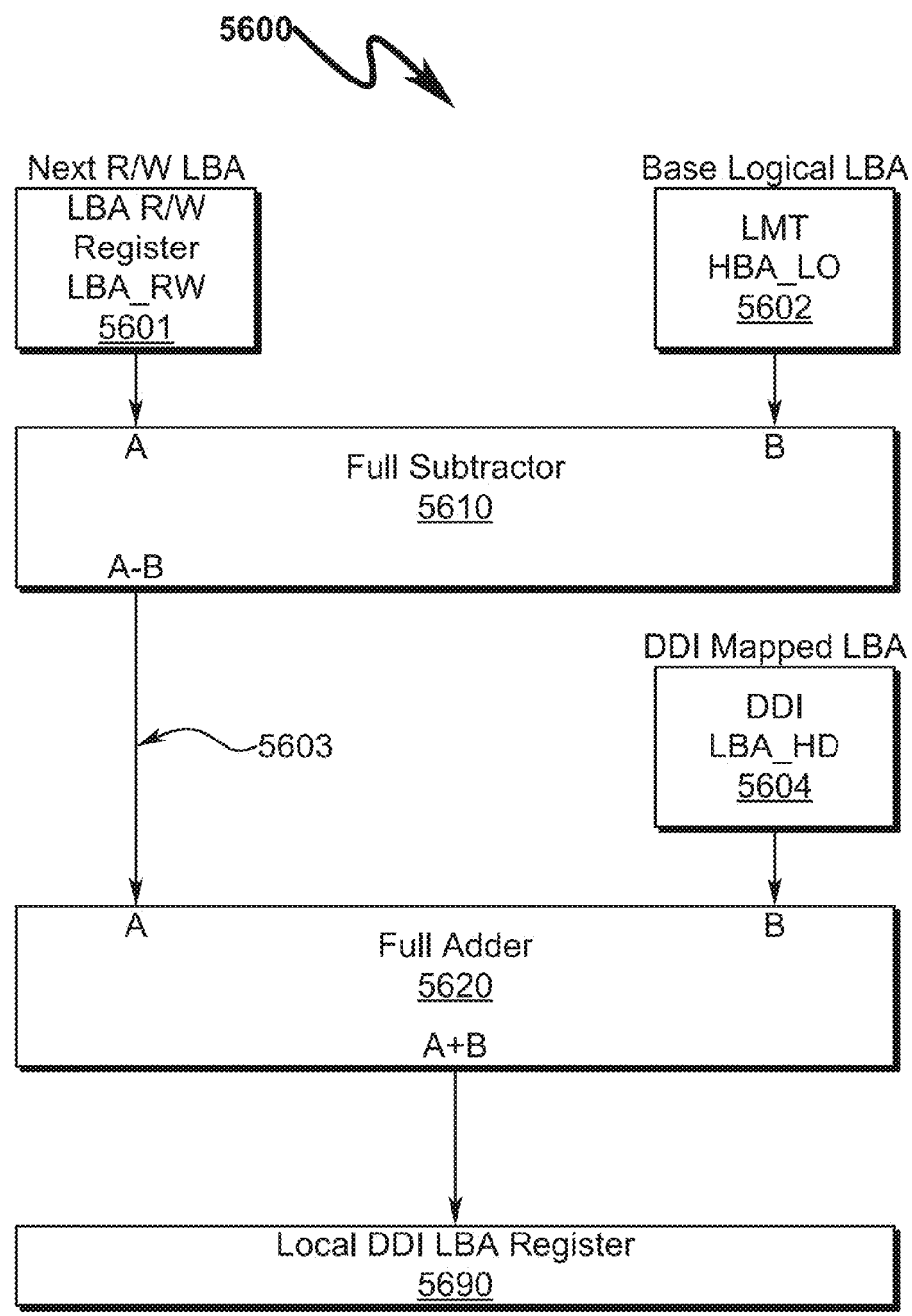
FIG. 56 illustrates an exemplary address translation logic schematic useful in some preferred invention embodiments.

The Local DDI LBA Translation logic (5580) depicted in FIG. 55 (5500) may be more clearly understood by inspecting FIG. 56 (5600) wherein the next R/W LBA register (5601) is compared by a full subtractor (5610) with the base logical LBA (5602) from the LMT that is mapped by the PTDDC and the difference between these quantities is generated. This represents the logical offset (5603) into the base mapping associated with the current PTDDC instance. This logical offset (5603) is then added to the DDI base LBA (5604) stored in the LMT by a full adder (5620) to generate the local DDI LBA register (5690) value that is sent to the locally attached SATA disk drive for the next read/write operation. Note that the ABV controls whether the local DDI LBA register (5690) is loaded depending on whether the next R/W LBA register (5601) is within the mapping range of the locally attached SATA disk drive. Thus, no loading of the locally attached SATA disk drive LBA register is necessary if the next logical LBA to be read/written is outside the mapping range of the disk drive as determined by the LMT. Schematic details of the full subtractor (5610) and full adder (5620) have not been provided as they are well known in the art.

Preferred Application Contexts

While the present invention is amenable to application in many hardware contexts that require transparent operation with existing operating systems (OS) and their associated on-disk-structures (ODS), several preferred configurations are presented below:

| Criteria | NTFS5 | NTFS | exFAT | HFS | HFS+ |
|---|---|---|---|---|---|
| OS | MS Win | MS Win | MS Win | AppleIOS | AppleIOS |
| Max Volume Size | $2^{64}-1$ | $2^{32}-1$ | $2^{50}$ | 2 TB | $2^{63}$ |
| Max Volume Files | $2^{32}-1$ | $2^{32}-1$ | nearly unlimited | 65535 | $2^{32}-1$ |
| Max File Size | $2^{64}-1K$ | $2^{44}-64K$ | $2^{64}$ | 2 GB | $2^{63}$ |
| Max Clusters | $2^{64}-1$ | $2^{32}-1$ | $2^{32}-1$ | 65535 | |
| Boot Sector | first + last sectors | first + last sectors | sectors 1-11, 12-23 | | |

From this table it can be seen that this limited selection of ODS structures works well with the file system extension system/method described herein because a PTDDC-enabled daisy-chain can easily support a disk drive HBA interface having a phantom register set mimicking a petabyte (1000 TB) or greater address space. While this address is larger than any single physical disk drive is currently capable of supporting, the daisy-chain can transparently appear to the HCS via the first PTDDC in the daisy-chain as a real hardware device having this capability without any need for software modifications in the operating system or additional hardware modifications to the HCS.

Hot RAID Capability (5700)-(6400)

Overview

In some application contexts utilizing the PTDDC daisy-chain controller architecture there will be scenarios where high availability of the overall data storage system is desirable. In prior art data storage systems, this is typically achieved by using a number of RAID (redundant array of independent disks) architectures in which multiple disks are used to store identical information so as to allow the failure of one individual disk to be recoverable by accessing the duplicate disk in the RAID array. In some RAID implementations a parity scheme is used to allow less than a full duplicate set of disk drives to be needed to recover a failing disk drive within the RAID array.

Prior Art RAID Technology

Within prior art RAID arrays, each disk within the RAID array must be serviced by a host bus adapter (HBA) controller interface, requiring a significant amount of hardware to service the duplication of disk drives within the RAID array. This also creates a practical cabling problem because these HBA controllers must each individually provide a cable interface to the individual disks within the RAID array. This "rats nest" of cables often limits the physical construction of RAID arrays.

The conventional approach to RAID arrays suffers from a performance penalty because for each WRITE operation to the RAID array to a specific LBA, a corresponding WRITE operation must occur to one or more other disk drives in the RAID array so as to duplicate the data spatially among the disk drives. This requires TWO WRITE operations that must be coordinated by the host CPU and as such the I/O bandwidth of the overall data storage system is reduced by a factor of TWO because of the need for redundant WRITE operations.

Furthermore, when a failure within the RAID array occurs, the failing disk drive must be physically replaced and a RAID recovery operation performed by the host computer system. This recovery operation typically involves performing a consistency check on the RAID array and duplicating information from the RAID array to a newly installed disk drive that replaces the failing disk drive previously removed from the RAID array. While this recovery operation may seem in concept a trivial task, in actual practice it can take approximately 1 hour per terabyte of total RAID storage capacity to perform a full RAID recovery of a single failed disk within the RAID array. Thus, for a 24 terabyte RAID system, this recovery operation can take more than a full day of operation. In some circumstances this recovery cannot be performed with other READ/WRITE operations to the RAID array, and the RAID array must be taken offline to perform the recovery. In many situations this downtime is unacceptable as it severely limits access to the overall data storage system. In any case, with very large RAID arrays consuming 1 PB or more, the recovery time is completely unacceptable and impractical.

Present Invention PTDDC RAID Approach

As depicted in U.S. Utility Patent for DATA STORAGE RAID ARCHITECTURE EXTENSION SYSTEM AND METHOD issued as U.S. Pat. No. 9,164,946 on Oct. 20, 2015, the PTDDC technology taught by the present invention permits efficient RAID-1 arrays to be constructed using daisy-chain controllers. Within this context, WRITE operations are passed along a daisy-chain of PTDDC controllers and these controllers are responsible for executing multiple writes to different disk drives along the daisy-chain, thus duplicating the data to be stored among two or more disk drives along the RAID daisy-chain. It should be noted in this context that more than two disk drives may be simultaneously written with the same data from the single WRITE operation from the host computer system (HCS). Thus, there is no additional overhead on the HCS side to affect RAID duplication of data among spatially diverse disk drives.

Additionally, when a disk drive fails within the PTDDC daisy-chained RAID array, the failing disk drive may be replaced with a fully-operational replacement disk drive and data from the mirrored disk drive within the RAID array written to the replacement drive WITHOUT THE NEED FOR INTERVENTION BY THE HOST COMPUTER SYSTEM. During this recovery process, the data copy operation from the "good" mirror disk drive in the RAID array to the "replacement" disk drive in the RAID array occurs along the PTDDC daisy-chain. Unlike conventional RAID systems in which the host computer system would read data from the RAID array "good" drive and then write this data to the "replacement" drive (incurring a READ and WRITE operation to the RAID array), the present invention would initiate the data transfer along the PTDDC chain WITHOUT HOST COMPUTER INTERVENTION. The advantage to the present invention approach is that the PTDDC daisy-chain can operate at full SATA bus speeds which are much faster (approaching 1969 MB/s in some implementations) than the I/O bandwidth and processing capabilities of a host computer system. Furthermore, host computer READ/WRITE operations to the PTDDC RAID array during this recovery process are not affected and the PTDDC RAID array remains fully operational and available to the host computer system for use as normal.

RAID Recovery Time

As can be discerned from the above discussion, a critical aspect of RAID storage arrays is the ability and timeframe associated with RAID recovery, or stated in other words "how long will it take to fully recover from a single drive failure in a RAID array from the time at which a disk drive initially fails or is detected as imminently failing?". As can be seen from the above examples, a typical timeframe is on the order of 1 hour/TB for RAID-5 systems just to perform the data replication to the newly installed disk drive. This RRT estimate does not include the time associated with detecting the failing disk drive, notifying an IT professional of the failing drive, physical drive replacement, just replicating data from the RAID array to the newly installed disk drive. This total time of recovery will be termed "RAID Recovery Time (RRT)" within the following discussion.

Improving RAID Recovery Time (RRT)

To improve the overall RRT for a RAID system entails anticipating that a disk drive will fail at a time in which delays associated with physical drive replacement and the intervention of IT technical staff will be inconvenient or impossible. Thus, the present invention utilizes a multi-prong approach to improving RRT for RAID systems. Several components of this improved RRT methodology may include any individual or combination of the following features:

- Periodic monitoring of the health status of the disk drive(s) that are attached to the PTDDC.
- Installation of one or more HOT SPARE disk drives (HSD) that are connected along the PTDDC chain which are not logically configured into the overall LBA address space of the PTDDC RAID storage array.
- Powering down of HOT SPARE disk drives (HSD) that are not currently being utilized in the RAID storage array.
- Deactivation of PTDDC-attached disk drives that are connected in the RAID PTDDC daisy-chain as they are determined to be defective, inoperable, or on a migration path to failure due to increasing error activity.
- Automated activation of RAID mirroring operations from a "good" disk drive in the PTDDC daisy-chain to a HOT SPARE disk drive in the PTDDC daisy-chain on detection of a mirrored disk drive failure in the RAID daisy-chain.

Incorporation of the HOT SPARE disk drive as a dynamic replacement of the disk drive that has failed in the RAID PTDDC daisy-chain storage array.

Hot Snare Drive (HSD) System Implementation (5700)

Figure 57:
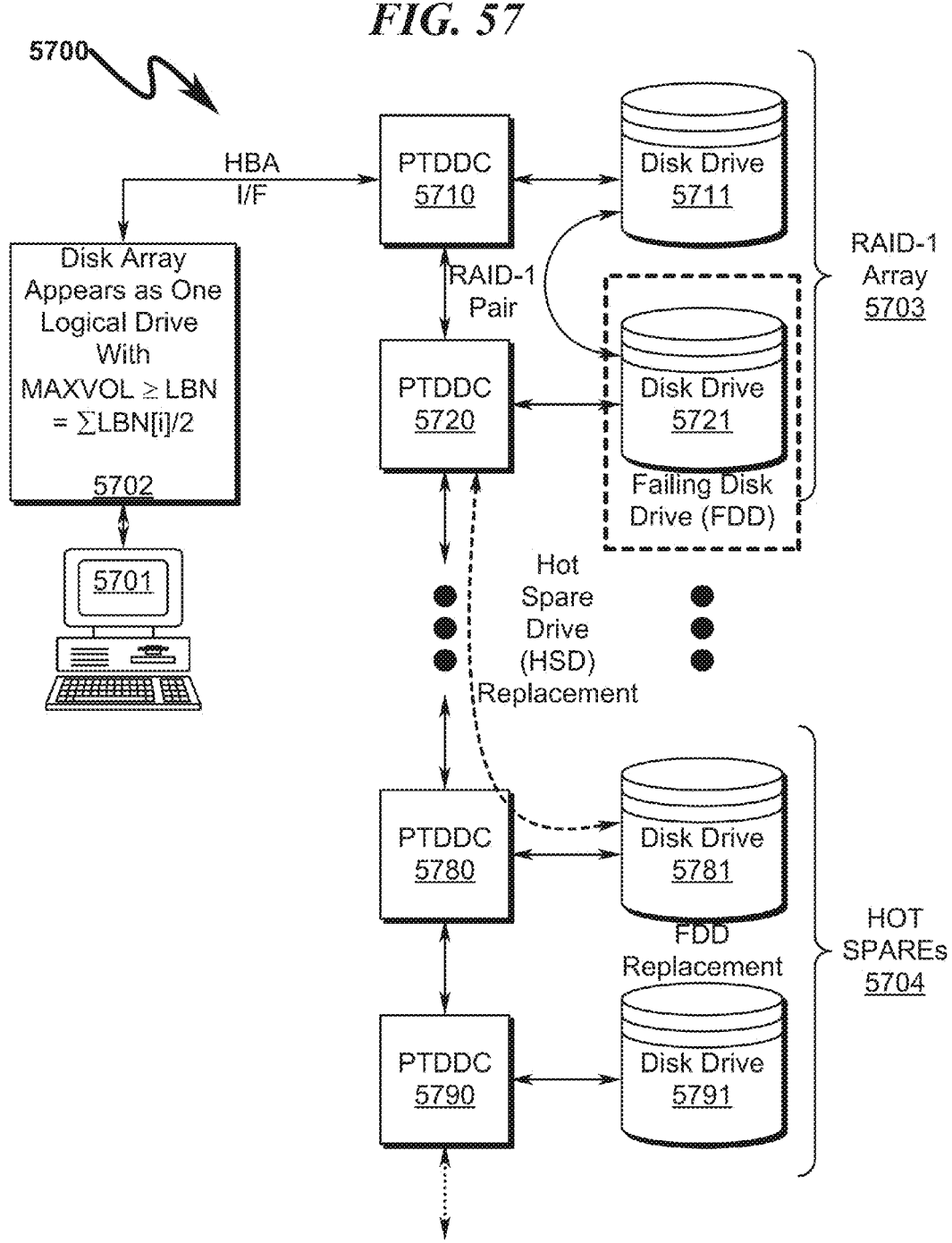
FIG. 57 illustrates a block diagram depicting a preferred exemplary invention system embodiment detailing a RAID hot spare (RHS) implementation using a PTDDC daisy-chain.

Details of the HOT SPARE drive (HSD) replacement methodology are provided in exemplary fashion in FIG. 57 (5700). Here it can be seen that a host computer system (5701) interacts with a RAID disk array (5702) appearing as a single logical disk drive to the operating system and is interfaced to a daisy-chain of PTDDCs (5710, 5720, 5780, 5790) that support a standard RAID-1 storage array (5703) comprising local disk drives (LDDs) (5711, 5721). Within this configuration the LDDs (5711, 5721) are mirrored in a RAID-1 configuration and data WRITES to one drive are mirrored to the other drive so as to achieve 100% data redundancy among the drives. Also depicted in the PTDDC daisy-chain are PTDDCs (5780, 5790) that are attached to LDDs (5781, 5791) constituting HOT SPARE drives (HSDs) that are used as immediate replacements for any of the disk drives (5711, 5721) that may fail in the RAID-1 array (5703). In this configuration the HSDs (5781, 5791) may be normally configured in a powered-up (spinning) state or a powered-down (spun down) state.

As an example of operation of the RAID HOT SPARE (RHS) functionality, upon detected failure of a LDD in the RAID-1 array (5703) (identified as a failing disk drive (FDD)), such as indicated by the depicted failing LDD (5721), the failing disk drive (FDD) is taken offline. Subsequent to this a HOT SPARE drive (HSD) (5781) is identified in the PTDDC daisy-chain. The LDD associated with the HSD (5781) is then used as a target for a mirror copy operation of all data from the "good" drive in the RAID-1 configuration (5711) (which can be the master drive associated with RAID content or in some circumstances the "failing" drive if it is still functional enough to support a mirror copy operation) so as to mirror all data to the HSD replacement LDD (5781). This mirror copy operation occurs within the context of the PTDDC daisy-chain and does not require host computer system intervention. For purposes of the present invention, RAID mirror copy operations are described in detail in U.S. Pat. No. 9,164,946 that is incorporated herein by reference.

Once the copy operation is complete, the LBA mapping registers in the "good" PTDDC controller (5710) (or alternatively the PTDDC associated with the "failing" disk drive (5720)) are copied to the HSD PTDDC controller (5780) and this PTDDC (5780) is activated as a replacement for the FDD PTDDC (5720). At this point the RAID-1 storage array has fully recovered from the failure of the FDD (5721) and operates normally with no degradation in performance or data storage reliability.

It is significant to note that the RRT using this system is minimized because there is no need for operator intervention in the RHS system and there is no need for physical replacement of the FDD by the operator. Physical replacement of the FDD can occur at a later time at the convenience of the IT operations staff. Furthermore, each PTDDC in the daisy-chain (5710, 5720, 5780, 5790) is automatically configured to detect hardware errors in the attached LDDs (5711, 5721, 5781, 5791) and place the LDD in an offline state if errors are detected.

SMART Error Detection and Hard Drive Failure Mechanisms

The present invention anticipates that each PTDDC in the RAID storage array daisy-chain may interact with the locally attached LDD and use SMART drive monitoring protocols to dynamically determine the health of the LDD without the need for intervention of a host computer system (HCS).

S.M.A.R.T. (Self-Monitoring, Analysis and Reporting Technology; often written as SMART) is a monitoring system included in computer hard disk drives (HDDs) and solid-state drives (SSDs) that detects and reports on various indicators of drive reliability, with the intent of enabling the anticipation of hardware failures.

When S.M.A.R.T. data indicates a possible imminent drive failure, software running on the host system may notify the user so stored data can be copied to another storage device, preventing data loss, and the failing drive can be replaced.

Hard disk failures fall into one of two basic classes:

Predictable failures, resulting from slow processes such as mechanical wear and gradual degradation of storage surfaces. Monitoring can determine when such failures are becoming more likely.

Unpredictable failures, happening without warning and ranging from electronic components becoming defective to a sudden mechanical failure (which may be related to improper handling).

Mechanical failures account for about 60% of all drive failures. While the eventual failure may be catastrophic, most mechanical failures result from gradual wear and there are usually certain indications that failure is imminent. These may include increased heat output, increased noise level, problems with reading and writing of data, or an increase in the number of damaged disk sectors.

A field study at GOOGLE® covering over 100,000 consumer-grade drives from December 2005 to August 2006 found correlations between certain SMART information and actual failure rates. In the 60 days following the first uncorrectable error on a drive (SMART attribute 0xC6 or 198) detected as a result of an offline scan, the drive was, on average, 39 times more likely to fail than a similar drive for which no such error occurred. First errors in reallocations, offline reallocations (SMART attributes 0xC4 and 0x05 or 196 and 5) and probational counts (SMART attribute 0xC5 or 197) were also strongly correlated to higher probabilities of failure. Conversely, little correlation was found for increased temperature and no correlation for usage level. However, the research showed that a large proportion (56%) of the failed drives failed without recording any count in the "four strong S.M.A.R.T. warnings" identified as scan errors, reallocation count, offline reallocation and probational count. Further, 36% of drives failed without recording any S.M.A.R.T. error at all, except the temperature, meaning that S.M.A.R.T. data alone was of limited usefulness in anticipating failures.

PCTechGuide's published information on SMART (2003) comments that the technology has gone through three phases. In its original incarnation SMART provided failure prediction by monitoring certain online hard drive activities. A subsequent version improved failure prediction by adding an automatic off-line read scan to monitor additional operations. The latest "SMART" technology not only monitors hard drive activities but adds failure prevention by attempting to detect and repair sector errors. Also, while earlier versions of the technology only monitored hard drive activity for data that was retrieved by the operating system, this latest SMART tests all data and all sectors of a drive by using "off-line data collection" to confirm the drive's health during periods of inactivity.

It should be noted in all of these examples using the SMART technology in the disk drives that the intervention of a host computer system (HCS) is required in order to interrogate the SMART data and determine if the disk drive is indeed failing and should be physically replaced. With large arrays of hard disks placed in typical RAID storage arrays, this requirement of HCS monitoring of the RAID array can result in significant computational overhead on the HCS. As an example, it should be noted that based on data center power consumption, GOOGLE® data centers comprise in excess of 10 MILLION disk drives, and the resulting burden of monitoring disk drive health is a very serious operational concern for many large data centers of this type. The present invention offloads this responsibility to the PTDDC daisy-chain and thus distributes the computational burden of monitoring disk drive health away from the HCS.

The present invention anticipates that detection of hardware errors within the RSA may comprise both detection of individual hardware errors in the individual disks within the RSA but also trends of detected errors in the RSA. Thus, while individual errors may trigger a drive replacement, they may also be ignored until they trend towards an imminent drive failure. Thresholds for these two variants may include time-based trending (errors/day, etc.) as well as absolute accumulated errors. One skilled in the art will recognize that other types of error thresholds may be applied in this context without loss of generality in the invention teachings.

Typical SMART Error Codes Monitored by the PTDDC

The present invention anticipates that a number of SMART error codes may be periodically monitored by the PTDDCs within the daisy-chain without the need for host computer system or operating system intervention. A list of typical error codes monitored is listed below, but is not exclusive of all codes that may be monitored by the PTDDC:

| Error Code | Error Attribute | Description |
|---|---|---|
| 05 0x05 | Reallocated Sectors Count | Count of reallocated sectors. The raw value normally represents a count of the bad sectors that have been found and remapped. Thus, the higher the attribute value, the more sectors the drive has had to reallocate. This allows a drive with bad sectors to continue operation. While primarily used as a metric of the life expectancy of the drive, this number also affects performance. See standard ACS-3 |
| 10 0x0A | Spin Retry Count | Count of retry of spin start attempts. This attribute stores a total count of the spin start attempts to reach the fully operational speed (under the condition that the first attempt was unsuccessful). An increase of this attribute value is a sign of problems in the hard disk mechanical subsystem. |
| 183 0xB7 | SATA Downshift Error Count or Runtime Bad Block | Western Digital, Samsung or Seagate attribute: Total number of data blocks with detected, uncorrectable errors encountered during normal operation |
| 184 0xB8 | End-to-End error/IOEDC | This attribute is a part of Hewlett-Packard's SMART IV technology, as well as part of other vendors' IO Error Detection and Correction schemas, and it contains a count of parity errors which occur in the data path to the media via the drive's cache RAM. |
| 187 0xBB | Reported. Uncorrectable Errors | The count of errors that could. not be recovered using hardware ECC (see attribute 195) |
| 188 0xBC | Command Timeout | The count of aborted operations due to HDD timeout. Normally this attribute value should be equal to zero and if the value is far above zero, then most likely there will be some serious problems with power supply or an oxidized data cable. |
| 196 0xC4 | Reallocation Event Count | Count of remap operations. The raw value of this attribute shows the total count of attempts to transfer data from reallocated. sectors to a spare area. Both successful & unsuccessful attempts are counted |
| 197 0xC5 | Current Pending Sector Count | Count of "unstable" sectors (waiting to be remapped, because of unrecoverable read errors). If an unstable sector is subsequently read successfully, the sector is remapped and this value is decreased. Read errors on a sector will not remap the sector immediately (since the correct value cannot be read and so the value to remap is not known, and also it might become readable later); instead, the drive firmware remembers that the sector needs to be remapped, and will remap it the next time it's written. However, some drives will not immediately remap such sectors when written; instead the drive will first attempt to write to the problem sector and if the write operation is successful then the sector will be marked. good. (in this case, the "Reallocation Event Count" (0xC4) will not be increased). This is a serious shortcoming, for if such a drive contains marginal sectors that consistently fail only after some time has passed following a successful write operation, then the drive will never remap these problem sectors. |
| 198 0xC6 | Uncorrectable Sector or Offline Uncorrectable or Off-Line Scan Uncorrectable Sector Count | The total count of uncorrectable Count errors when reading/writing a sector. A rise in the value of this attribute indicates defects of the disk surface and/or problems in the mechanical subsystem |
| 201 0xC9 | Soft Read Error Rate or TA Counter Detected. | Count of off-track errors |
| 230 0xE6 | Drive Life Protection Status | Current state of drive operation based upon the Life Curve. |

Hot Spare Drive (HSD) Method Implementation (5800)

Figure 58:
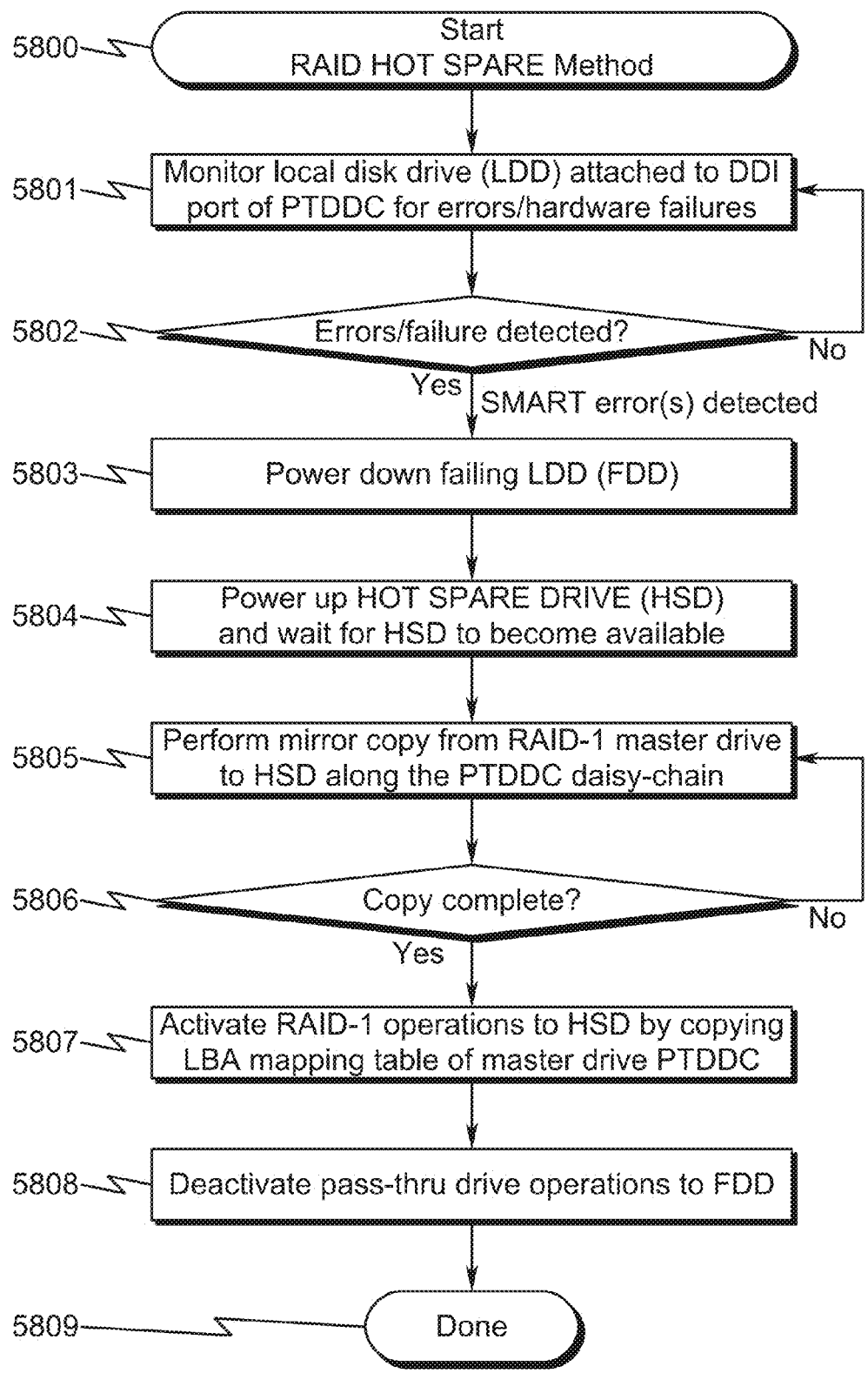
FIG. 58 illustrates a flowchart depicting a preferred exemplary invention method embodiment detailing a RAID hot spare (RHS) implementation using a PTDDC daisy-chain.

A general overview of the HOT SPARE drive (HSD) method is depicted in the flowchart of FIG. 58 (5800) and includes the following steps:

(1) with a first pass-thru disk drive controller (F-PTDDC), monitoring a locally attached disk drive (LDD) for errors and hardware failures (5801);

(2) proceeding to step (1) if errors and hardware failures are not detected (5802);

(3) issuing commands from the F-PTDDC to the failing LDD (FDD) to power down the FDD (5803);

(4) issuing commands from the F-PTDDC to a second pass-thru disk drive controller (S-PTDDC) to power-up a hot spare disk (HSD) attached to the S-PTDDC and waiting for the HSD to become available (5804);

(5) with the F-PTDDC, performing a mirror copy of a master disk drive (MDD) attached to a master pass-thru disk drive controller (M-PTDDC) to the HSD attached to the S-PTDDC (5805);

(6) proceeding to step (5) until the mirror copy is completed (5806);

(7) activating LBA mapping operations to the HSD by copying a LBA mapping table from the F-PTDDC to the S-PTDDC and configuring the S-PTDDC to process disk drive operations to the HSD (5807); and (8) deactivating LBA mapping operations to the FDD by configuring the F-PTDDC in an inactive state (5808);

wherein:

the M-PTDDC is connected in daisy-chain with the F-PTDDC;

the F-PTDDC is connected in daisy-chain with the S-PTDDC;

the M-PTDDC, F-PTDDC, and S-PTDDC are connected in a daisy-chain via serial advanced technology attachment (SATA) interfaces.

This general system summary may be augmented by the various elements described herein to produce a wide variety of invention embodiments consistent with this overall design description.

Note that the power up/down operations may be optionally implemented as in some cases it may be desirable to maintain the power state of the LDD/FDD and HSD during normal operations. Additional steps may be performed to log errors during the processing of the drive failover and notify IT personnel of the need for disk replacement. The method described above permits multiple failovers to occur such that as the LDD is replaced by the HSD, failure of the HSD can result in replacement of this HSD by another HSD or even the original LDD PTDDC if the FDD is subsequently physically replaced by the IT operations staff.

Operational Performance

The use of the HSD system/method described above can result in significantly improved system performance. Since there is no need for immediate physical replacement of the failing disk drive by IT operations, copying of the data from the master disk drive (that mirrored the FDD data) can occur immediately upon detection of failure of the FDD. This copy operation of the FDD to the HSD can occur at full SATA bus speeds (approaching 1969 MB/s in some implementations). Thus, a 1 TB drive can be fully mirror copied in less than 30 minutes using a conventional 6 Gb/s (600 MB/s) SATA interface with full access to the RAID array available during the recovery process. Note that this mirror copy operation is only required for replacement of the FAILING disk drive, and there is no additional RAID storage array overhead that is normally associated with prior art RAID recovery systems. As an example, a conventional prior art 24 TB RAID storage array will require approximately 1 hour/TB of TOTAL storage array size to recover from a single-disk failure accounting ONLY for the mirror copy operation. In contrast, the present invention will required only 30 minutes for this recovery operation assuming that the replaced disk was 1 TB in size. This is irrespective of the total size of the RAID array. While this approximate RRT for the present invention scales with the size of the replaced disk drive (i.e., a 4 TB drive replacement would take approximately 2 hours to complete), this scaling is insignificant to the overall RRT associated with conventional prior art RAID storage arrays and their recovery timeframes.

Solid-State Disk (SSD) Hot Spare Configurations (5900)-(6000)

The hot spare drive (HSD) in some preferred invention embodiments may comprise a solid state disk (SSD) configured as a standard SATA disk drive. In these circumstances the write performance of these drives will greatly exceed that of a conventional platter-based hard disk drive and as such the RRT will be reduced considerably.

Figure 59:
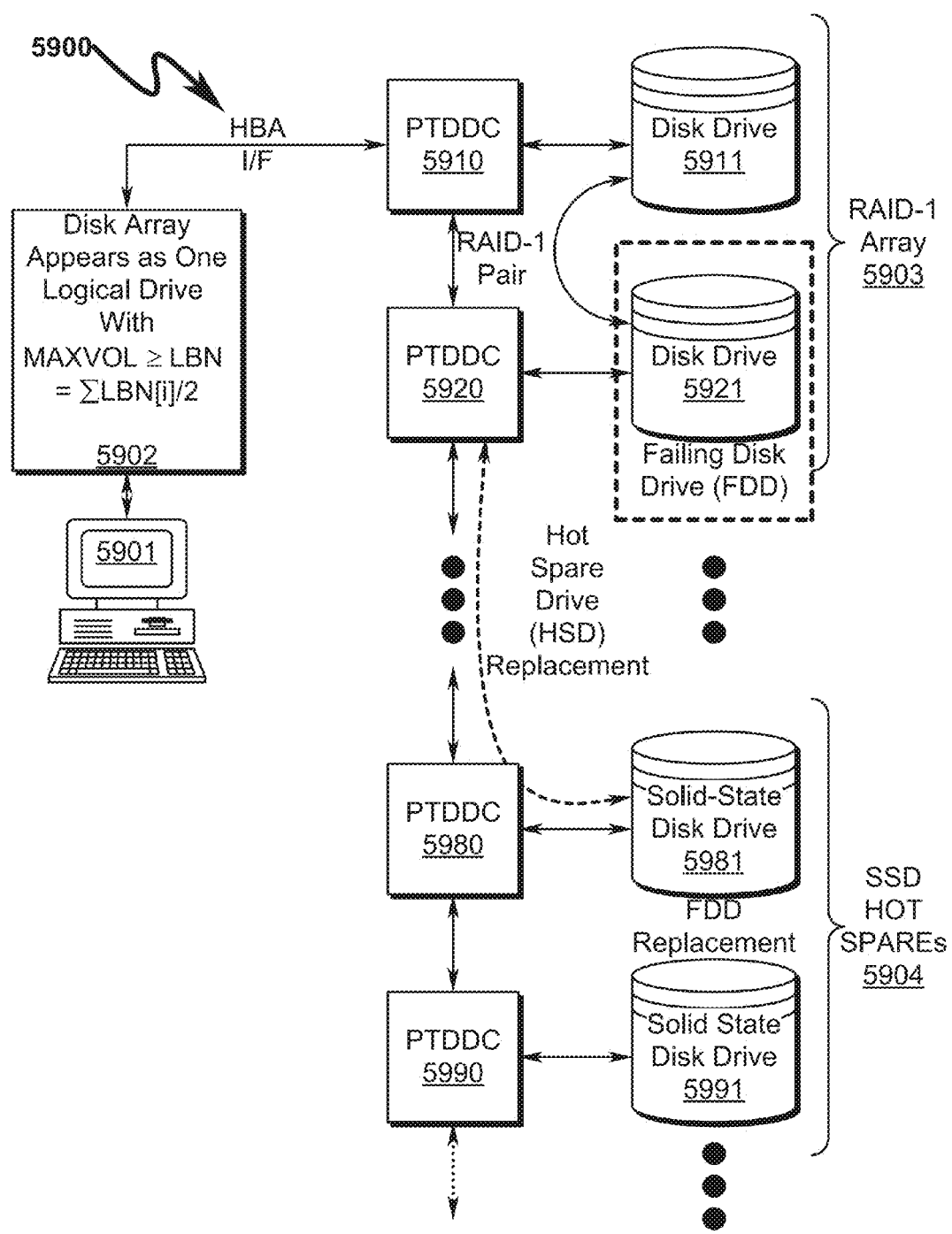
FIG. 59 illustrates a block diagram depicting a preferred exemplary invention system embodiment detailing a solid state disk (SSD) RAID hot spare (RHS) implementation using a PTDDC daisy-chain.
Figure 60:
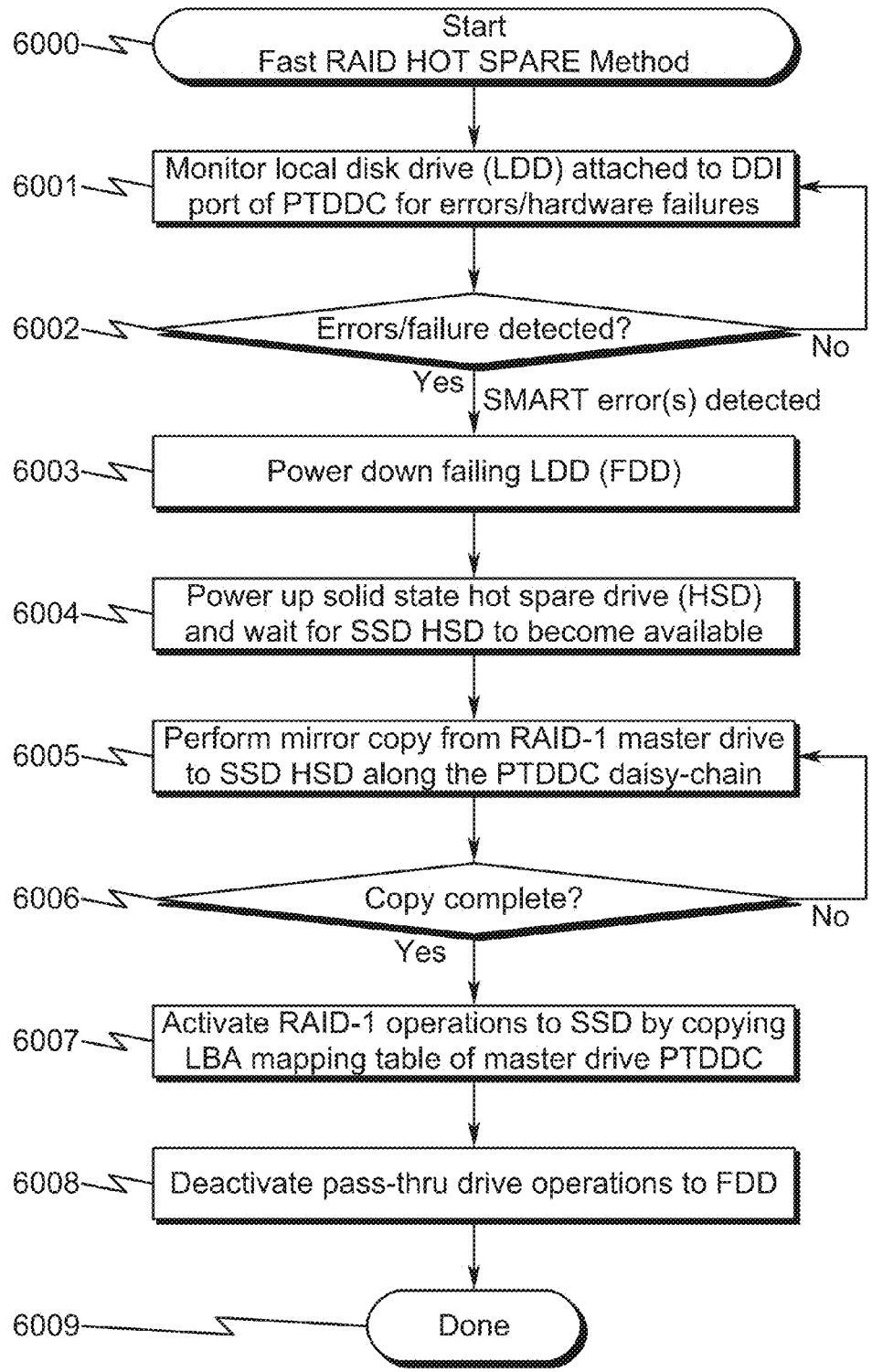
FIG. 60 illustrates a flowchart depicting a preferred exemplary invention method embodiment detailing a solid state disk (SSD) RAID hot spare (RHS) implementation using a PTDDC daisy-chain.

FIG. 59 (5900) depicts a typical system block diagram illustrating this invention variant and FIG. 60 (6000) depicts a corresponding flowchart supporting the use of SSDs as HSD recovery devices. These diagrams mimic the functionality depicted in FIG. 57 (5700) and FIG. 58 (5800) but incorporate solid state disk (SSD) RAID hot spare (RHS) drive replacement. In these implementations there may also be a mix of conventional platter-based hard disk drives and SSDs that comprise the HSD recovery devices. Additionally, it should be noted that after the FDD has been successfully recovered using the SSD replacement, a background process may subsequently copy the SSD data to a platter-based HSD hard disk drive and this drive may then be substituted for the SSD replacement. This option is viable in situations where it is important that the RRT be minimized but due to the increased cost of the SSD it is important that the SSD not be permanently allocated to the RSA. In this manner, the RRT can be minimized, the RSA becomes fully restored in the shortest period of time, and the background replacement of the SSD by the platter-based HSD can occur during off-peak loading of the RSA.

LBA Mapping Table (LMT) Replication (6100)-(6200)

The ability of the present invention to automatically remap hot spare disk drives within the context of the PTDDC daisy-chain is accomplished via use of the LBA mapping table (LMT) previously described. An example of this automatic remapping operation is depicted in FIG. 61 (6100) and FIG. 62 (6200) and will now be discussed.

Figure 61:
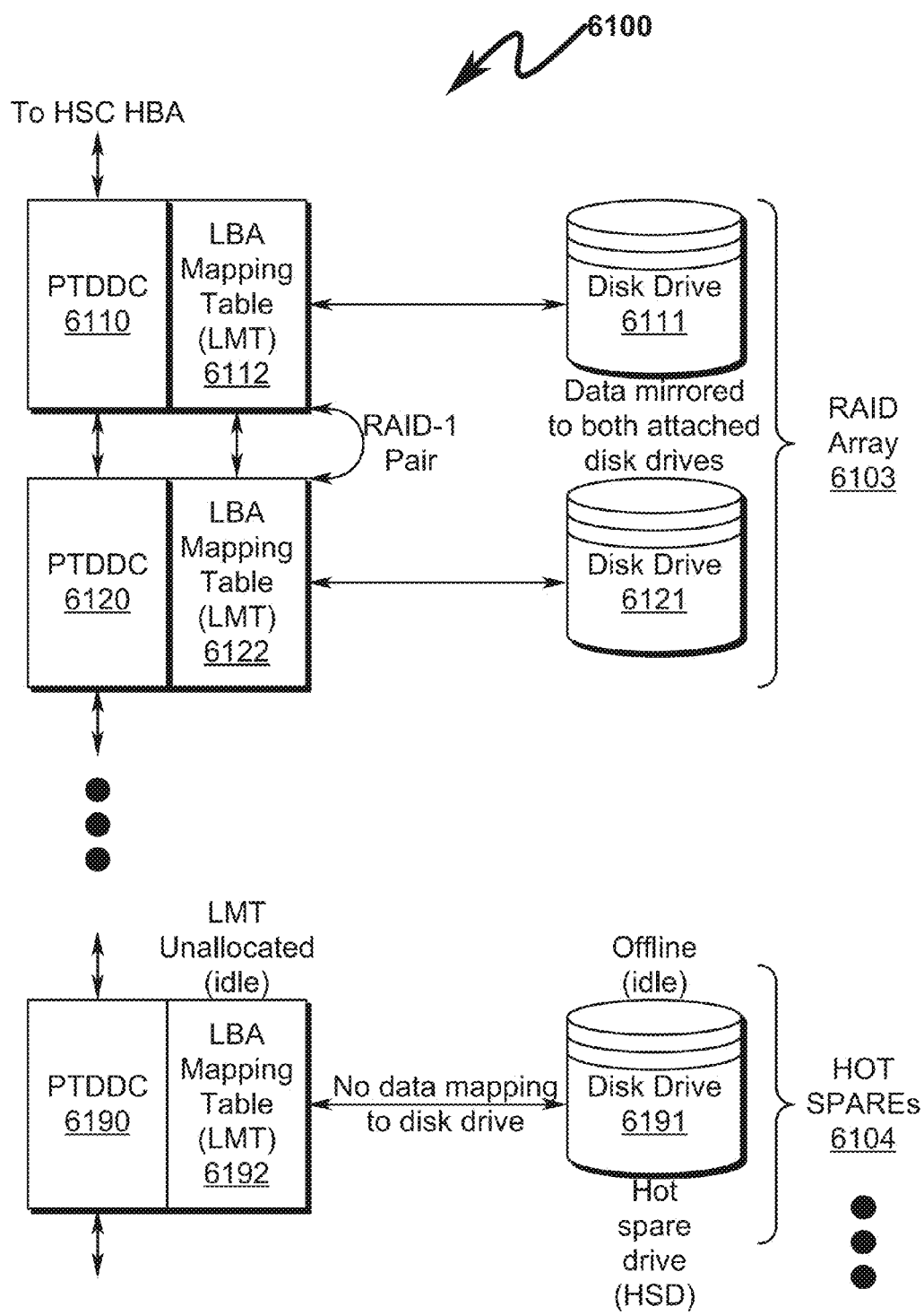
FIG. 61 illustrates an exemplary data flow and PTDDC configuration diagram of a PTDDC daisy-chain configured as a RAID array just before a detected disk drive hardware failure.

Referencing FIG. 61 (6100), a typical application context prior to a disk drive failure in the PTDDC daisy-chain is depicted wherein a PTDDC daisy-chain (6110, 6120, 6190) is constructed in which each PTDDC (6110, 6120, 6190) is attached to a corresponding local disk drive (6111, 6121, 6191) via the DDI port of the corresponding PTDDC (6110, 6120, 6190). Within each PTDDC (6110, 6120, 6190) a LBA mapping table (LMT) (6112, 6122, 6192) described herein determines what LBA addresses are mapped to the corresponding local disk drives (6111, 6121, 6191) by the corresponding PTDDCs (6110, 6120, 6190). In normal operation as depicted in a RAID-1 array, the first two LMTs (6112, 6122) are configured identically and map identical data to the attached disk drives (6111, 6121). Thus, WRITES within the address space of the LMTs (6112, 6122) write identical data to the disk drives (6111, 6121). Thus, the disk drives (6111, 6121) mirror data between each other. Other forms of RAID are possible, and it is also possible to mirror data among an arbitrary number of disk drives simultaneously. READs from the LMTs (6112, 6122) will only activate a read from one of the active disk drives (6111, 6121) under normal circumstances. Additionally, the hot spares (6194) will be inactive as the associated LMT (6192) will not provide for any data mapping to the disk drive (6191).

Figure 62:
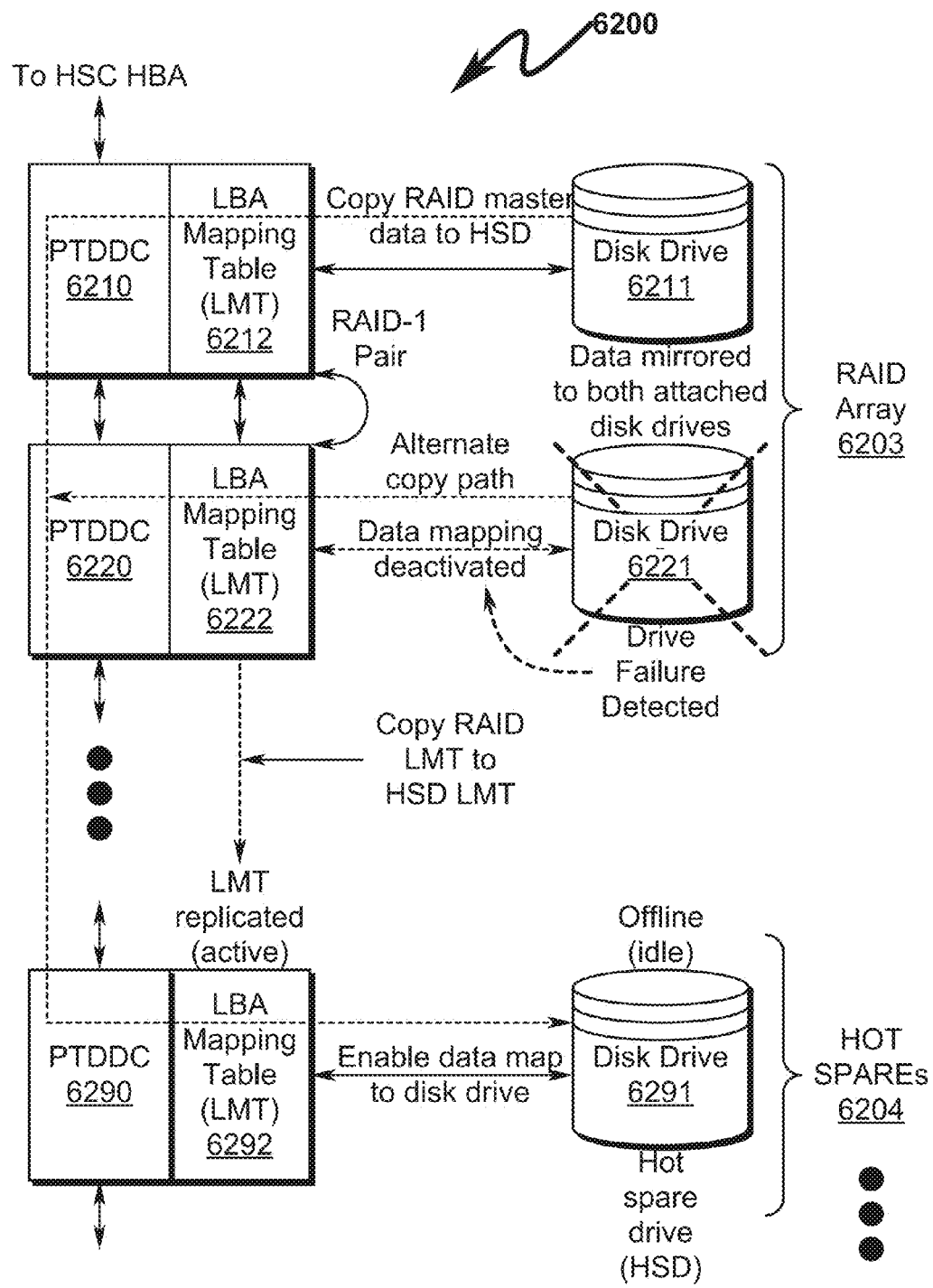
FIG. 62 illustrates an exemplary data flow and PTDDC reconfiguration diagram of a PTDDC daisy-chain configured as a RAID array just after a detected disk drive hardware failure.

Referencing FIG. 62 (6200), a typical application context after a disk drive failure has occurred in the PTDDC daisy-chain is depicted wherein the failing disk drive (FDD) (6221) is first deactivated by the controlling PTDDC (6220) and data mapping to that disk drive is disabled. At this point a hot spare drive (HSD) (6291) is activated along the PTDDC daisy-chain and a mirror copy of the RAID master data is copied from either a known good drive in the RAID storage array (6211) or alternatively from the "failing" disk drive (6221) (if this drive is deemed to be sufficiently reliable for one last mirror copy operation). Once RAID data is mirror copied to one of the HSD (6204) drives, the LMT for the corresponding PTDDC (6292) is updated to match that of either the failing LMT (6222) or the master RAID LMT (6212) (these LMTs should be identical). At this point the PTDDC associated with the failing disk drive (6220) is disabled and the LMT operations for this PTDDC are disabled until a good replacement drive for the failing disk (6221) can be installed in the system.

Partial-RAID (P-RAID) System Implementation (6300)

As indicated previously, various operating systems may use spatial duplication of data within a given disk drive in order to preserve critical data structures (CDS) in the event of a hardware failure on a specific region of the disk drive volume. This spatial diversity allows, for example, recovery from a situation in which the portion of the disk drive in which the CDS is placed becomes unreadable or unwriteable, or for some reason the data previously placed in that region of the disk drive somehow becomes corrupted (as can be ascertained from cyclic redundancy check (CRC) data stored in the CDS placed in that particular portion of the disk drive).

However, this operating system technique to spatially diversify the disk drive data does not permit recovery from a situation in which the entire disk drive fails. In this situation, the CDS becomes unreadable and all associated data becomes unreadable as well. To enable recovery from these situations requires that some form of RAID storage array be implemented in which the entire storage array supports some form of data duplication in order to permit recovery of the CDS in the event of a disk drive failure. Typically for RAID-1 implementations to preserve CDS data, this requires twice the number of disk drives in order to support recovery operations. RAID-5 and other forms of RAID may require fewer disk drives to implement parity-based recovery, but these techniques also incur significant performance penalties and are difficult to scale to large storage array systems.

Thus, the prior art teaches that for a given storage array, either the CDS is not preserved in the event of a single disk drive failure or it is required that some form of RAID for the entire storage array be implemented. The present invention permits a hybrid of these approaches to be achieved within the same storage array by implementing a partial RAID (P-RAID) storage system. As generally depicted in FIG. 63 (6300), the P-RAID storage array system as implemented using the PTDDC controllers utilizes a PTDDC daisy-chain (6310, 6320, 6370, 6380, 6390) in which a portion of the LBA address space storing the CDS is provisioned in RAID using paired disks (6311, 6321) while a portion of the LBA address space storing non-CDS data is provisioned in non-RAID (sometimes equivalently termed RAID-0, or just a bunch of disks (JBOD)) (6304) using individual disk drives (6371, 6381). As with previous discussions above, the system may be augmented using one or more hot spare (6305) drives that may be used to dynamically replace any failing disk drive in the PTDDC daisy-chain.

This P-RAID implementation is highly space efficient but at the same time provides robust data integrity for situations in which large amounts of non-critical data must be stored in very large data sets. In these situations, it is imperative that the CDS data that enables access to the individual files within the data set be preserved at all costs, yet it is not necessary to maintain absolute data integrity over a given file within the data set. There are many circumstances in which this type of large data set would be implemented, such as audio/video surveillance, collection of large-scale data such as weather data, etc. In these circumstances the loss of a few sectors of data within the overall data collection effort would not be a significant event, but the loss of a CDS such as a directory structure, file allocation table, partition table, indexing structure, or the like would be a fatal event that would render the entire storage system useless.

In these circumstances the present invention P-RAID architecture permits the PTDDC daisy-chain to support a large logical address space in which only a portion of the LBA address space is covered by RAID duplication and the remainder of the LBA address space is not RAID and is allowed to fail incrementally. CDS data stored in the RAID portion of the system is spatially duplicated across multiple disk drives that allow a single drive failure (or multiple drive failure in the case of RAID-1 systems which replicate data across more than two drives) to be fully recoverable in the case of CDS data. As depicted in the diagram, the use of hot spare drives (6305) permit automatic repair and recovery of any disk drive failure in the PTDDC daisy-chain.

P-RAID Method Implementation (6400)

A general overview of a generalized P-RAID method (implemented using RAID-1 and RAID-0 storage) is depicted in the flowchart of FIG. 64 (6400) and includes the following steps:

(1) daisy-chain a plurality of PTDDC controllers together (6401);

(2) connect individual local disk drives (LDDs) to each PTDDC in the daisy-chain (6402);

(3) attach daisy-chain of PTDDC controllers to host computer system (HCS) HBA interface (6403);

(4) configure the PTDDC LBA mapping table in a subset of the PTDDC daisy-chain for RAID-1 operation (6404);

(5) configure the PTDDC LBA mapping table in a subset of the PTDDC daisy-chain for RAID-0 operation (6405);

(6) store critical data structures (CDS) within LBA addresses corresponding to the RAID-1 PTDDCs (6406);

(7) store non-critical data structures (NDS) within LBA addresses corresponding to RAID-0 PTDDCs (6407); and (8) monitor disk drives attached to the PTDDC daisy-chain and optionally substitute hot spares within the PTDDC daisy-chain on a detected failure of a RAID-1 or RAID-0 disk drive in the PTDDC daisy-chain (6408).

wherein:

the PTDDCs are connected in a daisy-chain via serial advanced technology attachment (SATA) interfaces.

This general system summary may be augmented by the various elements described herein to produce a wide variety of invention embodiments consistent with this overall design description. Step (8) may be omitted in situations where dynamic hot spare replacement is not implemented or required.

Spatially-Diverse, Drive-Diverse, and RAID-Diverse Redundancy

The present invention anticipates that the use of spatially-diverse data storage as implemented by various operating systems when creating an ODS on a PTDDC daisy-chain may be transparently implemented using the techniques described above with respect to the use of phantom registers and LBA remapping so that the PTDDC daisy-chain operates transparently with respect to the host operating system irrespective of how much actual disk storage is incorporated in the PTDDC daisy-chain. It should be further understood that the use of RAID architectures as described herein may be used to add drive-diversity to the critical data structures (CDS) associated with the operating system ODS as placed on the PTDDC daisy-chain storage array. This combination permits both spatial-diversity on a given disk drive and data mirroring of this critical data among one or more other disk drives in the PTDDC daisy-chain. This double-redundant data storage approach when combined with RAID hot spare systems/methods (RAID diversity) as described herein provides yet a third level of redundancy such that if a failure in a disk drive containing critical data structures (CDS), the failing disk can be immediately replicated and logically replaced within the PTDDC daisy-chain without the need for manual human operator intervention.

System Summary

The present invention system anticipates a wide variety of variations in the basic theme of construction, but can be generalized as a redundant array of independent disks (RAID) hot spare system comprising:
(a) plurality of pass-thru disk drive controllers (PTDDCs); and
(b) plurality of local disk drives (LDDs);
wherein:
the plurality of PTDDCs each comprise a pass-thru input (PTI) port, pass-thru output (PTO) port, and disk drive interface (DDI) port;
the PTI port, the PTO port, and the DDI port each comprise a serial advanced technology attachment (SATA) interface;
the plurality of PTDDCs are each connected in a serial daisy-chain with only the PTI port of a member PTDDC in the daisy-chain connected to the PTO port of a previous PTDDC in the daisy-chain and the PTO port of the member PTDDC connected to the PTI port of a next PTDDC in the daisy-chain;
the plurality of PTDDCs are individually electrically coupled via the DDI port on the individual PTDDC to one of the plurality of the LDDs;
the daisy-chain comprises a first PTDDC at the beginning of the daisy-chain further comprising a first PTI port, a first PTO port, and a first DDI port;
the first PTDDC is configured for connection to a host computer system (HCS) via the first PTI port;
the first PTDDC maintains a set of phantom disk drive registers having a reported maximum LBA virtual address space that is larger than the number of logical blocks present on each of the plurality of the LDDs;
the phantom disk drive registers are configured to present only a single SATA disk drive interface to the HCS;
the plurality of LDDs are partitioned into a subset comprising a RAID storage array (RSA) and a subset comprising one or more hot spare drives (HSD);
the plurality of PTDDCs are configured to monitor disk drives in the RSA for hardware errors and hardware failures;
the plurality of PTDDCs are configured to copy contents of mirrored RAID disk drive corresponding to a failed disk drive (FDD) in the RSA to the HSD if the hardware errors and hardware failures are detected;
the plurality of PTDDCs are configured to remap LBA addresses within a PTDDC corresponding to the FDD in the RSA to a PTDDC corresponding to the HSD if the hardware errors and hardware failures are detected; and
the RSA is reconfigured by the LBA remapping operation to incorporate the HSD into the RSA as a replacement for the FDD in the RSA.

This general system summary may be augmented by the various elements described herein to produce a wide variety of invention embodiments consistent with this overall design description.

Method Summary

The present invention method anticipates a wide variety of variations in the basic theme of implementation, but can be generalized as a redundant array of independent disks (RAID) hot spare method comprising:
(1) with a first pass-thru disk drive controller (F-PTDDC), monitoring a locally attached disk drive (LDD) for hardware errors and hardware failures;
(2) proceeding to step (1) if the hardware errors and hardware failures are not detected;
(3) issuing commands from the F-PTDDC to a failing LDD (FDD) to power down the FDD;
(4) issuing commands from the F-PTDDC to a second pass-thru disk drive controller (S-PTDDC) to power-up a hot spare disk (HSD) attached to the S-PTDDC and waiting for the HSD to become available;
(5) with the F-PTDDC, performing a mirror copy of a master disk drive (MDD) attached to a master pass-thru disk drive controller (M-PTDDC) to the HSD attached to the S-PTDDC;
(6) proceeding to step (5) until the mirror copy is completed;
(7) activating LBA mapping operations to the HSD by copying a LBA mapping table from the F-PTDDC to the S-PTDDC and configuring the S-PTDDC to process disk drive operations to the HSD; and
(8) deactivating LBA mapping operations to the FDD by configuring the F-PTDDC in an inactive state;
wherein:
the M-PTDDC, the F-PTDDC, and the S-PTDDC are members of a plurality of PTDDCs, each of the plurality of PTDDCs comprising a pass-thru input (PTI) port, pass-thru output (PTO) port, and disk drive interface (DDI) port;
the PTI port, the PTO port, and the DDI port each comprise a serial advanced technology attachment (SATA) interface;
the plurality of PTDDCs are each connected in a serial daisy-chain with only the PTI port of a member PTDDC in the daisy-chain connected to the PTO port of a previous PTDDC in the daisy-chain and the PTO port of the member PTDDC connected to the PTI port of a next PTDDC in the daisy-chain;

the plurality of PTDDCs are individually electrically coupled via the DDI port on the individual PTDDC to one of the plurality of the LDDs;

the daisy-chain comprises a first PTDDC at the beginning of the daisy-chain further comprising a first PTI port, a first PTO port, and a first DDI port;

the first PTDDC is configured for connection to a host computer system (HCS) via the first PTI port;

the first PTDDC maintains a set of phantom disk drive registers having a reported maximum LBA virtual address space that is larger than the number of logical blocks present on each of the plurality of the LDDs;

the phantom disk drive registers are configured to present only a single SATA disk drive interface to the HCS;

the plurality of LDDs are partitioned into a subset comprising a RAID storage array (RSA) and a subset comprising one or more hot spare drives (HSD).

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:

An embodiment wherein the RSA comprises a RAID-1 storage array.

An embodiment wherein the RSA comprises a RAID-1 storage array in which data on a disk drive within the RSA is individually replicated on one or more other drives within the RSA.

An embodiment wherein the RSA comprises a RAID-1 storage array configured to store critical data structures (CDS) and a RAID-0 storage array configured to store non-critical data structures (NDS).

An embodiment wherein the HSD comprises a solid state disk drive (SDD).

An embodiment wherein the hardware errors and hardware failures are detected using Self-Monitoring, Analysis, and Reporting Technology (S.M.A.R.T.).

An embodiment wherein the hardware errors and hardware failures comprise monitored trends of errors reported by individual disk drives within the RSA.

An embodiment wherein the hardware errors and hardware failures comprise time-based trends of errors reported by individual disk drives within the RSA.

An embodiment wherein the hardware errors and hardware failures comprise accumulated errors reported by individual disk drives within the RSA.

An embodiment wherein the FDD is logically replaced by the HSD automatically within the PTDDC daisy-chain without the intervention of the HCS.

The following embodiments in which critical data structures (CDS) are spatially diverse within the LBA address space are also anticipated using the transparent PTDDC daisy-chain LBA remapping techniques described herein:

An embodiment wherein the ODS is selected from a group consisting of: new technology file system (NTFS) file system; extended file allocation table (exFAT) file system; hierarchical file system (HFS); and hierarchical file system plus (HFS plus).

An embodiment wherein the SDD comprises a protective master boot record (MBR).

An embodiment wherein the SDD comprises a global partition table (GPT) header.

An embodiment wherein the SDD comprises a global partition table (GPT) table entry.

An embodiment wherein the LME is configured to remap the SDD LBAs with remapping selected from the group consisting of: postfix LBA SDD mapping; hidden LBA SDD mapping; postfix-hidden LBA SDD mapping; prefix LBA SDD mapping; prefix LBA SDD mapping; duplicate LBA SDD mapping; NVRAM (non-volatile random access memory) SDD mapping; and mirrored LBA SDD mapping.

An embodiment wherein the first PTDDC is configured to store the SDD at LBA addresses corresponding to the beginning of the LBA address space of a first disk drive attached to the first PTDDC and offset the LBA address space of the first disk drive by an amount corresponding to the data size of the SDD.

An embodiment wherein the first PTDDC is configured to store the SDD at LBA addresses corresponding to the end of the LBA address space of a disk drive attached to the first PTDDC.

An embodiment wherein the PTDDC is configured to store the SDD in non-volatile memory within the PTDDC.

An embodiment wherein the PTDDC is configured to generate a protective master boot record (MBR), global partition table (GPT) header, and global partition table (GPT) table entries corresponding to a virtual LBA address space defined by the phantom registers within the physical LBA address space of the LDD.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A RAID (redundant array of independent disks) hot spare (RHS) system and method that permits a daisy-chain of interconnected pass-thru disk drive controllers (PTDDCs) each connected to a SATA local disk drive (LDD) storage element (DSE) to support a hot spare disk (HSD) such that a failing disk drive (FDD) in the RAID array can be immediately replaced by a HSD within the PTDDC daisy-chain without operator intervention has been disclosed. The PTDDCs within the daisy-chain are configured in RAID fashion to support mirroring of one or more drives in the PTDDC daisy-chain. The PTDDCs monitor the functional status of LDDs attached to each PTDDC. Failure of an individual LDD triggers activation of a HSD in the PTDDC daisy-chain and automatic mirror copying within the PTDDC daisy-chain of RAID data from a master disk drive (MDD) mirrored to the LDD. Once this mirror copying is completed from the MDD to the HSD, LBA mapping registers in the PTDDC attached to the HSD are updated to configure and complete RAID mirroring between the MDD and HSD while the LDD and its associated PTDDC LBA mapping registers are deactivated.

CLAIMS INTERPRETATION

The following rules apply when interpreting the CLAIMS of the present invention:
  The CLAIM PREAMBLE should be considered as limiting the scope of the claimed invention.
  "WHEREIN" clauses should be considered as limiting the scope of the claimed invention.
  "WHEREBY" clauses should be considered as limiting the scope of the claimed invention.
  "ADAPTED TO" clauses should be considered as limiting the scope of the claimed invention.
  "ADAPTED FOR" clauses should be considered as limiting the scope of the claimed invention.
  The term "MEANS" specifically invokes the means-plus-function claims limitation recited in 35 U.S.C. §112(f) and such claim shall be construed to cover the corresponding structure, material, or acts described in the specification and equivalents thereof.
  The phrase "MEANS FOR" specifically invokes the means-plus-function claims limitation recited in 35 U.S.C. §112(f) and such claim shall be construed to cover the corresponding structure, material, or acts described in the specification and equivalents thereof.
  The phrase "STEP FOR" specifically invokes the step-plus-function claims limitation recited in 35 U.S.C. §112(f) and such claim shall be construed to cover the corresponding structure, material, or acts described in the specification and equivalents thereof.
  The step-plus-function claims limitation recited in 35 U.S.C. §112(f) shall be construed to cover the corresponding structure, material, or acts described in the specification and equivalents thereof ONLY for such claims including the phrases "MEANS FOR", "MEANS", or "STEP FOR".
  The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
  The claims presented herein are to be interpreted in light of the specification and drawings presented herein with sufficiently narrow scope such as to not preempt any abstract idea.
  The claims presented herein are to be interpreted in light of the specification and drawings presented herein with sufficiently narrow scope such as to not preclude every application of any idea.
  The claims presented herein are to be interpreted in light of the specification and drawings presented herein with sufficiently narrow scope such as to preclude any basic mental process that could be performed entirely in the human mind.
  The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A redundant array of independent disks (RAID) hot spare system comprising:
  (a) plurality of pass-thru disk drive controllers (PTDDCs); and
  (b) plurality of local disk drives (LDDs);
  wherein:
  said plurality of PTDDCs each comprise a pass-thru input (PTI) port, pass-thru output (PTO) port, and disk drive interface (DDI) port;
  said PTI port, said PTO port, and said DDI port each comprise a serial advanced technology attachment (SATA) interface;
  said plurality of PTDDCs are each connected in a serial daisy-chain with only the PTI port of a member PTDDC in said daisy-chain connected to the PTO port of a previous PTDDC in said daisy-chain and the PTO port of said member PTDDC connected to the PTI port of a next PTDDC in said daisy-chain;
  said plurality of PTDDCs are individually electrically coupled via said DDI port on said individual PTDDC to one of said plurality of said LDDs;
  said daisy-chain comprises a first PTDDC at the beginning of said daisy-chain further comprising a first PTI port, a first PTO port, and a first DDI port;
  said first PTDDC is configured for connection to a host computer system (HCS) having a host bus adapter (HBA) via said first PTI port;
  said first PTDDC maintains a set of phantom disk drive registers having a reported maximum logical block address (LBA) virtual address space that is larger than the number of logical blocks present on each of said plurality of said LDDs;

said phantom disk drive registers are configured to present only a single SATA disk drive interface to said HCS;

said plurality of LDDs are partitioned into a subset comprising a RAID storage array (RSA) and a subset comprising one or more hot spare drives (HSD);

said plurality of PTDDCs are configured to monitor disk drives in said RSA for hardware errors and hardware failures;

said plurality of PTDDCs are configured to copy contents of mirrored RAID disk drive corresponding to a failed disk drive (FDD) in said RSA to said HSD when said hardware errors and hardware failures are detected;

said plurality of PTDDCs are configured to remap LBA addresses within a PTDDC corresponding to said FDD in said RSA to a PTDDC corresponding to said HSD when said hardware errors and hardware failures are detected; and said RSA is reconfigured by said LBA remapping operation to incorporate said HSD into said RSA as a replacement for said FDD in said RSA.

2. The redundant array of independent disks (RAID) hot spare system of claim 1 wherein said RSA comprises a RAID-1 storage array.

3. The redundant array of independent disks (RAID) hot spare system of claim 1 wherein said RSA comprises a RAID-1 storage array in which data on a disk drive within said RSA is individually replicated on one or more other drives within said RSA.

4. The redundant array of independent disks (RAID) hot spare system of claim 1 wherein said RSA comprises a RAID-1 storage array configured to store critical data structures (CDS) and a RAID-0 storage array configured to store non-critical data structures (NDS).

5. The redundant array of independent disks (RAID) hot spare system of claim 1 wherein said HSD comprises a solid state disk drive (SDD).

6. The redundant array of independent disks (RAID) hot spare system of claim 1 wherein said hardware errors and hardware failures are detected using Self-Monitoring, Analysis, and Reporting Technology (S.M.A.R.T.).

7. The redundant array of independent disks (RAID) hot spare system of claim 1 wherein said hardware errors and hardware failures comprise monitored trends of errors reported by individual disk drives within said RSA.

8. The redundant array of independent disks (RAID) hot spare system of claim 1 wherein said hardware errors and hardware failures comprise time-based trends of errors reported by individual disk drives within said RSA.

9. The redundant array of independent disks (RAID) hot spare system of claim 1 wherein said hardware errors and hardware failures comprise accumulated errors reported by individual disk drives within said RSA.

10. The redundant array of independent disks (RAID) hot spare system of claim 1 wherein said FDD is logically replaced by said HSD automatically within said PTDDC daisy-chain without the intervention of said HCS.

11. A redundant array of independent disks (RAID) hot spare method comprising:

(1) with a first pass-thru disk drive controller (F-PTDDC), monitoring a locally attached disk drive (LDD) for hardware errors and hardware failures;

(2) proceeding to step (1) when said hardware errors and hardware failures are not detected;

(3) issuing commands from said F-PTDDC to a failing LDD (FDD) to power down said FDD;

(4) issuing commands from said F-PTDDC to a second pass-thru disk drive controller (S-PTDDC) to power-up a hot spare disk (HSD) attached to said S-PTDDC and waiting for said HSD to become available;

(5) with said F-PTDDC, performing a mirror copy of a master disk drive (MDD) attached to a master pass-thru disk drive controller (M-PTDDC) to said HSD attached to said S-PTDDC;

(6) proceeding to step (5) until said mirror copy is completed;

(7) activating logical block address (LBA) mapping operations to said HSD by copying a LBA mapping table from said F-PTDDC to said S-PTDDC and configuring said S-PTDDC to process disk drive operations to said HSD; and (8) deactivating LBA mapping operations to said FDD by configuring said F-PTDDC in an inactive state;

wherein:

said M-PTDDC, said F-PTDDC, and said S-PTDDC are members of a plurality of PTDDCs, each of said plurality of PTDDCs comprising a pass-thru input (PTI) port, pass-thru output (PTO) port, and disk drive interface (DDI) port;

said PTI port, said PTO port, and said DDI port each comprise a serial advanced technology attachment (SATA) interface;

said plurality of PTDDCs are each connected in a serial daisy-chain with only the PTI port of a member PTDDC in said daisy-chain connected to the PTO port of a previous PTDDC in said daisy-chain and the PTO port of said member PTDDC connected to the PTI port of a next PTDDC in said daisy-chain;

said plurality of PTDDCs are individually electrically coupled via said DDI port on said individual PTDDC to one of said plurality of said LDDs;

said daisy-chain comprises a first PTDDC at the beginning of said daisy-chain further comprising a first PTI port, a first PTO port, and a first DDI port;

said first PTDDC is configured for connection to a host computer system (HCS) having a host bus adapter (HBA) via said first PTI port;

said first PTDDC maintains a set of phantom disk drive registers having a reported maximum LBA virtual address space that is larger than the number of logical blocks present on each of said plurality of said LDDs;

said phantom disk drive registers are configured to present only a single SATA disk drive interface to said HCS;

said plurality of LDDs are partitioned into a subset comprising a RAID storage array (RSA) and a subset comprising one or more hot spare drives (HSD).

12. The redundant array of independent disks (RAID) hot spare method of claim 11 wherein said RSA comprises a RAID-1 storage array.

13. The redundant array of independent disks (RAID) hot spare method of claim 11 wherein said RSA comprises a RAID-1 storage array in which data on a disk drive within said RSA is individually replicated on one or more other drives within said RSA.

14. The redundant array of independent disks (RAID) hot spare method of claim 11 wherein said RSA comprises a RAID-1 storage array configured to store critical data structures (CDS) and a RAID-0 storage array configured to store non-critical data structures (NDS).

15. The redundant array of independent disks (RAID) hot spare method of claim 11 wherein said HSD comprises a solid state disk drive (SDD).

16. The redundant array of independent disks (RAID) hot spare method of claim 11 wherein said hardware errors and hardware failures are detected using Self-Monitoring, Analysis, and Reporting Technology (S.M.A.R.T.).

17. The redundant array of independent disks (RAID) hot spare method of claim 11 wherein said hardware errors and hardware failures comprise monitored trends of errors reported by individual disk drives within said RSA.

18. The redundant array of independent disks (RAID) hot spare method of claim 11 wherein said hardware errors and hardware failures comprise time-based trends of errors reported by individual disk drives within said RSA.

19. The redundant array of independent disks (RAID) hot spare method of claim 11 wherein said hardware errors and hardware failures comprise accumulated errors reported by individual disk drives within said RSA.

20. The redundant array of independent disks (RAID) hot spare method of claim 11 wherein said FDD is logically replaced by said HSD automatically within said PTDDC daisy-chain without the intervention of said HCS.

\* \* \* \* \*